United States Patent
Nuno et al.

(10) Patent No.: US 7,580,623 B2
(45) Date of Patent: *Aug. 25, 2009

(54) LENS BARREL, CAMERA, AND MOBILE INFORMATION TERMINAL

(75) Inventors: Katsuhiko Nuno, Yokosuka (JP); Koichi Sugiura, Yokohama (JP); Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 650 days.

This patent is subject to a terminal disclaimer.

(21) Appl. No.: 11/188,864

(22) Filed: Jul. 26, 2005

(65) Prior Publication Data

US 2006/0017836 A1 Jan. 26, 2006

(30) Foreign Application Priority Data

Jul. 26, 2004 (JP) ............................. 2004-217539
Feb. 22, 2005 (JP) ............................. 2005-044909
Apr. 25, 2005 (JP) ............................. 2005-127226

(51) Int. Cl.
*G03B 17/00* (2006.01)

(52) U.S. Cl. ........................................ 396/73; 359/672

(58) Field of Classification Search .................... 396/79, 396/80, 84, 73; 359/513, 704, 672; 348/360
See application file for complete search history.

(56) References Cited

U.S. PATENT DOCUMENTS

| 5,056,903 | A | * | 10/1991 | Nakamura et al. | .......... 359/513 |
| 5,424,793 | A | * | 6/1995 | Fukushima et al. | ........... 396/83 |
| 5,715,482 | A | * | 2/1998 | Wakabayashi et al. | ........ 396/79 |
| 5,970,260 | A | * | 10/1999 | Nakayama et al. | ............ 396/80 |
| 6,070,017 | A | * | 5/2000 | Nakahara et al. | ............ 396/104 |
| 2002/0016191 | A1 | * | 2/2002 | Ijas et al. | ..................... 455/575 |
| 2005/0089320 | A1 | * | 4/2005 | Murakami | ................... 396/84 |
| 2006/0017836 | A1 | | 1/2006 | Nuno et al. | |

FOREIGN PATENT DOCUMENTS

| JP | 11-142733 | 5/1999 |
| JP | 11-242157 | 9/1999 |

(Continued)

OTHER PUBLICATIONS

U.S. Appl. No. 11/873,078, filed Oct. 16, 2007, Ohashi.

(Continued)

*Primary Examiner*—Melissa J Koval
*Assistant Examiner*—Autumn Parker
(74) *Attorney, Agent, or Firm*—Oblon, Spivak, McClelland, Maier & Neustadt, P.C.

(57) ABSTRACT

A lens barrel including a telescopic cylinder configured to be accommodated within a fixed cylinder; a plurality of lens groups configured to be retained in the telescopic cylinder; a lens driving device configured to drive the plurality of lens groups along a longitudinal axis of the telescopic cylinder between a collapsed position in which at least one portion of the plurality of lens groups is stored in the fixed cylinder and an extended position in which the at least one portion of the plurality of lens groups is extended out of the fixed cylinder; and a retractable lens group configured to be retracted into the fixed cylinder through an opening in a wall of the fixed cylinder when the telescopic cylinder is in the extended position.

25 Claims, 50 Drawing Sheets

FOREIGN PATENT DOCUMENTS

| | | |
|---|---|---|
| JP | 3008380 | 12/1999 |
| JP | 2001-56436 | 2/2001 |
| JP | 3473351 | 9/2003 |
| JP | 3618557 | 11/2004 |

OTHER PUBLICATIONS

U.S. Appl. No. 11/567,458, filed Dec. 6, 2006, Nuno.
U.S. Appl. No. 11/572,750, filed Jan. 26, 2007, Nuno et al.
U.S. Appl. No. 11/572,685, filed Jan. 25, 2007, Nuno.

* cited by examiner

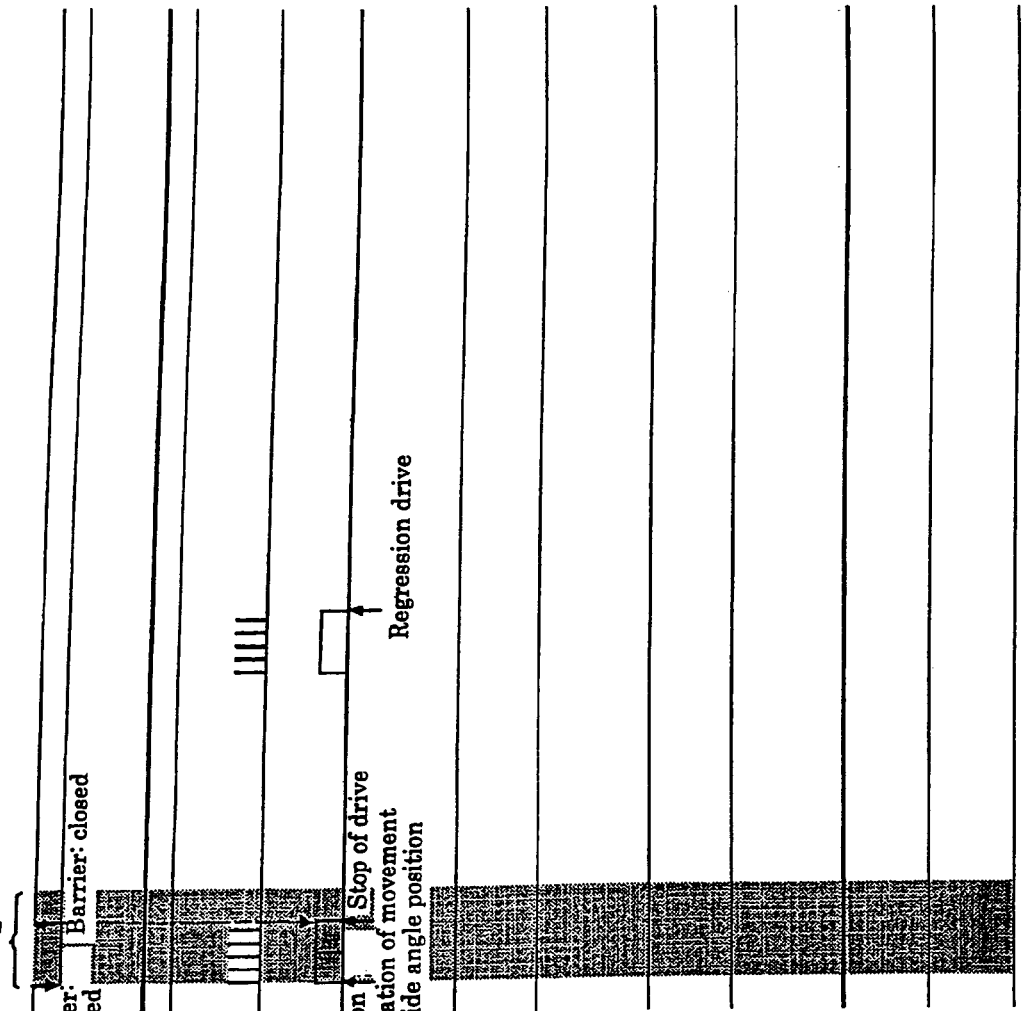

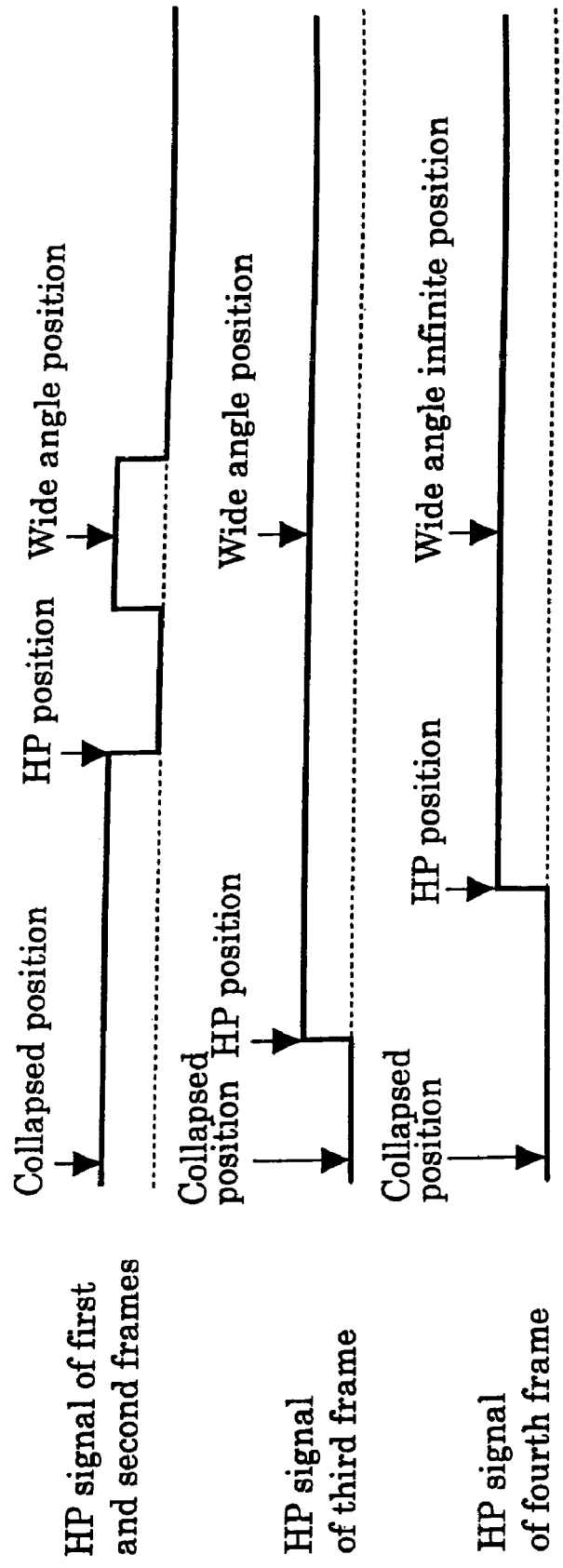

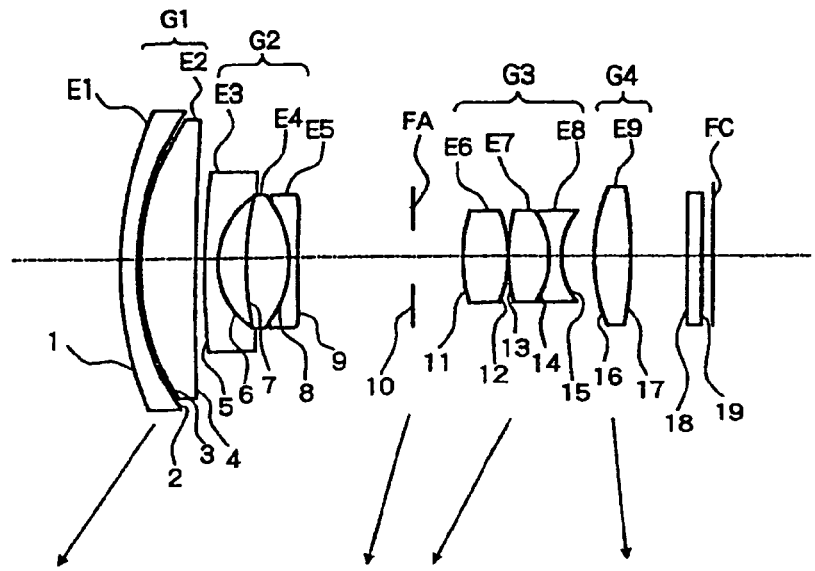
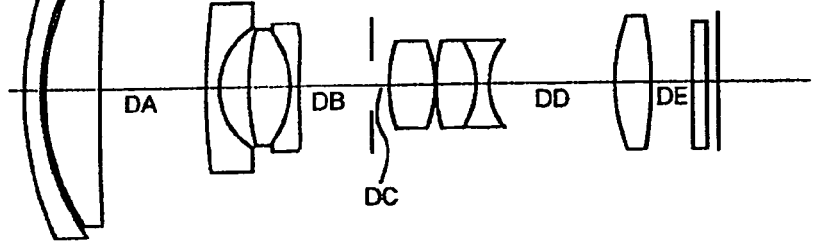
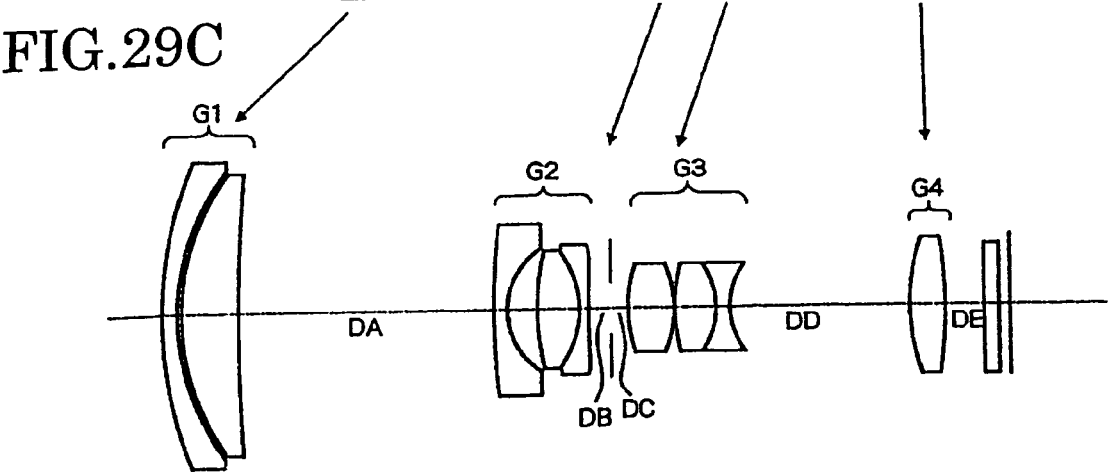

FIG.55
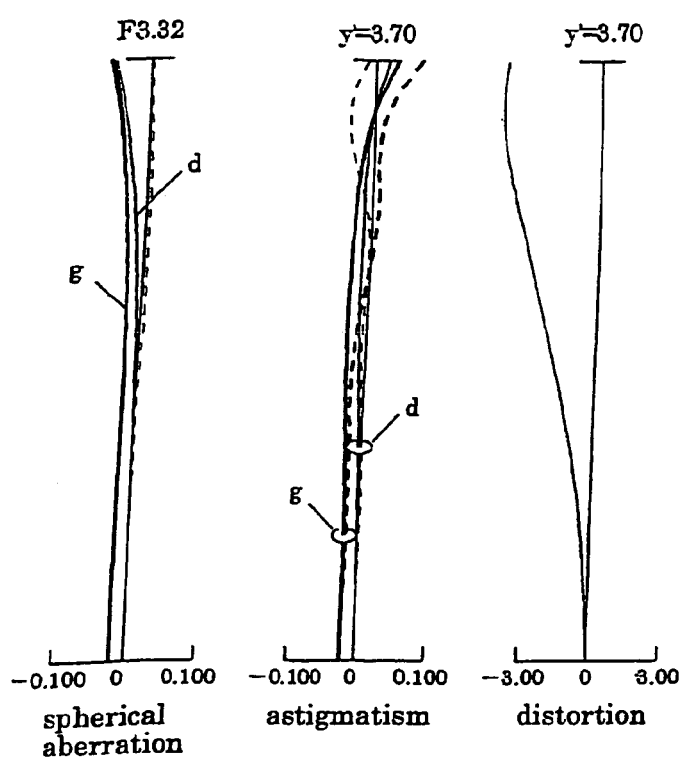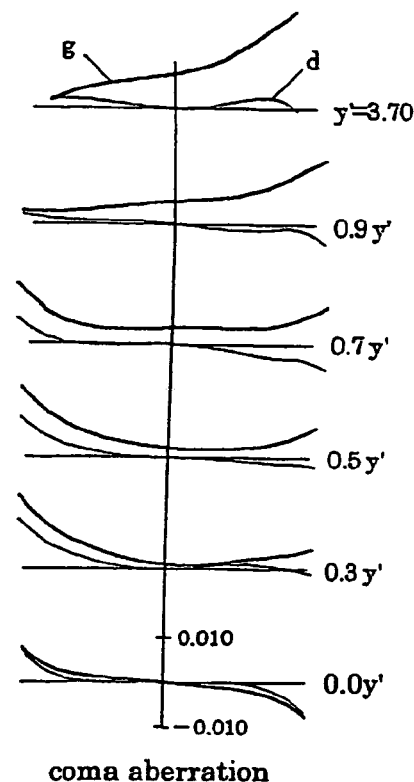
spherical aberration | astigmatism | distortion | coma aberration
FIG.56
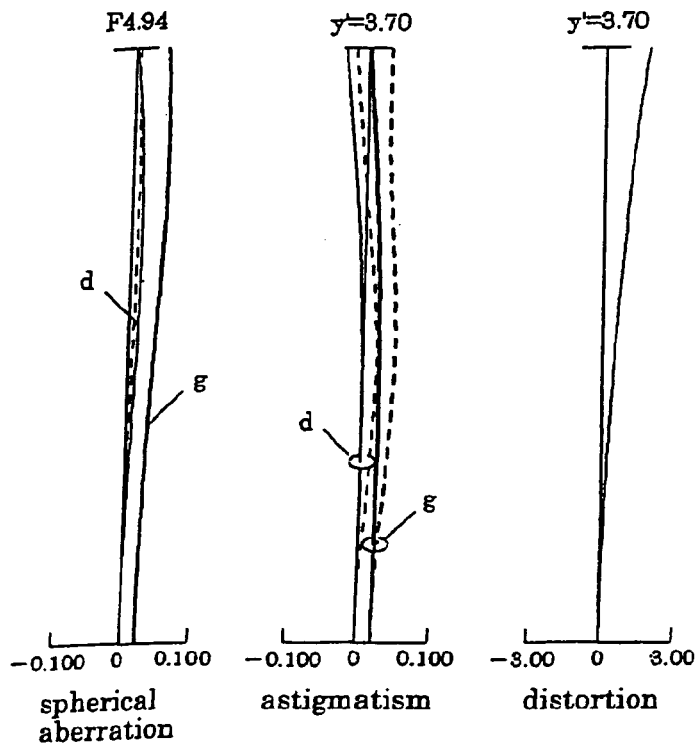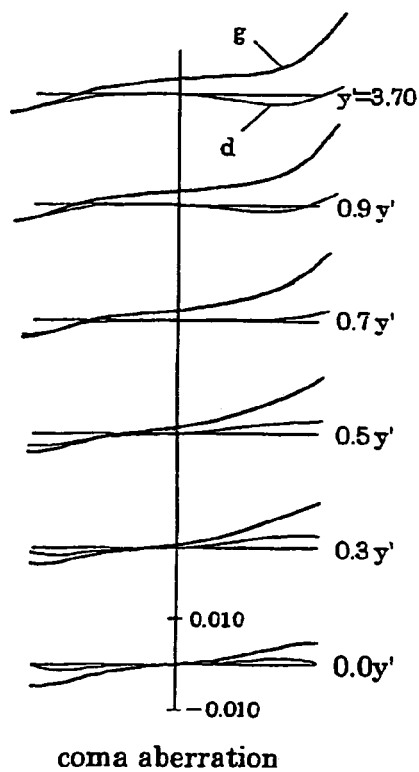
spherical aberration | astigmatism | distortion | coma aberration

LENS BARREL, CAMERA, AND MOBILE INFORMATION TERMINAL

CROSS-REFERENCE TO RELATED APPLICATIONS

The present application claims the benefit of priority to Japanese Patent Application 2004-217539, filed on Jul. 26, 2004; Japanese Patent Application 2005-044909, filed on Feb. 22, 2005; and Japanese Patent Application 2005-127226, filed on Apr. 25, 2005. In addition, the present application is related to the U.S. patent application entitled "Lens Barrel, Camera and Portable Information Terminal Device", which claims the benefit of priority to Japanese patent application No. 2004-217924, filed on Jul. 26, 2004. In addition, the present application is related to the U.S. patent application entitled "Lens Barrel, Camera and Portable Information Terminal", which claims the benefit of priority to Japanese Patent Application No. 2004-217927, filed on Jul. 26, 2004. In addition, the present application is related to the U.S. patent application entitled "Optical System Apparatus, Camera and Portable Information Terminal Apparatus", which claims the benefit of priority to Japanese Patent Application No. 2004-217932, filed on Jul. 26, 2004, and Japanese Patent Application No. 2004-348005, filed on Dec. 1, 2004. The contents of each of the above-identified applications are incorporated herein by reference.

BACKGROUND OF THE INVENTION

1. Field of the Invention

The present invention relates to a lens barrel capable of retracting at least one of a plurality of lens groups out of an optical axis when the lens barrel is in stored position, a camera using the lens barrel, and a mobile information terminal using the lens barrel.

2. Discussion of the Background

Conventionally, in an imaging device such as a digital camera, with advance in a high performance of a lens barrel having a zoom lens function capable of changing a focal distance, or miniaturization of the imaging device according to the user's demand, there has been increasingly used a collapsible lens barrel in which a plurality of lens groups are collapsed when is not in photograph.

Furthermore, because of the demand for not only simple reduction in dimension, but also further reduction in thickness, it is now important to reduce the thickness of the lens barrel in a collapsed or stored state to the maximum limit. As a technology to cope with the demand for reduction in thickness of the lens barrel, there has been used a collapsible lens barrel in which a lens cylinder retaining therein a plurality of lens groups is stored into the imaging device when not in use, and one of the lens groups is retracted out of an optical axis of the lens groups when the lens groups are collapsed or stored.

A technology for retracting one of lens groups out of an optical axis is disclosed in, for example, JP No. 2003-315861 A (Patent Document 1) and JP No. 2003-149723 A (Patent Document 2). According to the structures disclosed in these Patent Documents 1 and 2, since one of a plurality of lens groups disposed on the optical axis is retracted out of the optical axis when the lens groups are stored, the entire dimension of the lens barrel in a direction of the optical axis can be reduced.

However, in the structures disclosed in Patent Documents 1 and 2 as described above, the lens retracted out of the optical axis is substantially positioned within a collapsible lens cylinder provided in the lens barrel to retain therein the lens groups, even after the lens is retracted. Therefore, a space sufficient to contain the retracted lens must be provided in the lens cylinder. Providing such a space in the lens cylinder results in a larger diameter of the lens cylinder, eventually a larger size of the lens barrel within a plane transverse to the optical axis.

Accordingly, there is a problem that the conventional lens barrel has a large diameter by provision of the space containing the retracted lens in the lens barrel.

Meanwhile, substituting for a conventional silver-salt camera using a silver-salt film, there has been used rapidly a camera of a type as referred to as a digital camera or electronic camera and generalized in which a subject is imaged on a solid-state image sensing device such as a CCD (charge-coupled device), for example, to acquire imaging data of a still or moving subject, and the imaging data are recorded digitally in a non-volatile semi-conductor memory or the like which is typified by a flush memory.

Digital cameras have a very large market, and needs of users for the digital cameras include various things. High-quality picture and miniaturized digital cameras are desired always by the users and occupy a large weight.

Therefore, both high performance and miniaturization are required for a zoom lens used as a photographic lens. In a miniaturized camera, it is necessary to reduce the entire length of a lens unit when it is used, that is to say, a distance between the nearest lens surface of the lens unit to a subject and an imaging plane of the camera.

It is also important to reduce the entire length of the lens unit when it is stored in a body of the camera by thinning each lens group of the lens unit. Furthermore, it is required for the high performance of the zoom lens that the zoom lens has a resolving power which corresponds to the image sensing device having at least about three to five million pixels or more throughout a zooming area.

A many of users desire a photograph lens having a wide angle, it is desired that a semi-field angle at an end of the wide angle of a zoom lens is 38 degrees or more. The semi-field angle of 38 degrees corresponds to a focal length of 28 mm in the conversion to a silver salt camera of 35 mm using a silver salt film of 35 mm size or Leica size. Furthermore, a camera having a possible large zooming variable power ratio is also desired. If a zoom lens has a focal length of a range of 28 to 135 mm in the conversion to the silver salt camera of 35 mm, the zoom lens can take usual photographs almost. A variable power ratio of such a zoom lens is about 4.8 times.

Therefore, it is needed that a similar to or more variable power ratio than the above-mentioned variable power ratio is requested for a digital camera.

Although various zoom lens units for digital cameras are used, it is difficult to decrease the entire thickness of a lens unit including five lens groups or more, the lens unit is not suitable for miniaturization of the lens unit.

There is known a zoom lens unit having a variable power ratio of three (3) times, as a more general type. The zoom lens unit includes a first lens group having a negative focal length or negative refracting power, a second lens group having a positive focal length or positive refracting power, and a third lens group having a positive refracting power which are disposed in sequence from a subject, and an aperture stop disposed in a side of the second lens group facing the subject and moving with the second lens group. According to a variable power operation from an end of a short focal length to an end of a long focal length, the second lens group is monotonously moved from an imaging plane to the subject, and the first lens group is moved to correct variations in the position of the imaging plane due to the variable power operation.

However, such a zoom lens unit is not suitable for a high variable power ratio structure having four (4) times or more.

For example, in JP H11-174330 A and so on, there is disclosed a zoom lens unit including a first lens group having a positive refracting power, a second lens group having a negative refracting power, an aperture stop, a third lens group having a positive refracting power, and a fourth lens group having a positive refracting power, which are disposed in sequence from a subject. The first and third lens groups are monotonously moved to the subject, the second lens group is held in a fixed position, and the fourth lens group is moved suitably, according to a variable power operation from an end of wide angle to an end of telescope.

Moreover, for example, in JP H4-296809 A (JP. Pat. 3008380) and so on, there is disclosed a zoom lens unit in which first and third lens groups are monotonously moved to the subject, a second lens group is monotonously moved to an imaging plane, and a fourth lens group is moved suitably, according to a variable power operation from an end of wide angle to an end of telescope.

Furthermore, for example, in JP 2001-56436 A and so on, there is disclosed a zoom lens unit in which a first lens group is held in a fixed position, a second lens group is monotonously moved to an imaging plane, and a third lens group is moved to a subject, according to a variable power operation from an end of wide angle to an end of telescope.

In other words, for example, as disclosed in JP S 62-24213 A and JP H 3-33710 A as a type suitable to a high variable power there is well known a zoom lens unit including a first lens group having a positive refracting power (focal length), a second lens group having a negative refracting power, a third lens group having a positive refracting power, a fourth lens group having a positive refracting power, which are disposed in sequence from a subject, and an aperture stop disposed adjacent the third lens group. According to a variable power operation from an end of wide angle to an end of telescope, the first and third lens groups are held in a fixed position, the second lens group is monotonously moved from the subject to an imaging plane, and the fourth lens group is moved to correct variations in the position of the imaging plane due to the variable power operation. The zoom lens unit of this type is used in many video cameras or one portion of digital cameras because small numbers of, two lens groups are moved and hence a structure of a lens barrel is simplified.

However, in such a zoom lens unit, because it is necessary to secure a great moved amount of the second lens group achieving the variable power operation almost, the aperture stop disposed adjacent the third lens group is disposed always separately from the first lens group. Therefore, there is a problem that the first lens group becomes a very large size when a wide angle is provided.

JP 2001-56436 A also discloses that an aperture stop is disposed between the second and third lens groups, the second and third lens groups are moved in the reversed direction with respect to each other, and a moved amount of the second lens group is decreased by taking the third lens group on a role of the variable power operation so that a small sized first lens group is provided. A similar structure is disclosed in JP H6-94997 A.

However, even in the zoom lens unit of this type, the first lens group is held in the fixed position, thereby because the entire length of the lens unit is generally constant, if the semi-field angle at the wide angle limit increases to 38 degrees or more, a large-sized first lens group is formed. Accordingly, it is difficult to increase the semi-field angle at the wide angle limit to 38 degrees or more.

As described above, it is not possible to increase the semi-field angle at the wide angle limit to 38 degrees or more, in the zoom lens unit in which the position of the first lens group is fixed, the first lens group is preferably moved. A large size of the first lens group is prevented by setting the entire length of the lens unit in the wide angle shorter than that in the telescope and a sufficient wide angle can be accomplished.

JP H11-174330 A and JP H4-296809 A disclose that the first lens group is monotonously moved to the subject, according to the variable power operation from the end of wide angle to the end of telescope, as described above.

However, in the zoom lens unit disclosed in these patent documents, the semi-field angle at the wide angle limit is limited to about 25 to 32 degrees, the wide angle is still insufficient.

Meanwhile, devices having a function to image a subject are being generalized from conventional still cameras, electronic still cameras, digital cameras or video cameras having a function to image a driving subject, to various information devices such as mobile information terminal devices. A zoom lens unit is generalized as the lenses used in the devices, a wider area of a high variable power ratio and a high performance are requested increasingly.

In particular, in a zoom lens for imaging a subject on an image-sensing device, it is required that the zoom lens has a resolving power which corresponds to the image-sensing device having at least about three to five million pixels or more throughout a zooming area, as described above. However, a further high aberration correction is requested for the zoom lens because a size of the image-sensing device is further reduced and an image-sensing device having a diagonal size of 6 to 9 mm is being practiced and a pixel pitch is 3 mm or less in the case of realizing three to five million pixels in the compact image-sensing device.

For example, if the pixel pitch is set to 2.5 μm, because a Nyquist frequency is two hundred numbers per mm and a diffraction limitation is also of a problem, an allowable amount of aberration correction is lesser than as in the silver-salt camera.

There is a strong demand to have a property of wide field angle to a photographic lens, it is preferable that the semi-field angle at the wide angle limit of the zoom lens is at least 35 degrees, 38 degrees or more, if possible. As described above, the semi-field angle of 38 degrees corresponds to the focal length of 28 mm in the conversion to the silver salt camera of 35 mm using the silver salt film of 35 mm size or Leica size. In realizing such a wide field angle, off-axis aberration such as distortion aberration, chromatic aberration of magnification or the like is easy to often generate, hence a lens design is very difficult in cooperation with the fact that the pixel pitch of the image-sensing device is less.

With respect to the variable power ratio, if the zoom lens has a focal length of a range of about 28 to 135 mm (about 4.8 times) in the conversion to the silver-salt camera of 35 mm, almost normal photographs can be accomplished through the zoom lens.

As other type zoom lens suitable for a high variable power, there is known a zoom lens including a first lens group having a positive refracting power, a second lens group having a negative refracting power, a third lens group having a positive refracting power, which are disposed in sequence from a subject, and an aperture stop disposed adjacent a side of the third lens group facing the subject, as disclosed in JP H11-109236 A, JP H11-142733 A and JP H 11-242157 A. In a variable power operation from an end of wide angle to an end of telescope, each lens group is moved or fixed so that an interval between the first and third lens groups is large, and an interval between the second and third lens groups is less.

JP S 62-24213 A, JP H 3-33710 and JP H 6-94997 A disclose that a fourth lens group having a positive refracting power is disposed in an imaging side of the third lend group in addition to the above-mentioned structure.

The conventional zoom lenses as described above have a variable power ratio of 5 times or more in either three lens group structure or four lens group structure, but they have no semi-field angle of 35 degree or more at the end of the wide angle.

Even in JP H11-142733 A, in which an example of the most wide field angle is disclosed, the variable power ratio is a degree of 3 to 5 times and the semi-field angle is a degree of 25 to 34 degrees, the variable power ratio is limited to three (3) times in an embodiment disclosing the most wide semi-field angle of 34 degrees. Therefore, the conventional zoom lenses cannot respond to the recent request for the higher performance satisfying both the wider field angle and the high variable power ratio.

SUMMARY OF THE INVENTION

An object of the present invention is to provide a lens barrel capable of minimizing a dimension in a direction of an optical axis of lens groups when the lens groups are stored, and a dimension in a plane transverse to the optical axis, and a camera using the lens barrel and a portable information terminal using the lens barrel.

To achieve this object, according to one embodiment of the present invention, the lens barrel includes a fixed lens cylinder, a telescopic lens cylinder attached to the fixed lens cylinder, and a plurality of movable lens groups retained inside the telescopic lens cylinder. A lens driving device drives the telescopic lens cylinder with the lens groups along an optical axis of the lens groups between a collapsed position in which the telescopic cylinder is stored in the fixed cylinder and an extended position in which the telescopic cylinder unit is extended out of the fixed cylinder. At least one of the lens groups is movable out of the telescopic lens cylinder in a direction transverse to the optical axis. The retracted lens group is moved from the optical axis passing through the telescopic lens cylinder to an outside position of the telescopic lens cylinder, when retracting. Because the retired lens group is moved out of the telescopic lens cylinder, any space for containing the retracted lens group is not required to be provided in the telescopic lens cylinder.

Another object of the present invention is to provide a compact lens barrel having a great variable power ratio.

To achieve this object, according to another embodiment of the present invention, the lens barrel includes a zoom lens which comprises a first lens group having a positive refracting power, a second lens group having a negative refracting power, an aperture stop, a third lens group having a positive refracting power, and a fourth lens group having a positive refracting power, which are disposed in sequence from a subject, in which the first and third lens groups are monotonously moved to the subject depending upon variable power from a wide angle limit to a telescopic limit, a position of the second lens group is held fixed and the fourth lens group being moved to be positioned to a position closer to an imaging plane than the wide angle limit in the telescopic limit, in the variable power from the wide angle limit to the telescopic limit, and the following condition equation is satisfied;

$$0.60 < m4T < 0.85$$

where, m4T indicates the imaging magnification of the fourth lens group at the telescopic limit.

Accordingly to another aspect of the invention, there is provided a lens barrel, comprising: (1) a telescopic cylinder configured to be accommodated within a fixed cylinder; (2) a plurality of lens groups configured to be retained in the telescopic cylinder; (3) a lens driving device configured to drive the plurality of lens groups along a longitudinal axis of the telescopic cylinder between a collapsed position in which at least one portion of the plurality of lens groups is stored in the fixed cylinder and an extended position in which the at least one portion of the plurality of lens groups is extended out of the fixed cylinder; and (4) a retractable lens group configured to be retracted into the fixed cylinder through an opening in a wall of the fixed cylinder when the telescopic cylinder is in the extended position.

Accordingly to another aspect of the invention, there is provided a lens driving apparatus, comprising a driving device configured to drive (1) a plurality of lens retaining frames for retaining a first lens group including at least one variable power lens group, and (2) a retractable lens retaining frame for retaining a second lens group, through a telescopic cylinder configured to retain the plurality of lens groups between a collapsed position in which at least one portion of the first lens group is collapsed and an extended position in which the at least one portion of the first lens group is moved toward a subject. In addition, the driving device includes a first motor configured to drive the plurality of lens retaining frames between the collapsed and extended positions in the telescopic cylinder, and a second motor configured to drive the retractable lens retaining frame into a fixed cylinder attached to the telescopic cylinder through an opening in a wall of the fixed cylinder when the telescopic cylinder is in the extended position.

BRIEF DESCRIPTION OF THE DRAWINGS

FIGS. 17A and 17B are perspective views showing an exterior appearance and a structure of a camera according to a second embodiment of the present invention as viewed from the subject, in which FIG. 17A shows a state in which a photographing lens is stored in a body of the camera, and FIG. 177B shows a state in which the photographing lens is projected or extended from the camera body.

FIG. 23 is a chart showing a state in which the lens barrier is operated from an opened position to a closed position.

FIG. 24 B is a timing chart of an H signal.

FIGS. 29A, 29B, 29C are schematic cross-section views along optical axes; each of the views illustrates a structure of an optical system of a zoom lens according to the embodiment 1 of the present invention.

FIG. 55 is a diagram illustrating aberration at the short focus limit of the zoom lens of the embodiment 7.

FIG. 56 is a diagram illustrating aberration at the intermediate focal length of the zoom lens of the embodiment 7.

DESCRIPTION OF THE PREFERRED EMBODIMENTS

Some embodiments of the present invention will be explained in detail with reference to the accompanying drawings below.

FIGS. 1 to 16 and 20 illustrate a first embodiment of a lens barrel according to the present invention.

In FIGS. 1 to 16 and 20, the lens barrel includes a fixed frame 21 having a fixed cylinder 21a, a telescopic cylinder unit or telescopic cylinder attached to the fixed frame 21, and a plurality of lens groups disposed in the telescopic lens cylinder. The telescopic lens cylinder is movable and collapsible along an optical axis X of the plurality of lens groups.

Figure 9A:
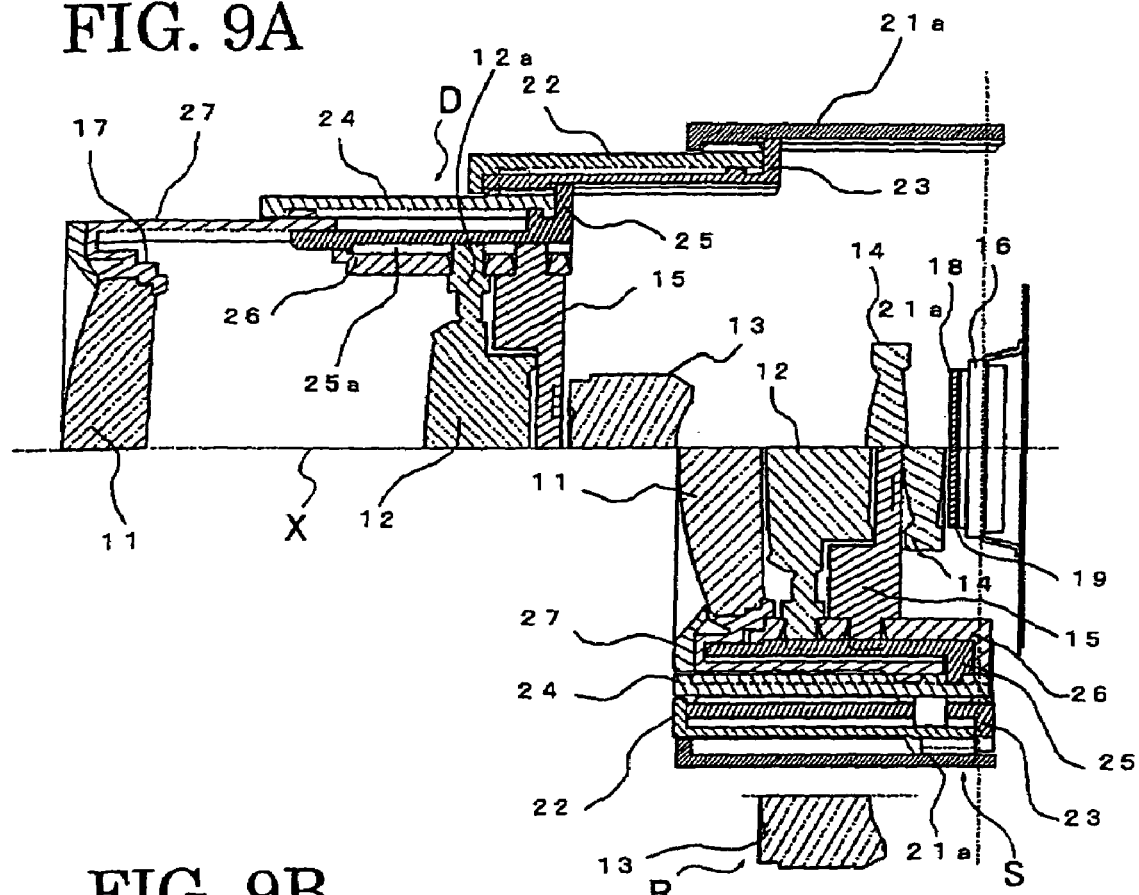
FIG. 9 is a vertical cross sectional view showing, in an upper half and a lower half with respect to an optical axis, main parts of the lens groups, the lens retaining frames, and the various lens cylinders of the lens barrel in the photographing state in which the lens groups are extended, and in the stored state in which the lens groups are retired to be stored, respectively.
Figure 9B:
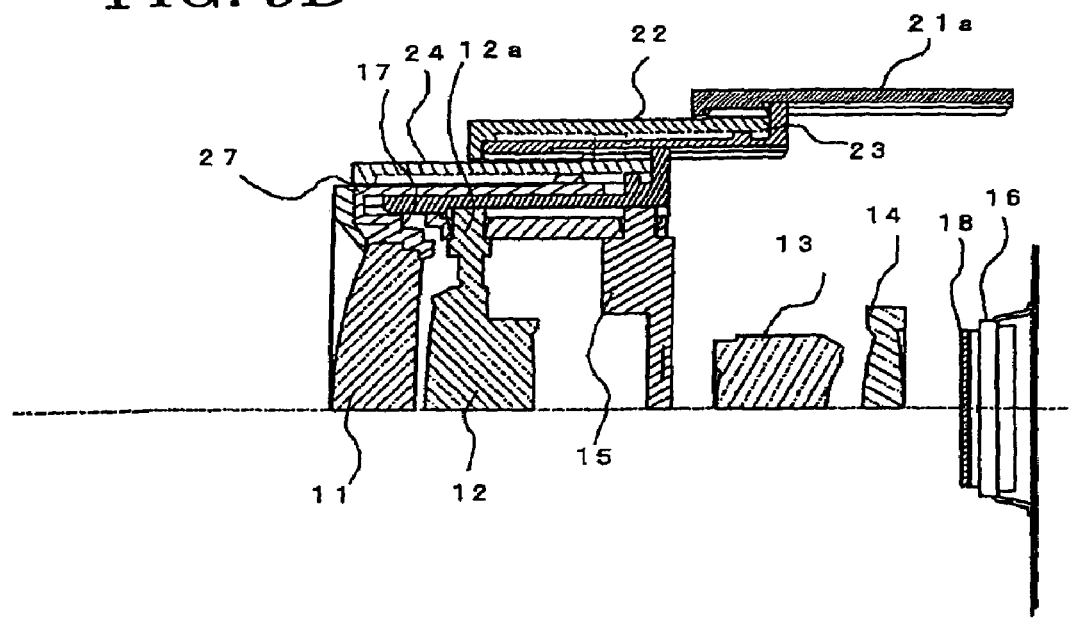

The lens groups comprise, for example, a first lens group 11, a second lens group 12, a third lens group 13, and a fourth lens group 14, which are disposed in the telescopic lens cylinder (see FIG. 9).

The telescopic lens cylinder includes, for example, a first rotary cylinder 22, a first liner 23, a second rotary cylinder 24, a second liner 25, a cam cylinder 26, a straight-advancement cylinder 27, and a third lens group-retaining frame 31 (see FIGS. 5 and 8) for retaining the third lens group 13. As described below, the first rotary cylinder 22 and so on are moved along the optical axis with respect to each other with the plurality of lens groups 11 to 14.

As shown in FIG. 9, the first, second, third, and fourth lens groups 11, 12, 13, and 14 are positioned from a subject (not shown) in sequence and disposed on the optical axis X. A shutter/aperture stop unit 15 is disposed between the second lens group 12 and the third lens group 13. The first, second, third, and fourth lens groups 11, 12, 13, and 14, and the shutter/aperture stop unit 15 are configured to be movable in a direction of the optical axis when the lens cylinder is moved along the optical direction.

To use the lens barrel for image forming apparatuses or optical devices such as digital cameras or the like, as described hereinafter, for example, a solid-state image-sensing device 16 comprising a CCD (charge-coupled device) or the like is disposed adjacent to the side of an image forming plane of the fourth lens group 14.

Referring to FIG. 9, the first lens group 11 is attached to a first lens-retaining frame 17, and a cover glass 18 and a low-pass filter 19 are disposed adjacent to an image-receiving surface of the CCD 16, if needed.

Generally, as shown in FIG. 9, the lens barrel is structured such that the first to fourth lens groups are movable between a collapsible or stored position S stored in the fixed lens cylinder 21 and a drawing-out position D extended out of the fixed lens cylinder 21, a zooming is achieved, and at least one lens group of the first to fourth lens groups can be retracted out of the optical axis into a retracted position as shown at R in FIG. 9. In the embodiment, the third lens group 13 is retracted from the optical axis passing through a through hole provided in the lens cylinder into a storage part provided in the fixed frame 21 and corresponding to the retracted position as described above.

In regard to this, a further detailed description will be described hereinafter.

The first lens group 11 to the fourth lens group 14 has a zoom lens function in which a focal distance is variable, as described hereinafter. The first lens group 11 includes one or more lens, and is fixed to the straight-advancement cylinder 27 via the first lens-retaining frame 17, which retains the first lens group 11 integrally.

The second lens group 12 includes one or more lens. A cam follower formed on a second lens-retaining frame (not shown) for integrally retaining the second lens group 12 is inserted into a cam groove for the second lens group 12 formed on the cam cylinder 26 shown in FIGS. 9 and 11, and engages with a straight-advancement groove 25a of the second liner 25, and the second lens group 12 is supported by the cam cylinder 26 and the second liner 25.

Figure 11:
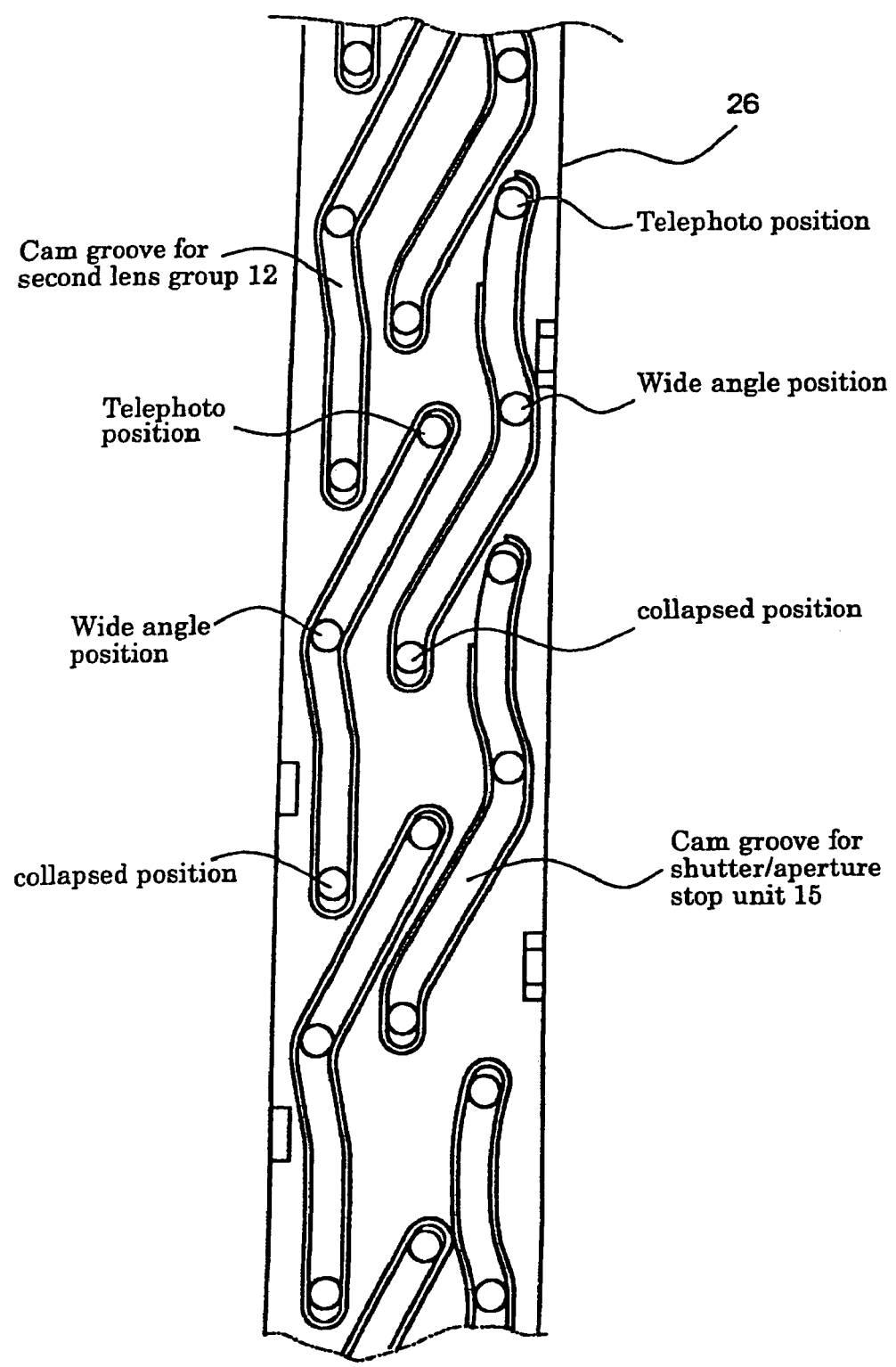
FIG. 11 is a schematic development elevational view showing a shape of cam grooves formed on a cam cylinder in a developed state.

The shutter/aperture unit 15 includes a shutter and an aperture, and a cam follower formed integrally with the shutter/aperture unit 15 is inserted into a cam groove for the shutter/aperture of the cam cylinder 26 shown in FIG. 11 and is engaged with the straight-advancement groove 25a on the second liner 25 so that the shutter/aperture unit is supported by the cam cylinder 26 and the second liner 25.

Figure 13A:
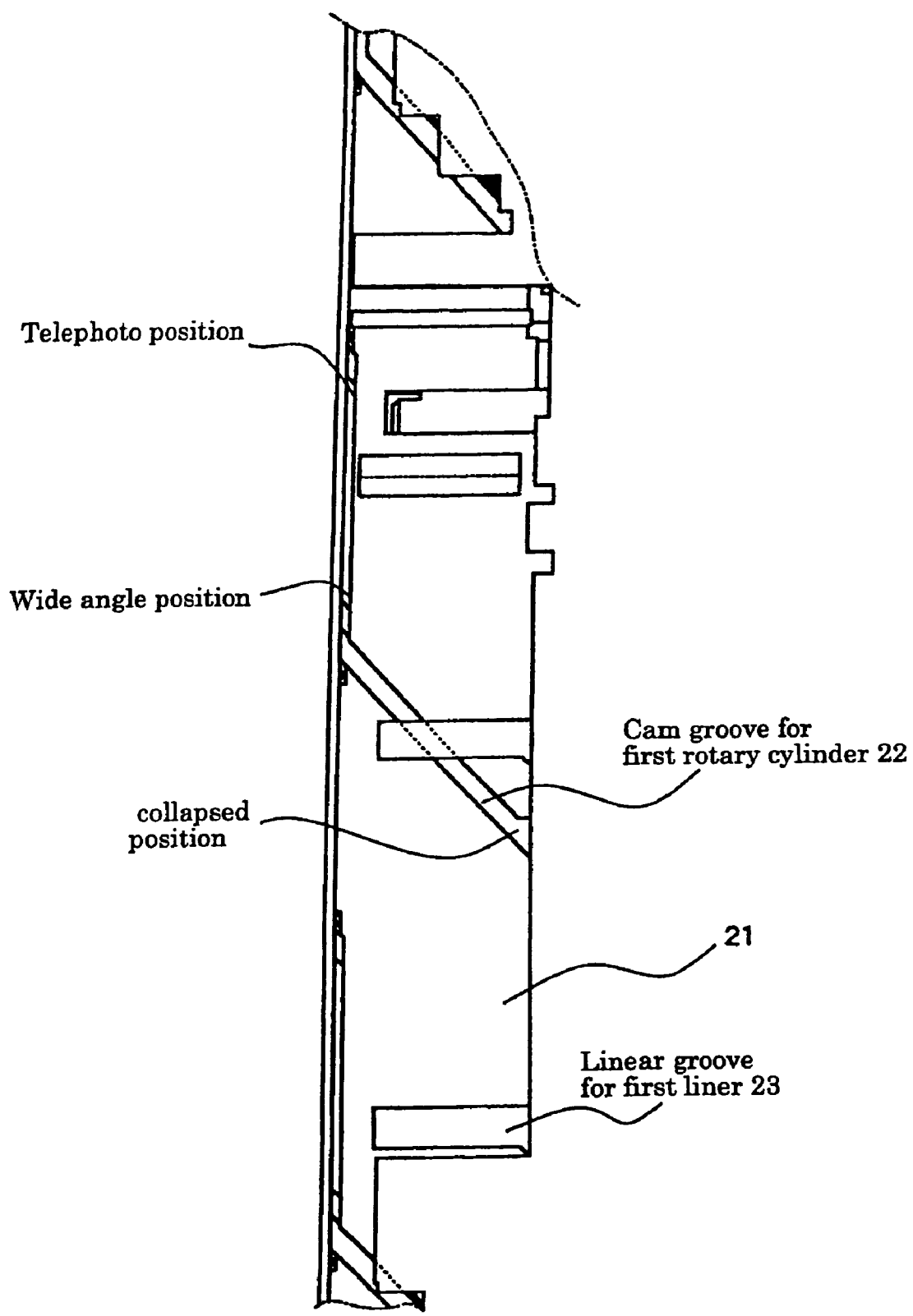
FIG. 13 is a schematic development elevational view showing a shape of cam grooves and key grooves formed on a fixed frame in a developed state with the helicoid omitted.
Figure 13B:
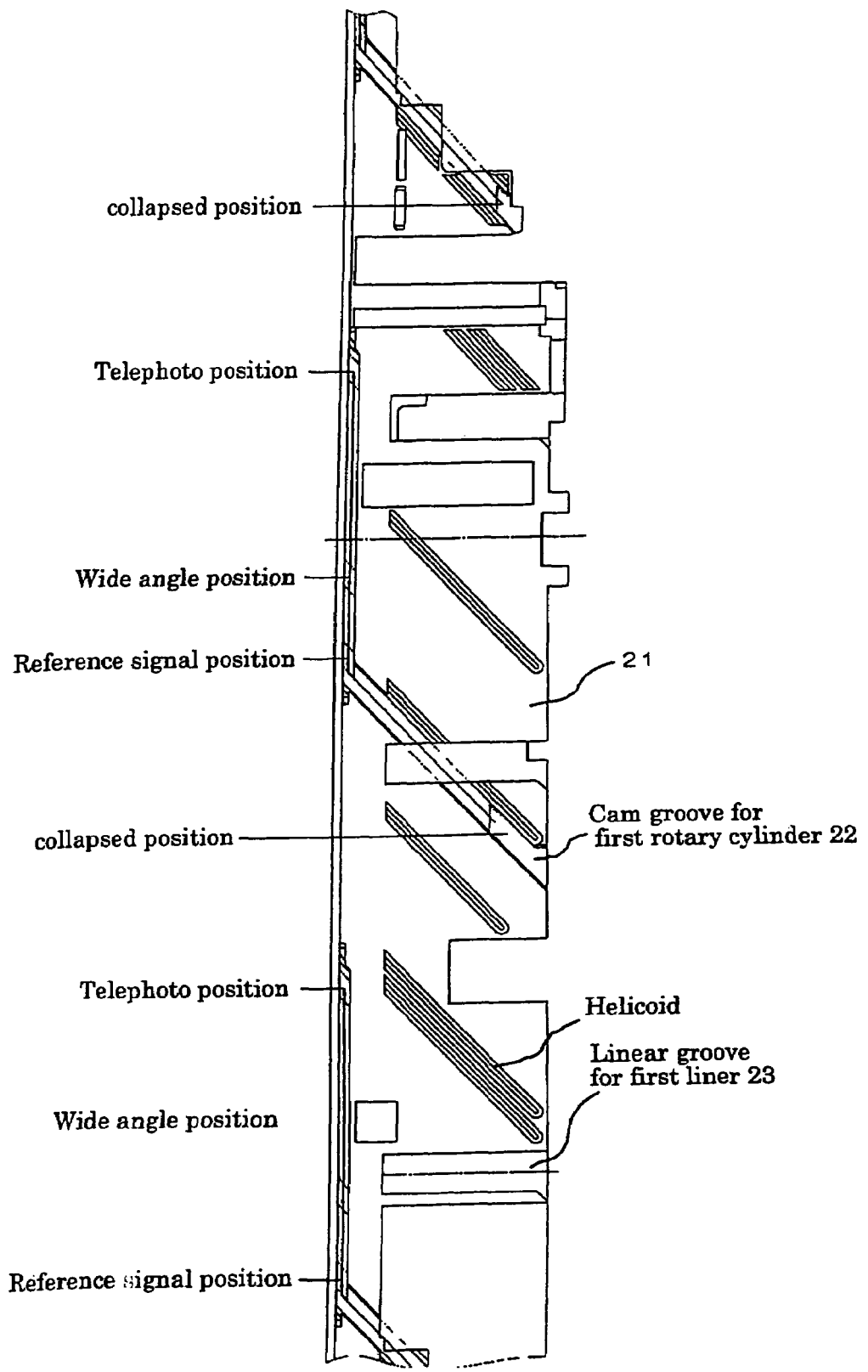
Figure 13C:
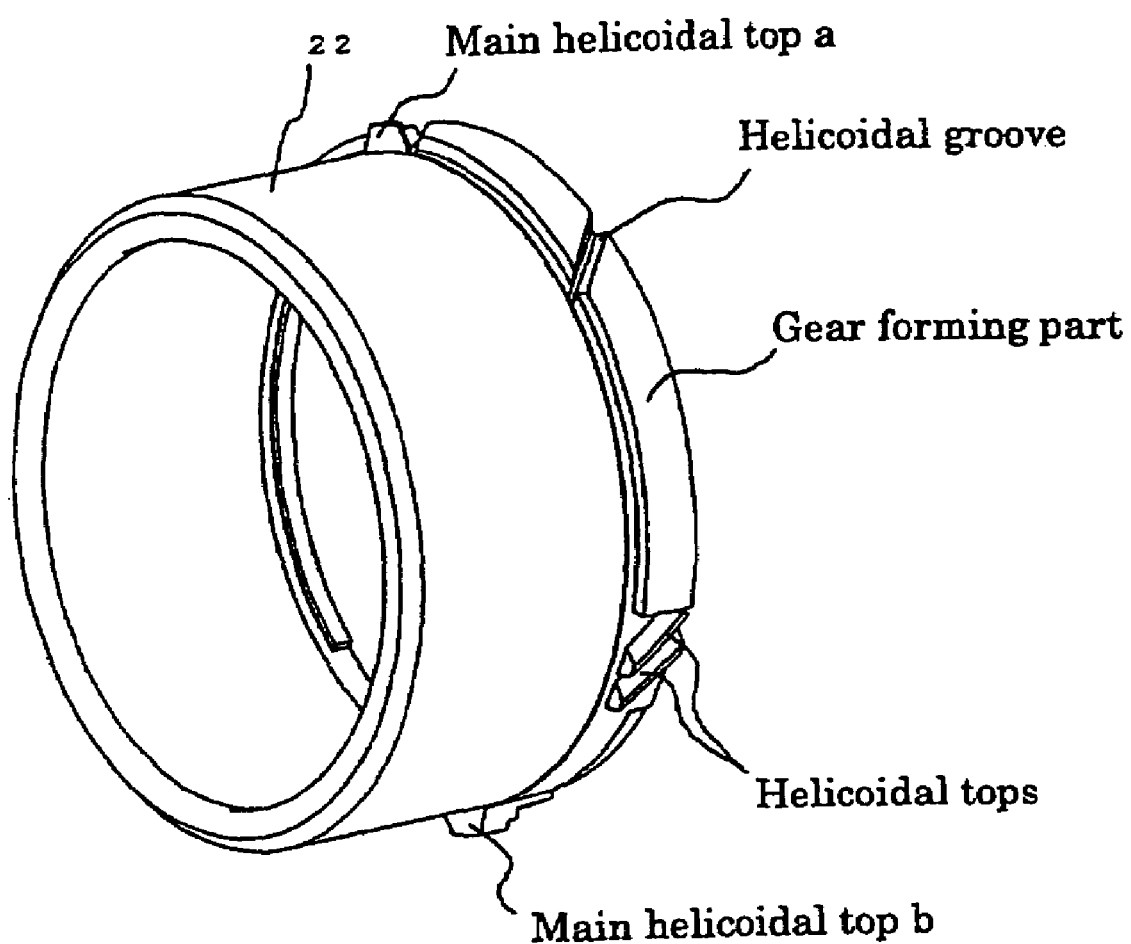

The fixed lens cylinder 21a includes a cylindrical part having an inner surface which is formed with a straight-advancement groove and a helicoidal cam groove along an axial direction, as shown in FIGS. 13A and 13B. A helicoidal cam follower formed on an outer peripheral surface of a base portion of the first rotary cylinder 22 engages with the helicoidal cam groove, as shown in FIG. 13C, and a key portion formed on an inner surface of a base portion of the first liner 23 engages with the straight-advancement groove of the fixed cylinder of the fixed lens cylinder 21a. An inner surface of the first rotary cylinder 22 is formed with a guide groove extending along a plane transverse to the optical axis X. Engaged with the guide groove is a follower or key which is formed to project from the outer peripheral surface of the first liner 23 in the vicinity of the base portion thereof and acts as a straight-advancement member.

An inner surface of the first liner 23 is formed with a linear groove along the optical axis and a helicoid, in addition, the first liner 23 is formed with a clearance groove in which a cam follower formed to project from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23. A cam follower formed to project from the outer peripheral surface of the second rotary cylinder 24 in the vicinity of the base portion engages with the linear groove formed in the inner periphery of the first rotary cylinder 22 through the clearance groove of the cam follower on the first liner 23. A key portion formed to project from the outer peripheral surface of the base portion of the second liner 25 engages with the linear groove provided on the inner peripheral surface of the first liner 23.

An inner surface of the second rotary cylinder 24 is provided with a guide groove along a plane transverse to the optical axis X, a follower or key provided to project from the outer peripheral surface of the second liner 25 is engaged in the guide groove of the second rotary cylinder 24. With such a structure, the second liner 25 moves with the second rotary cylinder 24 in the movement along the optical axis X, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24. The inner surface of the second liner 25 is provided with a guide groove along a surface transverse to the optical axis X, and a follower or key provided on the outer peripheral surface (front side) of the cam cylinder 26 engages with the cam groove. With such a structure, the cam cylinder 26 moves with the second liner 25 in the movement along the optical axis X, while is rotatable relative to the second liner 25.

The base portion of the straight-advancement cylinder 27 is inserted between the second rotary cylinder 24 and the second liner 25, and a cam follower is formed to project from the outer peripheral surface of the straight-advancement cylinder 27 in the vicinity of the base portion, and the cam follower engages with the cam groove formed in the inner peripheral surface of the second rotary cylinder 24. A straight-advancement groove is formed on the inner peripheral surface of the straight-advancement cylinder 27 along the axial direction, and the key portion formed on the outer peripheral surface of the second liner 25 engages with the straight-advancement groove.

A gear portion is formed on the outer periphery of the base portion of the first rotary cylinder 22, the gear portion is engaged with one or more gears which are driven by a zooming motor 51 so that a drive force of the zooming motor 51 is transmitted to the gear portion via the gears, whereby the first lens group 11, the second lens group 12, and the shutter/aperture unit 15 are zoomed in a predetermined manner. The zooming motor comprises a usual DC motor in the embodiment.

Figure 10:
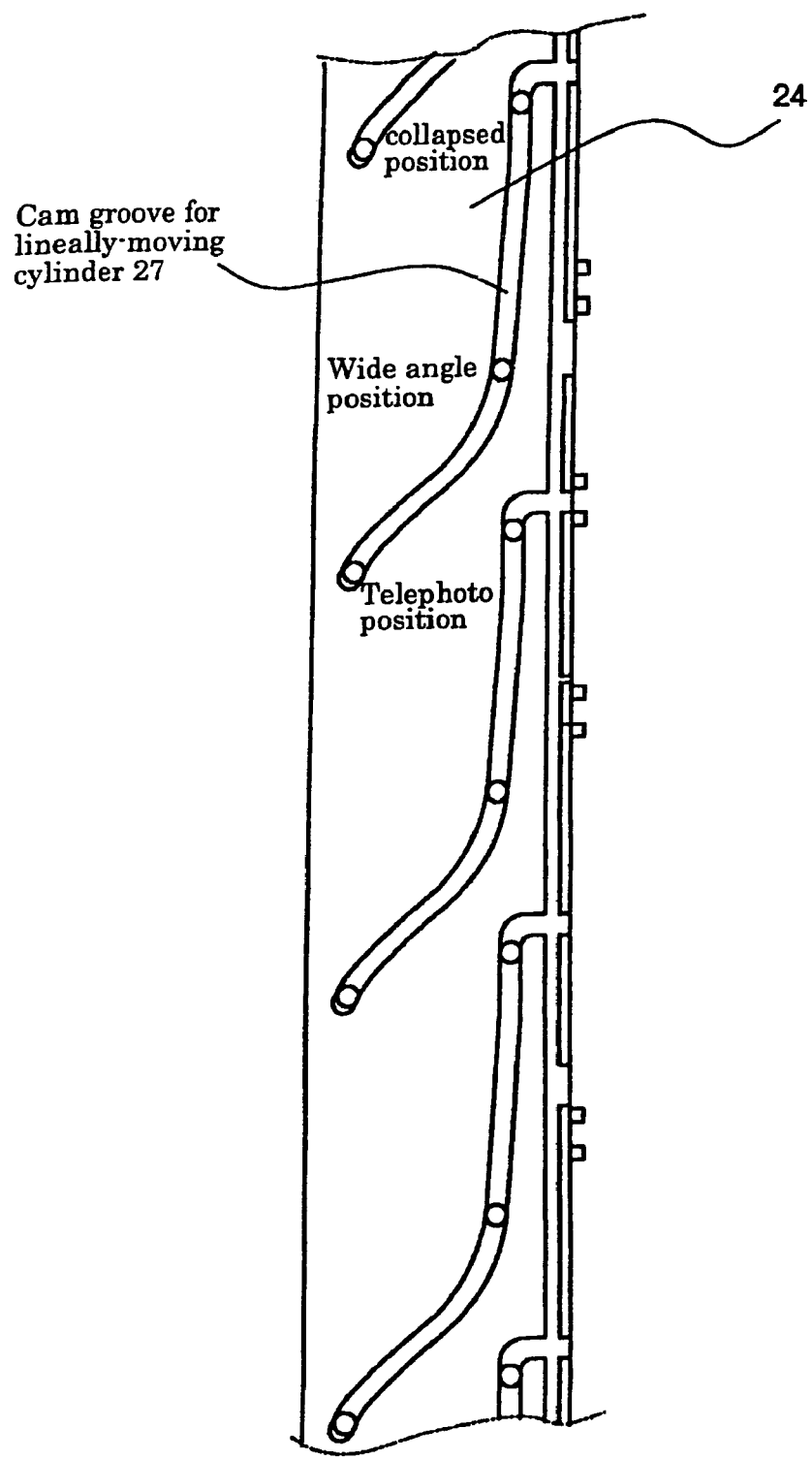
FIG. 10 is a schematic development elevational view showing a shape of cam grooves formed on a second rotary cylinder in a developed state.

Meanwhile, the cam groove on the second rotary cylinder 24 engaging with the cam follower on the straight-advance cylinder 27 is shown in FIG. 10.

The cam groove on the cam cylinder 26 which engages with the cam follower on the lens retaining frame of the second lens group 12 and the cam groove of the cam cylinder 26 which engages with the cam follower of the shutter/aperture unit 15 are shown in FIG. 11, respectively.

Figure 12:
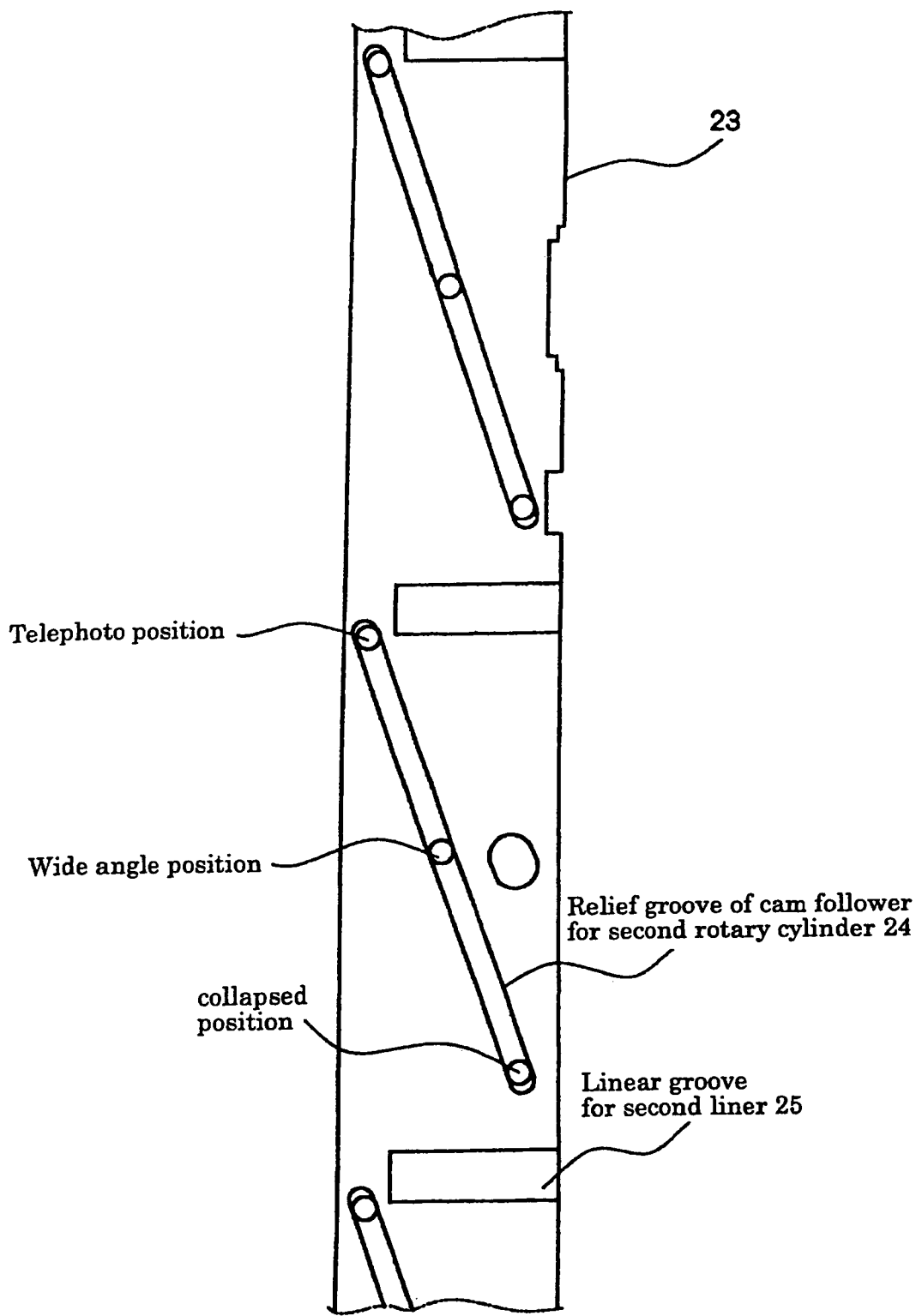
FIG. 12 is a schematic development elevational view showing a shape of cam grooves and key grooves formed on a first liner in a developed state with a helicoid omitted.

The cam groove on the first liner 23 which engages with the cam follower of the second rotary cylinder 24 and the straight groove on the first liner 23 which engages with the key groove on the second liner 25 are shown in FIG. 12, respectively.

A straight-advancement groove on the fixed frame 21 engaging with the key portion of the first liner 23 of the fixed cylinder and the cam groove of the fixed lens cylinder 21a engaging with the cam follower of the first rotary cylinder 22 are shown in FIG. 13, respectively.

Generally, the rotary cylinder, which is the closest to the fixed cylinder and positioned on the outermost circumference is generally screwed onto the fixed cylinder through a helicoid, and the helicoid is configured to move the rotary cylinder at a constant speed relative to the fixed cylinder. Therefore, the rotary cylinder is in a half-extended state out of the fixed cylinder in a short-focus/wide angle in a course in which the rotary cylinder is moved gradually from the collapsible position through the short-focus/wide angle position to a long-focus/telescopic position. On the contrary, in the structure described above, the first rotary cylinder 22 adjacent to the fixed cylinder is threaded with the fixed cylinder of the fixed lens cylinder 21a via the cam groove of the helicoidal shape without a simple helicoidal connection. The first rotary cylinder 22 is moved completely to the maximally extended position by being driven from the collapsible or stored position to the short-focus/wide angle position. Thereafter, as shown in FIG. 13, because the subject side end of the cam groove lies in parallel with the end surface of the fixed cylinder, the first rotary cylinder 22 rotates at a constant position without moving along the optical axis X during driving from the short-focus/wide angle position to the long-focus/telescopic position.

In addition, the third lens group 13 is retracted out of the optical axis X in the collapsible position, in which the lens groups are stored in the fixed lens cylinder 21a, as shown in FIG. 9. The third lens group 13 is moved onto the optical axis X in an extended position of the lens groups.

As the first rotary cylinder 22 is moved from the collapsible position to short-focus/wide angle position, it is extended toward the subject, while rotating in an early stage of the drawing out action and when it reach the maximally extended position, a zoom position-detector which is provided on the fixed lens cylinder 21a and comprising a photo-reflector, photo-interrupter, leaf switch or the like, for example, generates a zoom position-reference signal. Therefore, when the zoom position-reference signal generates, because it may be determined that the first rotary cylinder 22 reaches the maximally extended position, it is possible to initiate to move the third lens group-retaining frame 31 onto the optical axis X.

Consequently, a space between the second lens group 12 and the fourth lens group 14 to insert the third lend group 13 into the optical axis X can be secured previously by completely drawing out the first rotary cylinder 22 and the first liner 23 adjacent to the fixed cylinder at the earlier step of the drawing out action.

As described below, as soon as the first rotary cylinder 22 reaches the maximally extended position, the zoom position-reference signal generates, the space for inserting the third lens group is secured, and immediately, the insertion of the third lens group is initiated. Therefore, a time from the collapsible position when an electric source is turned on to the short-focus/wide angle position can be very shortened.

Figure 1:
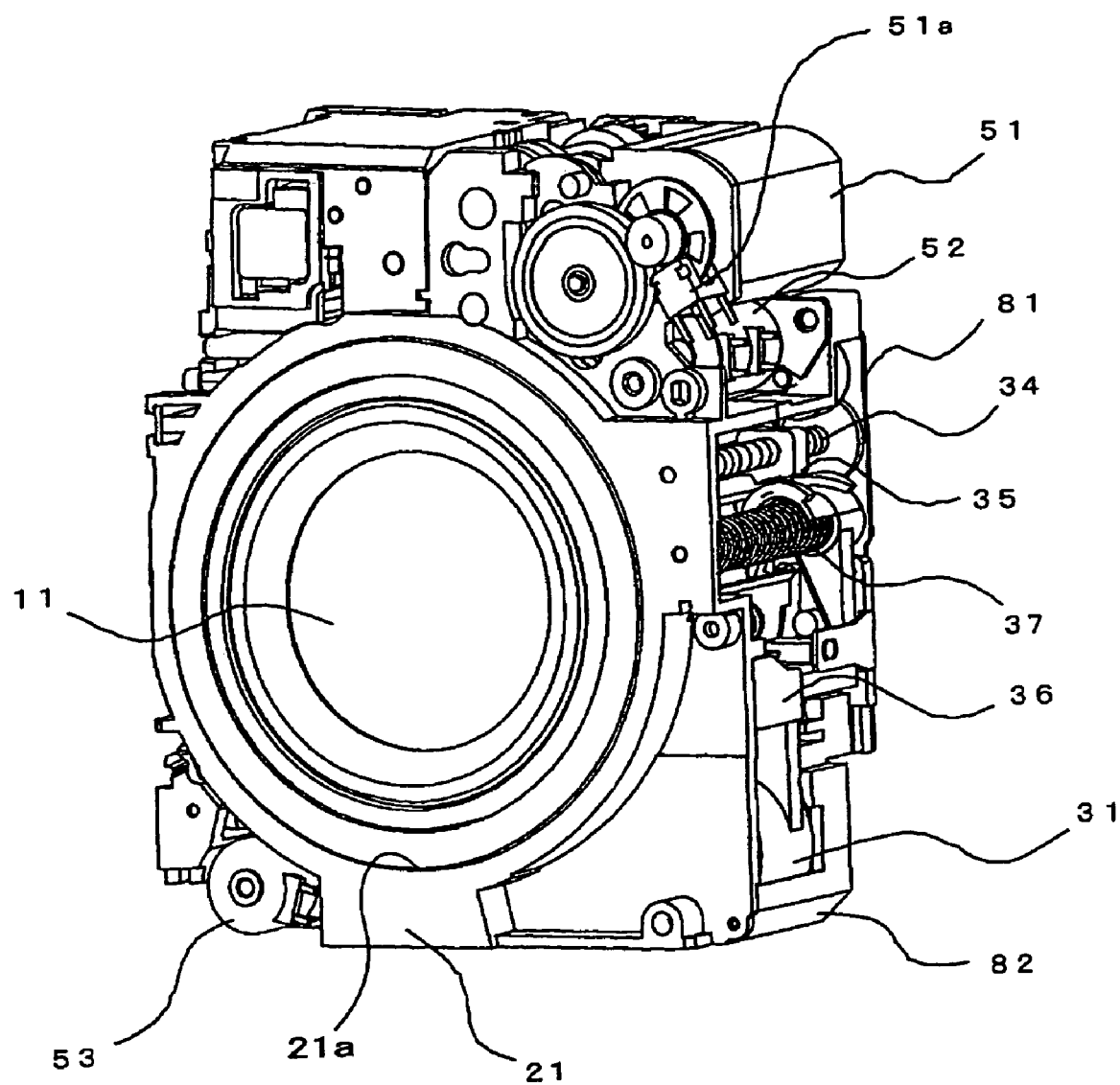
FIG. 1 is a perspective view showing a structure of a main part of an optical system device including a lens barrel according to a first embodiment of the present invention are collapsed or stored and retracted, as view from a subject.
Figure 2:
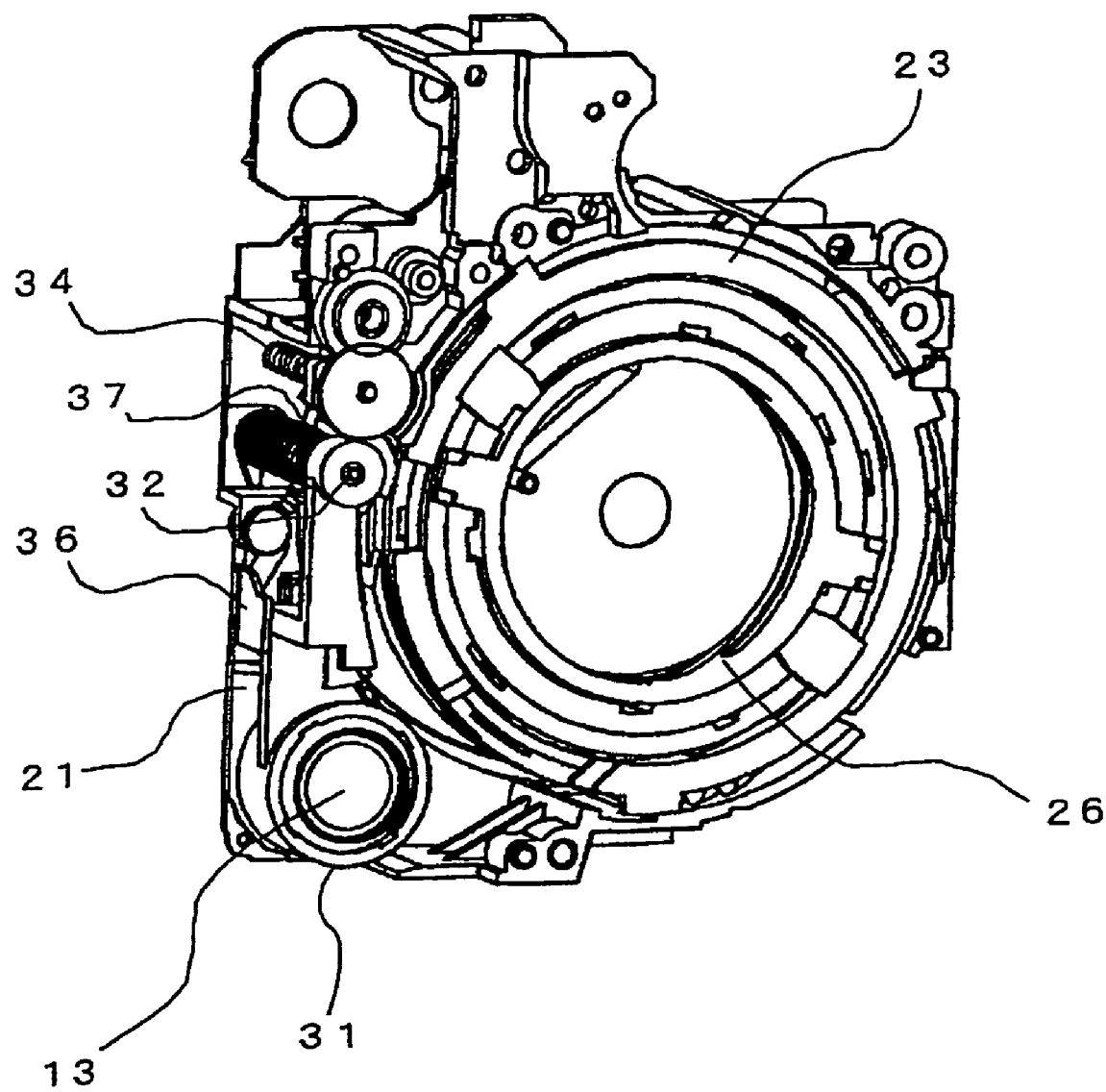
FIG. 2 is a perspective view showing the main part of the lens barrel shown in FIG. 1, as viewed from an imaging plane.
Figure 8:
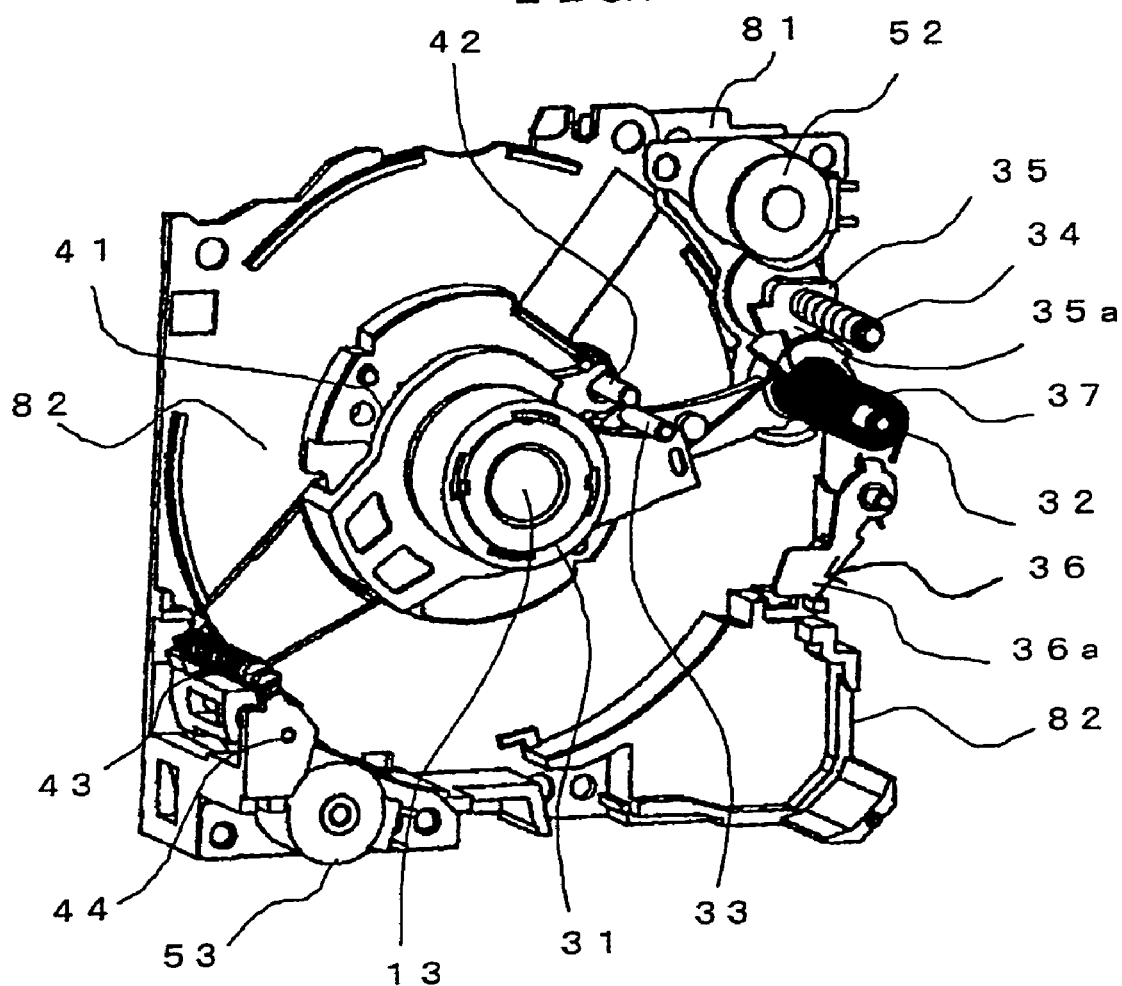
FIG. 8 is a perspective view of a layout of the third lens group frame, the impact preventing strip, and the fourth lens group frame for explaining operations of the third lens group frame, which retains the third lens group, and the impact-preventing strip in the photographing state with the lens groups projected, as viewed from the subject.

As described above, the retractable third lens group 13 is retained to the third lens group-retaining frame 31. The third lens group-retaining frame 31 retains the third lens group 13 at one end thereof, and the other end of the third lens group-retaining frame 31 is supported by a third group main-guide shaft 32 which extends substantially in parallel with the optical axis of the third lens group 13 so as to be capable of rotating, and sliding along the third group main-guide shaft 32. The third lens group-retaining frame 31 is rotatable about the third group main-guide shaft 32 between a setting position in which the third lens group 13 is disposed onto the optical axis in a photographing state, as shown in FIG. 8 and the retracted position in which the third lens group 13 is retracted out of the fixed cylinder of the fixed frame 21, as shown in FIG. 2.

In the vicinity of the third lens group 13 on the side of the rotating end of the third lens group-retaining frame 31, a crank-shaped bent portion 31g for differentiating the position of the third lens group 13 in the direction parallel with the main guide shaft between the side of the rotation axis and the side of the supporting portion, a stopper 31a (FIG. 15) and a light-shielding strip 31b are provided on the rotating end to project from the bent portion substantially toward the rotating end.

On the optical performance, in order to lengthen a focus length in the telescopic state, a position of the third lens group 13 in the telescopic state is in an extended position closer to the subject. However, a possible moving amount of the third lens group-retaining frame 31 is determined by limitation of a length of the lens barrel in the collapsible state along the optical axis X. It is possible to maximize the focus length in the telescopic state by setting a position for retaining the third lens group by the third lens group-retaining frame 31 in the closest position to the subject. However, if a position of the stopper 31a along the optical axis sets on the generally same position as the third lens group 13, a length of a third group sub-guide shaft 33 is longer and a size of the lens barrel in the collapsible position becomes greater. Therefore, it is required that the stopper 31a is set on a side of a focusing position and the third lens group-retaining frame 31 is formed into a shape having the crank-shaped bent portion.

Meanwhile, the third lens group-retaining frame 31 may be formed from two parts and in this case, one is a member having the crank-shaped bent portion, the other is a member for retaining the third lens group 13. The two parts operates integrally by being fixed together.

Figure 14A:
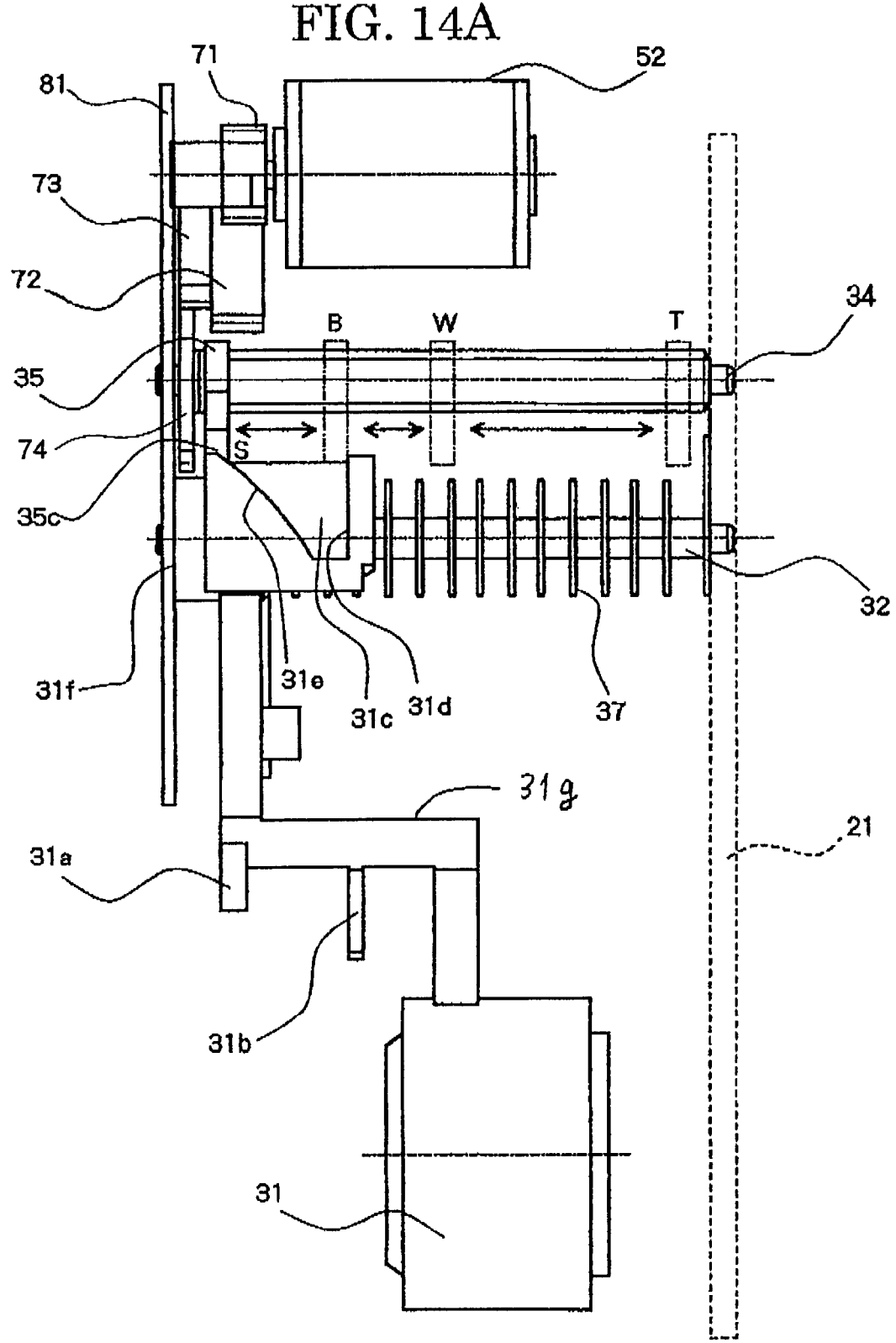
FIG. 14 is a side view showing a structure of the third lens group frame and its drive system.
Figure 14B:
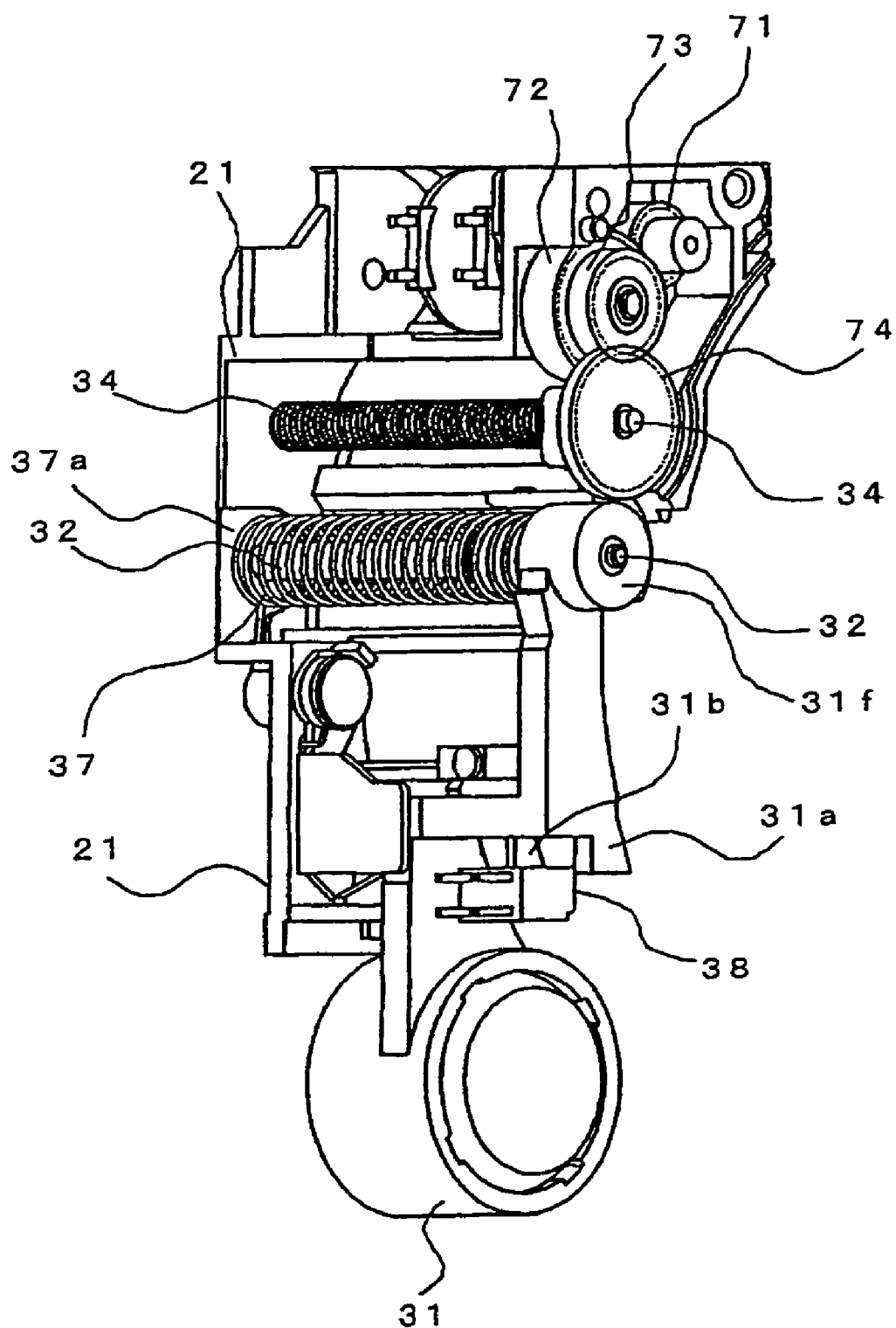
Figure 15:
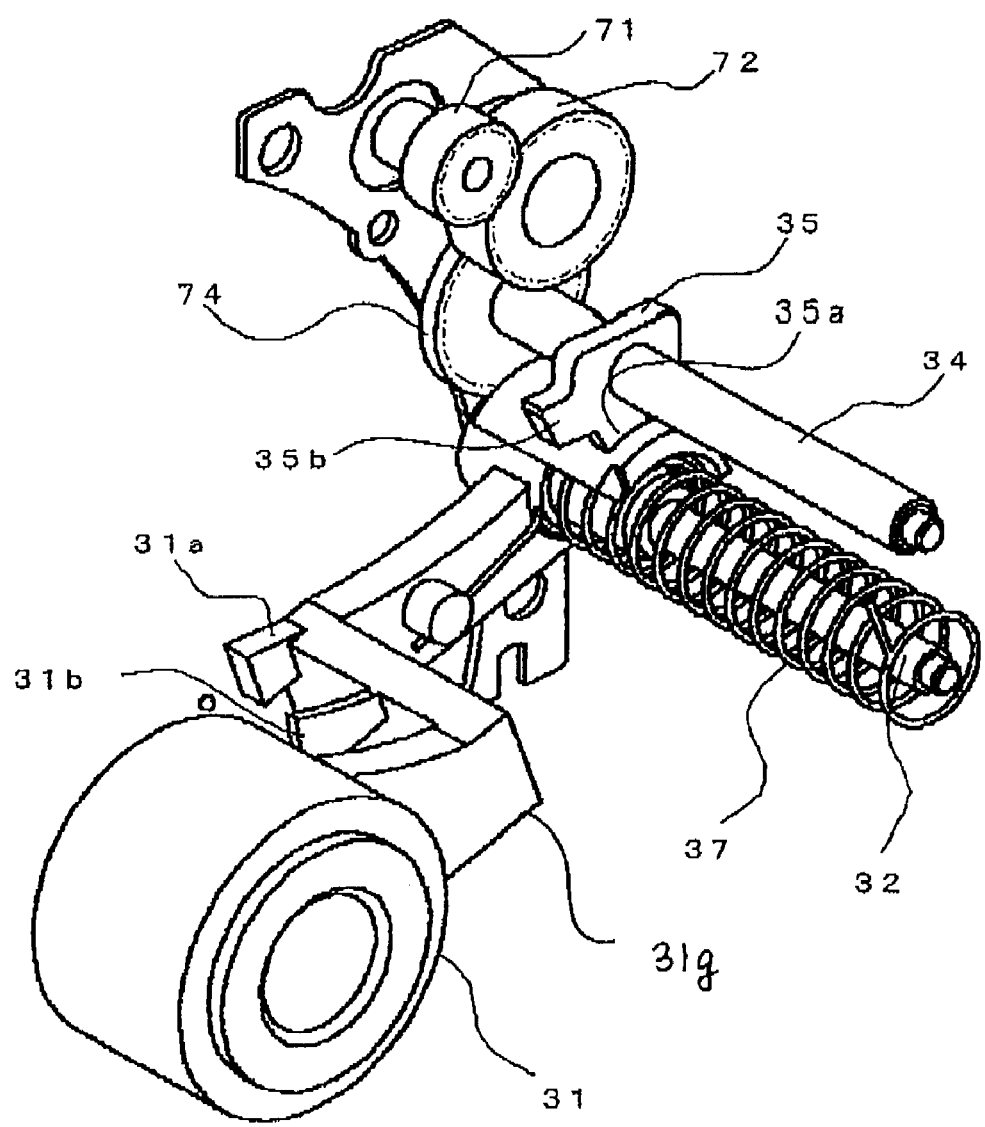
FIG. 15 is a perspective view showing the structure of the third lens group frame and its drive system.

As shown in FIGS. 14A and 14B, a female screw member 35 screwed on a third group lead screw 34 is positioned in the closest position to an image plane of the CCD in the retracted state in which the third lens group-retaining frame 31 is retracted. In this state, a compression torsion spring 37 is charged or compressed fully so as to impart constantly a clockwise moment as viewed from the front of the lens barrel to the third lens group-retaining frame 31.

A cylindrical outer peripheral surface of a supported part 31g provided on the main-guide shaft 32 for the third lens group-retaining frame 31 is provided with a stepped portion 31c, and a cam portion 31e disposed inside the stepped portion 31c and formed from an inclined surface, as shown in FIG. 14A.

From this state, when a third group motor 52 is rotated clockwise as viewed from the front of the lens barrel, the third group lead screw 34 is rotated clockwise through a gear mechanism including gears 71 to 74, and the female screw member 35 moves toward the subject along the optical axis X. At this time, the third lens group-retaining frame 31 is rotated clockwise by a moment force of the compression torsion spring 37, the cam portion 31e engages with an abutting portion 35a provided on the female screw member 35.

Thereafter, when the female screw member 35 is moved in the closest position to the subject, the light-shielding strip 31b of the third lens group-retaining frame 31 is moved to a position out of a photo-interrupter 38 as a device for detecting a position of the third lens group, thereby the photo-interrupter 38 generates a reference signal in a range from L or a low level to H or a high level. Accordingly, a position of the third lens group 13 is controlled by pulse count based on the reference signal from the photo-interrupter 38.

Figure 16A:
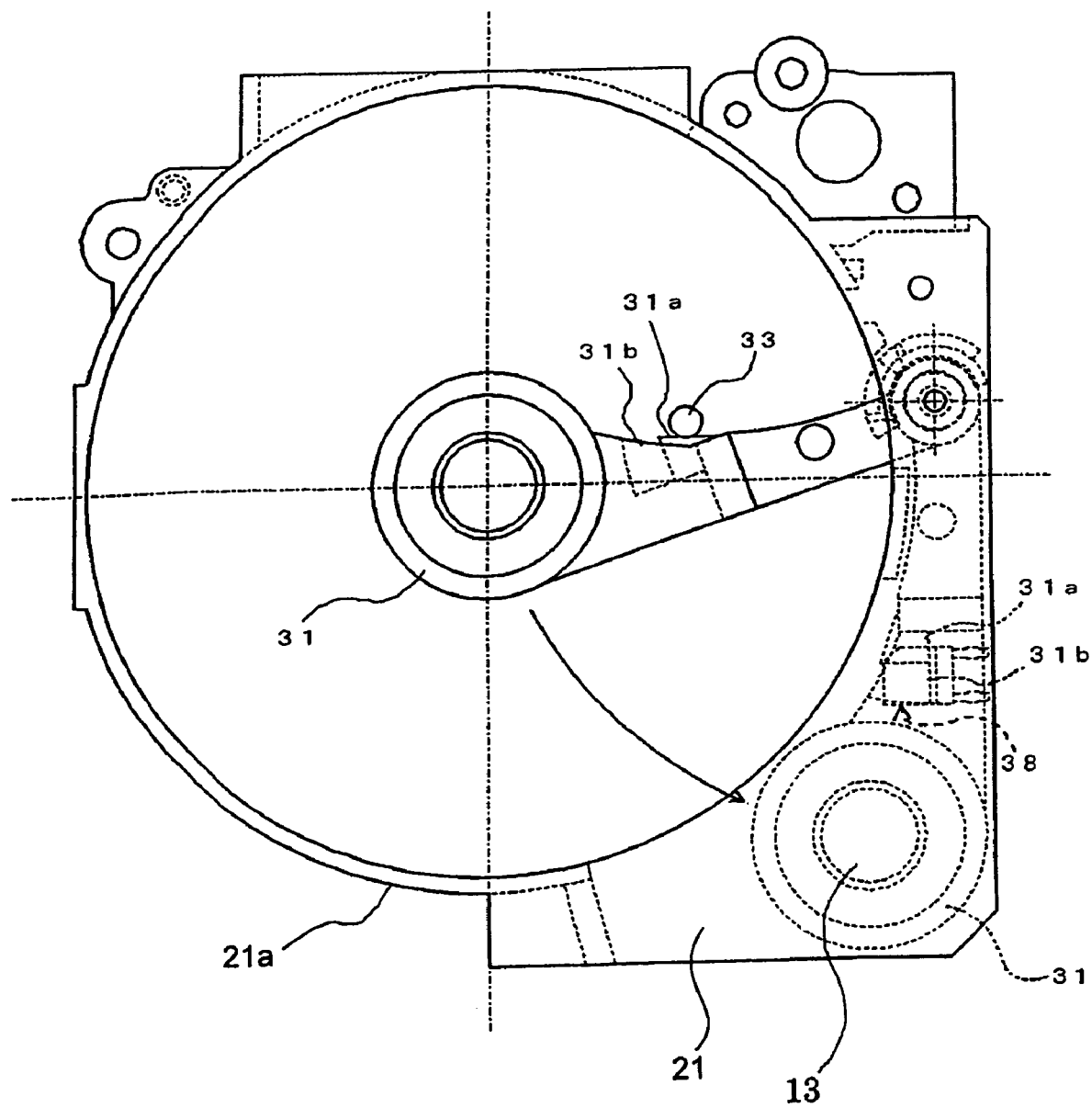
FIG. 16 is a back view of the third lens group frame portion for explaining operation of the third lens group frame, as viewed from the imaging plane.

From this state, when the female screw member 35 is moved to a retract-initiating position B of the third lens group-retaining frame 31, as shown in FIG. 14A, the third lens group-retaining frame 31 further rotates clockwise, the stopper 31a comes into abutment with the third group sub-guide shaft 33 as shown in FIGS. 8 and 16A, as a result, a position of the third lend group-retaining frame 31 on the optical axis is determined. Consequently, approach operation of the third lens group 13 to the optical axis is completed. In the retract-initiating position B, the third lens group-retaining frame 31 is movable toward the retracted position S.

Figure 16B:
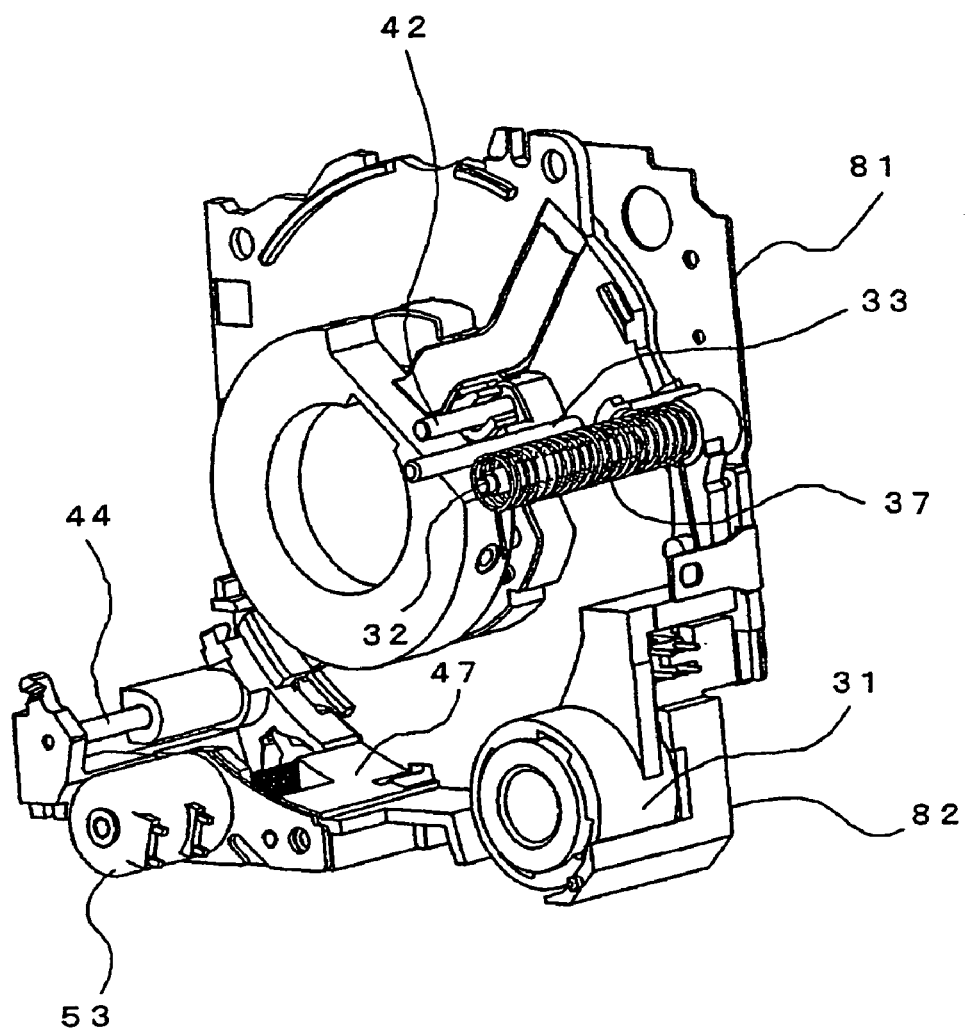

Meanwhile, the light-shielding strip 31b shields the photo-interrupter 38 shown in FIG. 16 A so that it is possible to confirm that the third lens group-retaining frame 31 is in the retract-initiating position B. When the female screw member 35 is moved to the retract-initiating position B shown in FIG. 14A, the abutting portion 35a of the female screw member 35 contacts with a front engaging portion 31d of the stepped portion 31c of the third lens group-retaining frame 31. Again, the stepped portion 31c of the third lens group-retaining frame 31 has the cam portion 31e and the front engaging portion 31 which forms a planner surface generally perpendicular to the third group main guide shaft 32.

The third lens group-retaining frame 31 is constantly biased to move to a direction transverse to the optical axis, that is to say, from the retracted position to the optical axis and a direction along the optical axis, that is to say, from the subject to a retainer plate 81 beside the image plane by the compression torsion spring 37 provided on the third group main-guide shaft 32.

In addition, a portion of the fixed frame 21 to which the compression torsion spring 37 contacts includes a step 37a which is formed as a concave portion for inserting one end of the compression torsion spring 37, as shown in FIG. 14B, to prevent the compression torsion spring from deviating out of a center of the third group min-guide shaft 32 considerably.

Next, when the female screw member 35 is moved to a short-focus/wide angle position or wide angle position W shown in FIG. 14A, because the abutting portion 35a of the female screw member 35 presses the front engaging portion 31d, the third lens group-retaining frame 31 is movable to the wide angle position along the optical axis X toward the subject.

Moreover, while the female screw member 35 is disposed between the retract-initiating position B and a telescopic position T, as shown in FIG. 14, because the third lens group-retaining frame 31 is constantly pressed along the optical axis toward the image plane by the compression torsion spring 37, all spaces generated among the third group lead screw 34, the female screw member 35 and the retainer plate 81 are directed to the image plane, the third lens group-retaining frame 31 can secure a positional accuracy in the direction of the optical axis.

The female screw member 35 is screwed on the third group lead screw 34 disposed substantially in parallel with the optical axis. The female screw member 35 includes a rotation-preventing projection 35b in addition to the abutting portion 35a, which engages with the above-described front engaging portion 31d or the cam portion 31c of the third lens group-retaining frame 31.

The rotation-preventing projection 35b is fitted slidably into a guide groove formed on the cylindrical part of the fixed lens cylinder 21a in parallel with the optical axis as a rotation-preventing device for preventing the female screw member 35 from rotating along with the rotation of the third lead screw 34. In other words, the female screw member 35 is moved in the back and forth direction along the optical axis by the rotation of the third lead screw 34, because the female screw member 35 is prevented from rotating by the rotation-preventing projection 35*b* fitting into the guide groove of the fixed lens cylinder 21*a*.

As shown in FIG. 14A in detail, when the female screw member 35 is moved further toward the image plane (left side in the drawing) from the retract-initiating position B shown in FIG. 14A, the female screw member 35 engages with the cam portion 31*e* of the stepped portion 31*c* the third lend group-retaining frame 31.

The third lens group-retaining frame 31 comes into contact with the retainer plate 81 by a biasing force of the compression torsion spring 37 clockwise, the third lens group-retaining frame 31 is rotated counterclockwise against the clockwise biasing force exerted by the compression torsion spring 37, therefore the third lens group-retaining frame 31 can be retracted.

On the other hand, while the female screw member 35 is moved from the telescopic position T through the wide angle position W to the retract-initiating position B by the reverse rotation or counterclockwise rotation of the third group lead screw 34, because the abutting portion 35*a* of the female screw member 35 engages with the front engaging portion 31*d* of the stepped portion 31*c* of the third lens group-retaining frame 31, the third lens group-retaining frame 31 moves gradually to direct from the subject to the image plane while maintaining a position on the optical axis limited by the third group sub-guide shaft 33 by the biasing force toward the optical axis and the biasing force toward the image plane.

Meanwhile, when the female screw member 35 reaches the retract-initiating position B, a base end surface 31*f* abuts with the retainer plate 81, the female screw member 35 is disposed with an interval from the front engaging portion 31*d* and contacts with the cam portion 31*e* of the stepped portion 31*c*.

While the female screw member 35 moves from the retract-initiating position B to the stored position S, the abutting portion 35*c* of the female screw member 35 comes into sliding contact with the cam portion 31*e* of the stepped portion 31*c* of the third lens group-retaining frame 31 and rotates the third lens group-retaining frame 31 against the rotational biasing force exerted by the compression torsion spring 37, whereby the third lens group-retaining frame 31 moves from the position on the optical axis to the stored position S. The stored position S of the third lens group-retaining frame 31 corresponds to a position at which it is moved toward the image plane by a predetermined pulse count number after the generation of the reference signal of the range from the H to the L generated from the photo-interrupter 38. After the third lens group-retaining frame 31 is moved to the stored position S, the first lens group 11, the second lens group 12, and the shutter/aperture unit 15 are moved to the collapsible or stored position.

In this example, before the third lens group-retaining frame 31 is moved to the stored position S, a fourth lens group-retaining frame 41 is first moved to the stored position. A first stored position of the fourth lens group-retaining frame 41 corresponds to a position at which it is moved toward the image plane by a predetermined pulse count number after the generation of a storage reference signal of a range from the H to the L generated by a fourth group reference detector or fourth group photo-interrupter 47. After the fourth lens group-retaining frame 41 reaches the first stored position, the stored operation of the third lens group-retaining frame 31 is initiated.

That is to say, the female screw member 35 moves toward the image plane by a predetermined pulse count number from the generation of the stored reference signal from the H to the L by the photo-interrupter 38 (see FIG. 16A) and the stored operation of the third lens group-retaining frame 31 is completed. After the completion of the stored operation of the third lens group-retaining frame 31, the first rotary cylinder 22 and structural parts disposed inside the first rotary cylinder 22 and the first liner 23 and so on are stored before contacting with the third lens group-retaining frame 31. This results in the storage of the first rotary cylinder 22 and so on without interfering with the third lens group-retaining frame 31.

Positions of the first rotary cylinder 22 and so on can be set by a drive pulse count generated by a zoom count detector comprising a pinion gear attached directly to an output shaft of the zooming motor 51 and having an encoder structure and for example, a photo-interrupter 51*a* disposed adjacent the pinion gear, for example.

Meanwhile, although the DC motor is used as the drive source for moving the first rotary cylinder 22 and the drive position of the first rotary cylinder 22 is detected by the detector comprising the encoder and the photo-interrupter, in the above-mentioned example, the similar function can be accomplished by substituting a pulse motor structure for the whole of the above-mentioned structure.

Figure 7:
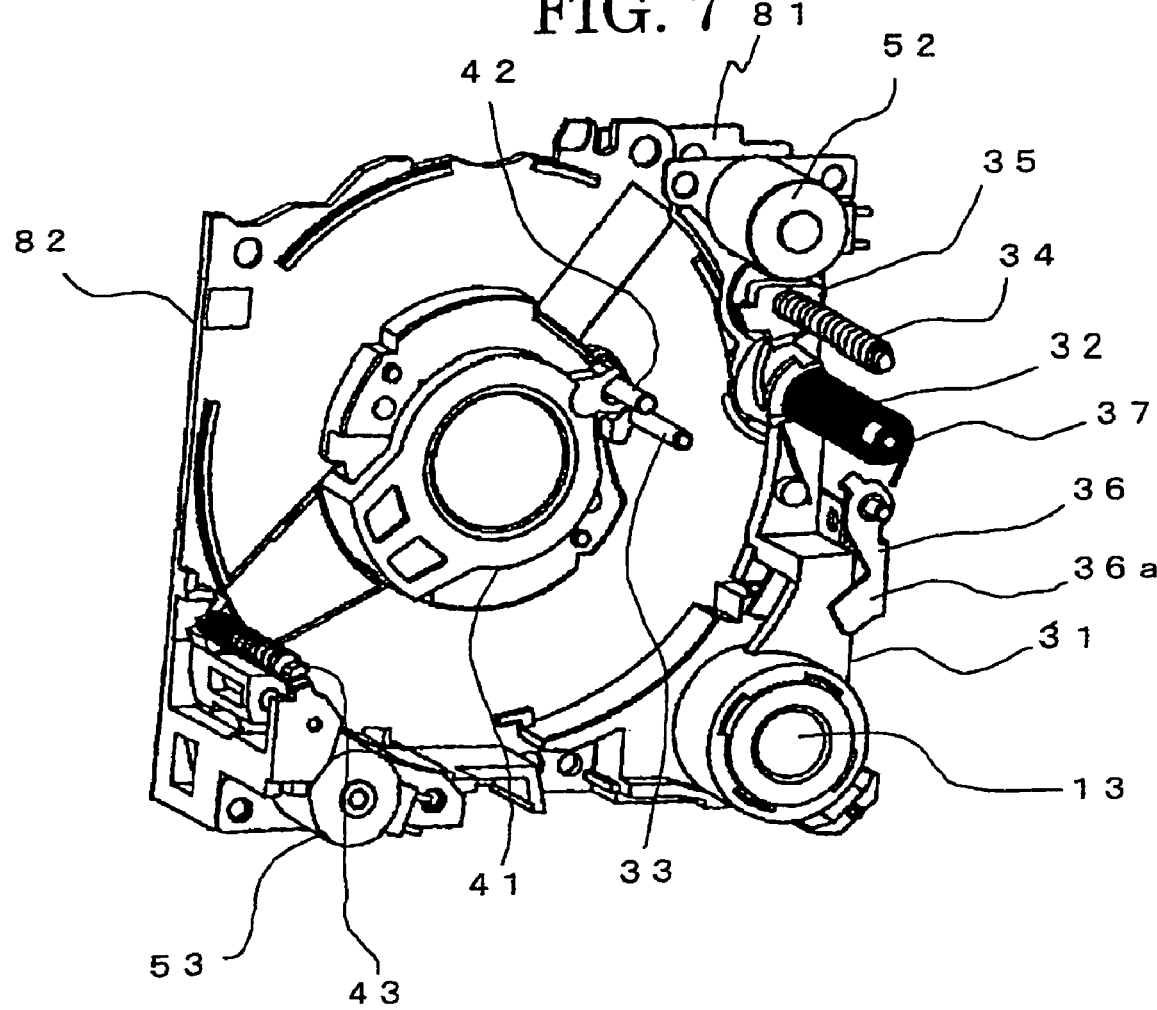
FIG. 7 is a perspective view of a layout of a third lens group frame, an impact preventing strip, and a fourth lens group frame in a state in which the lens groups are in the stored state, for explaining operations of the third lens group frame which retains the third lens group and the impact preventing strip, as viewed from the subject.

To prevent the third lens group-retaining frame 31 from collision with the other parts, an impact-preventing strip 36 is, as shown in particular in FIGS. 2 and 7, rotatably supported on the fixed lens cylinder 21*a* in the vicinity of the third group main-guide shaft 32 and includes a rotated portion provided at one end of the impact-preventing strip and an engaging projection 36*a*. The impact-preventing strip 36 is constantly biased to cause the engaging projection 36*a* to move toward the optical axis X by a spring or the like.

When the third lens group-retaining frame 31 is positioned in the stored position, the impact-preventing strip 36 is pushed out by a rotating force of the third lens group-retaining frame 31 against a biasing force of the spring, and is deviated outside the third lens group-retaining frame 31 (see FIG. 2 and FIG. 7, specifically).

When the third lens group-retaining frame 31 is rotated and positioned on the optical axis, the impact-preventing strip 36 is released from engagement with the third lens group-retaining frame 31, and is rotated to cause the engaging projection 36*a* to be projected toward the optical axis X by the biasing force, thereby causing the engaging projection 36*a* to project from the inner surface of the fixed cylinder of the fixed lens cylinder 21*a*. At this time, in addition to the first rotary cylinder 22 and the first liner 23, the second rotary cylinder 24, the second liner 25, the cam cylinder 26 and the straight-advancement cylinder 27 are all positioned on the subject side with respect to the projected position of the engaging projection 36*a*. Therefore, the engaging projection 36*a* is positioned to project inwardly of an outer peripheral edge of the base portion of each of the first rotary cylinder 22 and the first liner 23 (see FIG. 5, FIG. 6, and FIG. 8, specifically).

With such a structure, even if an operator rotates the first rotary cylinder 22 manually forcibly and moves it to the stored position, the impact-preventing strip 36 first contacts with the first rotary cylinder 22. Therefore, because the base portion of the first rotary cylinder 22 cannot be moved toward the image plane than the position of the impact-preventing strip 36 along the optical axis, the first rotary cylinder 22 is prevented from contacting with the third lens group-retaining frame 31. Accordingly, it is possible to accomplish the prevention of breaking, damage or the like of the third lens group-retaining frame 31 due to a strength external force.

In addition, the first rotary cylinder 22 can be first moved to the stored position after the third lens group-retaining frame 31 is moved to the stored position correctly. Therefore, in a used or photographing state of the lens barrel, in which the movable cylinders such as the first rotary cylinder 22 and so on are extended, when a great pressure is exerted on a leading end of the lens barrel and so on by a drop of the lens barrel or the like, the engaging projection 36a of the impact-preventing strip 36 engages with the first rotary cylinder 22 and the first liner 23, and hence further retraction of the first rotary cylinder 22 and the first liner 23 (as well as the second rotary cylinder 24, the second liner 25, the cam cylinder 26, and the straight-advancement cylinder 27) toward the third lens group 13 is prevented, so that the third lens group-retaining frame 31 and the third lens group 13 are prevented from being damaged.

The third group lead screw 34 is rotated in forward and reverse directions by a third group motor 52. The rotation of the third group motor 52 is transmitted to the third group lead screw 34 via gears 71, 72, 73, and 74 arranged in sequence.

Next, a drive structure of the fourth lens group 14 is explained with reference to FIGS. 7, 8, 20A and 20B.

Figure 20A:
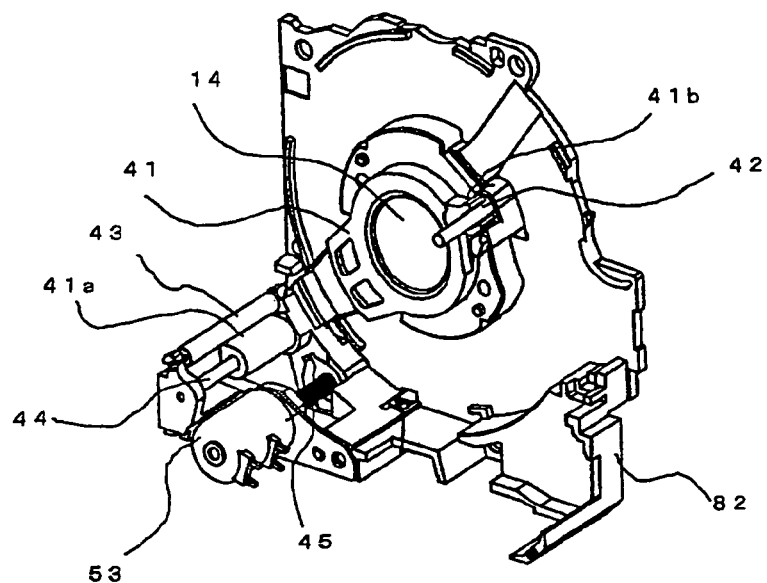
FIG. 20 is an exploded perspective view of a structure of a lens barrel portion in a state that lens groups of a camera according to a third embodiment of the present invention are partly protruded and a structure of a front cover of the camera in a state that a lens barrier is halfway closed, as viewed from the imaging plane.
Figure 20B:
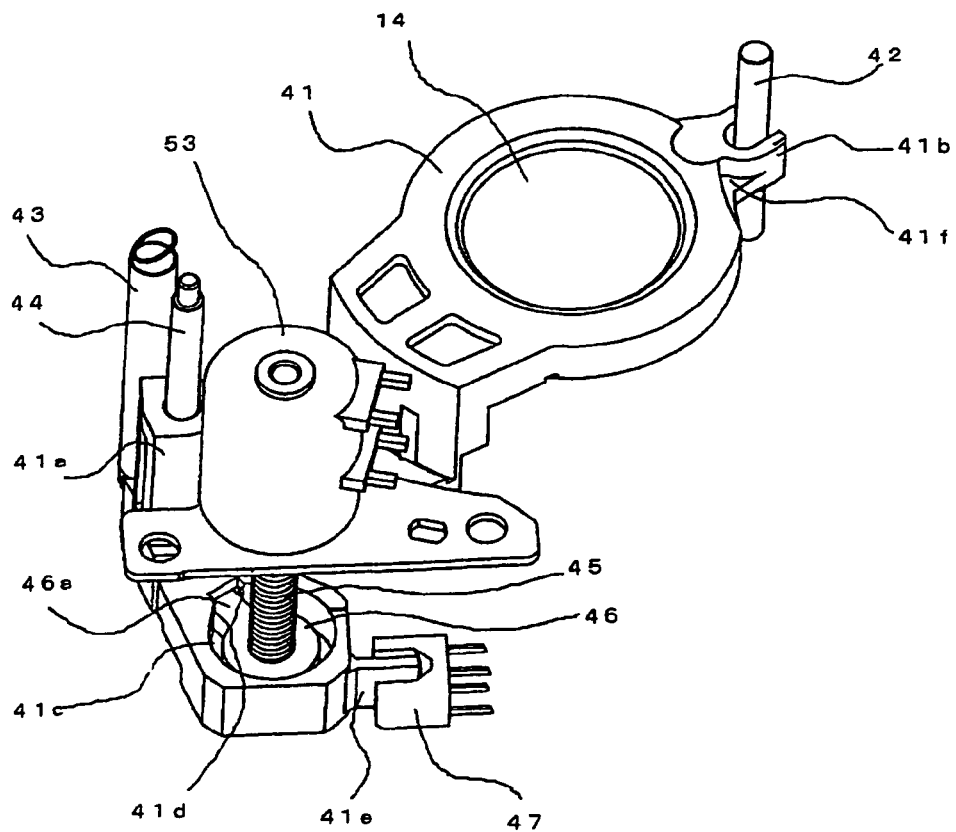

The fourth lens group 14 used as a focusing lens for focusing the lens groups in the illustrated embodiment is retained by the fourth lens group-retaining frame 41, as shown in FIGS. 20A and 20B. The fourth lens group-retaining frame 41 includes a sleeve portion 41a in which the fourth group main-guide shaft 44 disposed in parallel with the optical axis and fixed to a lens barrel base 82 is fitted, and a rotation-preventing portion 41b in which the fourth group sub-guide shaft 42 disposed in parallel with the optical axis and fixed to the lens barrel base 82 is fitted, to limit the rotation of the fourth lens group-retaining frame 41. With such a structure, the fourth lens group-retaining frame 41 can be moved freely along the fourth group main-guide shaft 44 or the optical axis. A fourth group motor 53 comprising a stepping motor is used as a drive source for driving the fourth lens group-retaining frame 41 in the illustrated embodiment. Provided on an output shaft of the fourth group motor 53 is a fourth group lead screw 45 which is threaded into a threaded hole provided in a fourth group female screw member 46.

The fourth lens group-retaining frame 41 has an opening for inserting the fourth group female screw member 46. The opening has an engaging portion 41c for engaging with the fourth group female screw member 46 in a perpendicular plane to the optical axis in a side of the image plane. The fourth lens group-retaining frame 41 is always engaged with the fourth group female screw member 46 by allowing the fourth lens group-retaining frame 41 to bias to the subject by a fourth group spring 43.

The fourth group female screw member 46 has a radially projected protrusion 46a. The protrusion 46a is engaged in a bore 41d provided in one side of the opening for inserting the fourth group female screw member 46 of the fourth lens group-retaining frame 41 so that the rotation of the fourth group female screw member 46 is stopped.

In this way, when the fourth group motor 53 which is the stepping motor is driven, the fourth group lead screw 45 rotates, the fourth group female screw member 46 is moved in the forward and reverse directions along an axis of the fourth group lead screw 45 or the optical axis X. Because the fourth lens group-retaining frame 41 engages with the fourth group female screw member 46, the fourth lens group-retaining frame 41 is moved along the optical axis following to the movement of the fourth group female screw member 46. In this case, although the fourth group lead screw 45 is formed on the output shaft of the fourth group motor 53, the fourth group lead screw 45 may be rotated by constituting the fourth group motor 53 and the fourth group lead screw 45 separately and connecting them through gears or the like.

The fourth lens group-retaining frame 41 is provided with a light-shielding piece 41e which shields an optical passage of a fourth group photo-interrupter 47 provided on the lens barrel base 82, the light-shielding piece 41e is capable of light-shielding or passing light through the optical passage of the fourth group photo-interrupter 47 in response to the movement of the fourth lens group-retaining frame 41. In this case, the fourth lens group-retaining frame 41 can be moved in a predetermined position by recognizing as a reference position a time at which the light-shielding pieces is set from the light-shielding state to the light-passing state, energizing a pulse waveform of any pulse number from the reference position, rotating the fourth group motor 53.

Meanwhile, the fourth lens group-retaining frame 41 has a concave portion 41f which is provided in an outer peripheral edge thereof and allows the light-shielding strip 31b of the third lens group-retaining frame 31 as the photo-interrupter to move toward the optical axis to avoid the interference with the fourth lens group-retaining frame 41, thereby the moved amount of the fourth lens group-retaining frame 41 can be increased and a range capable of focusing can be enlarged. Moreover, as described above, there is a clearance between the fourth lens group-retaining frame 41 and the fourth group female screw member 46 in the direction of the optical axis, but the position in the direction of the optical axis of the fourth lens group-retaining frame 41 can be controlled accurately by constantly biasing the fourth lens group-retaining frame 41 toward the subject by the fourth group spring 43.

The stored position of the first rotary cylinder 22, the first liner 23, the first lens group 11, the second lens group 12, and the shutter/aperture unit 15 is controlled based on the zoom position-reference signal generated by the zoom position detector comprising the photo-reflector and so on disposed in the fixed frame 21. That is to say, it is possible to complete the storing operation by moving them toward the image plane by the predetermined pulse count number of the drive pulse generated by the pinion gear acting as the encoder and the zoom count detector disposed adjacent to the pinion gear after the change of from the H to the L of the zoom position storage reference signal occurs.

In storing, the fourth lens group-retaining frame 41 is positioned in the first stored position as described above, while, when the first rotary cylinder 22 is moved to the stored position, the most distal surface of the first rotary cylinder 22 or the first liner 23 contacts with the fourth lens group-retaining frame 41 and presses the fourth lens group-retaining frame 41 to move to the second stored position finally.

By such an operation, even if variations of the attached position of the fourth group photo-interrupter 47 in the direction of the optical axis occur, the fourth lens group-retaining frame 41 can be moved to the stored position accurately without requiring a complicated adjustment. Such an operation can be accomplished for the reason that a length of the engaging space formed in the fourth lens group-retaining frame 41, in the direction of the optical axis is larger than a thickness of the fourth group female screw member 46.

The zooming motor 51 for moving the first lens group 11, the second lens group 12, and the shutter/aperture unit 15 is structured by the DC motor as described above in the illustrated embodiment, the third group motor 52 for driving the third lens group 13 and the fourth group motor 53 for driving the fourth lens group 14 are generally configured to use a pulse motor, for example, are driven in conjunction with each other in a software-like manner to achieve an appropriate zooming action performed mainly by the first to the third lens groups 11-13 and an appropriate focusing action performed mainly by the fourth lens group 14, for example.

Here, a drive control system for the lens groups constituting the lens barrel is described in detail.

Figure 21:
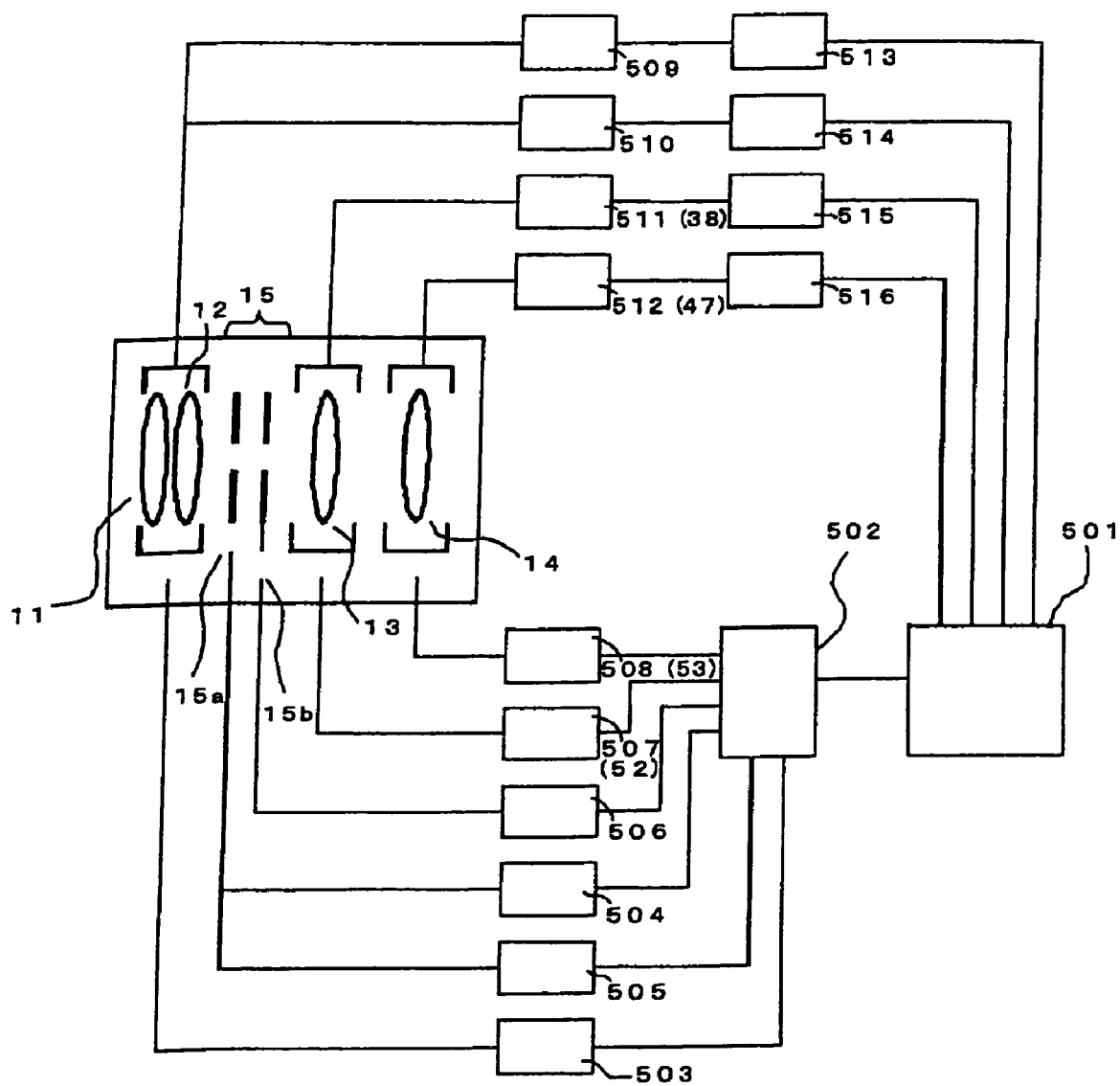
FIG. 21 is an exploded perspective view of the structures in the states shown in FIG. 20 as viewed from the subject.

The drive control system is shown in FIG. 21. The drive control system includes a central processing unit (CPU) 501, a motor driver 502, a first and second group DC motor 503, a first aperture stop motor 504, a second aperture stop motor 505, a shutter motor 506, a third group pulse motor 507, a fourth group pulse motor 508, a first and second group photo-interrupter 509, a first and second group photo-reflector 510, a third group photo-interrupter 511, a fourth group photo-interrupter 512, a first and second group photo-interrupter drive circuit 513, a first and second group photo-reflector drive circuit 514, a third group photo-interrupter drive circuit 515, and a fourth group photo-interrupter drive circuit 516.

The CPU gives a command such as an initial setting of the motor driver 502, the selection for a drive motor, the setting of a drive voltage, a direction for driving and so on to the motor driver 502. The motor driver 502 controls the motor system of the first and second group DC motor 503, the first aperture stop motor 504, the second aperture stop motor 505, the shutter motor 506, the third group pulse motor 507, the fourth group pulse motor 508 and so on, in accordance with the command from the CPU 501.

The first and second group DC motor 503 drives the first and second lens groups 11 and 12. As always, the first and second groups 11 and 12 are driven separately with respect to each other through a cam mechanism in response to the drive of the first and second group DC motor 503. The first aperture stop motor 504 and the second aperture stop motor 505 are configured to drive an aperture stop of the shutter/aperture unit 15. The shutter motor 506 drives a shutter of the shutter/aperture unit 15. The third group pulse motor 507 drives the third lens group 13. The fourth group pulse motor 508 drives the fourth lens group 14.

The CPU 501 supplies a drive electricity to the first and second group photo-interrupter 509, the first and second group photo-reflector 510, the third group photo-interrupter 511, and the fourth group photo-interrupter 512 as a position-detecting device through the first and second group photo-interrupter drive circuit 513, the first and second group photo-reflector drive circuit 514, the third group photo-interrupter drive circuit 515, and the fourth group photo-interrupter drive circuit 516. The CPU 501 also acquires a positional information signal detected by the first and second group photo-interrupter 509, the first and second group photo-reflector 510, the third group photo-interrupter 511, and the fourth group photo-interrupter 512.

The first and second group photo-interrupter drive circuit 513, the first and second group photo-reflector drive circuit 514, the third group photo-interrupter drive circuit 515, and the fourth group photo-interrupter drive circuit 516 have a function to control suitably a level of a projecting current and an output signal of each of the first and second group photo-interrupter 509, the first and second group photo-reflector 510, the third group photo-interrupter 511, and the fourth group photo-interrupter 512.

The motor driver 502 receives a command from the CPU 501 and executes the command. The CPU sets a designated voltage to one or more selected motors of the first and second group DC motor 503, the first aperture stop motor 504, the second aperture stop motor 505, the shutter motor 506, the third group pulse motor 507, the fourth group pulse motor 508, and controls them in accordance with a timing of drive command.

Here, a lens barrier 62 for protecting the lens barrel is described as follows.

Figure 3:
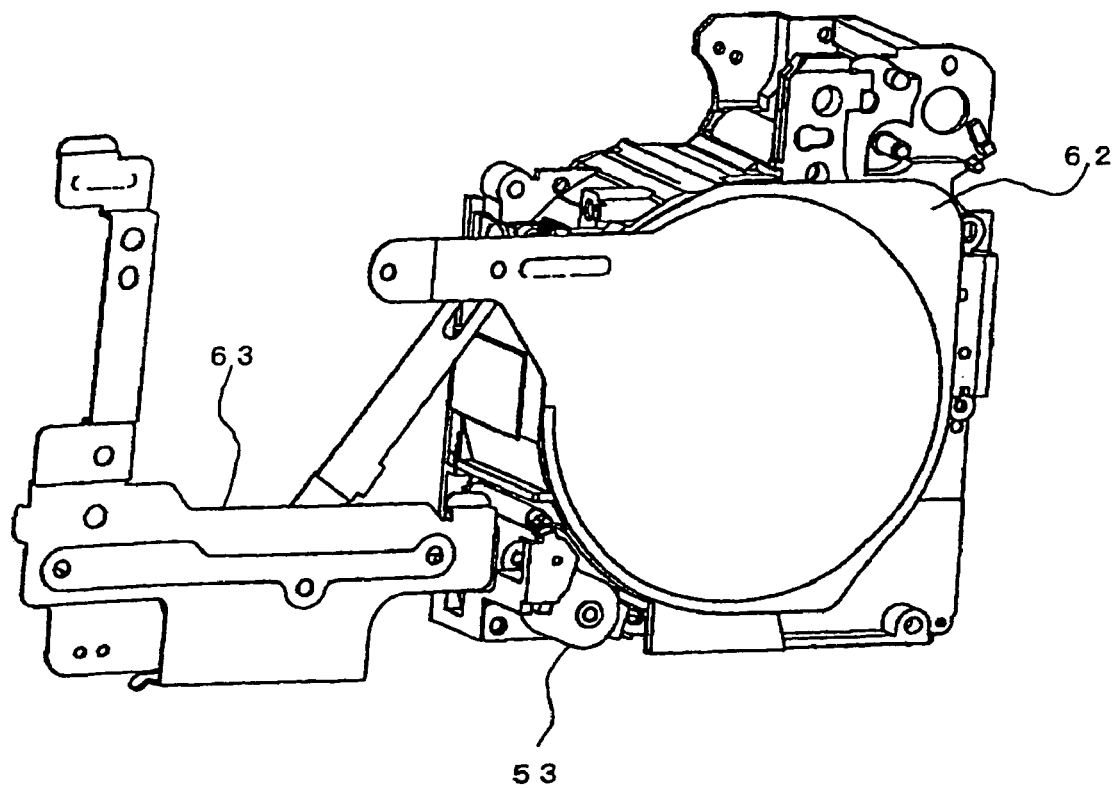
FIG. 3 is a schematic perspective view showing a structure of a main part of the optical system device including the lens barrel in which a lens barrier is closed, as viewed from the subject.
Figure 4:
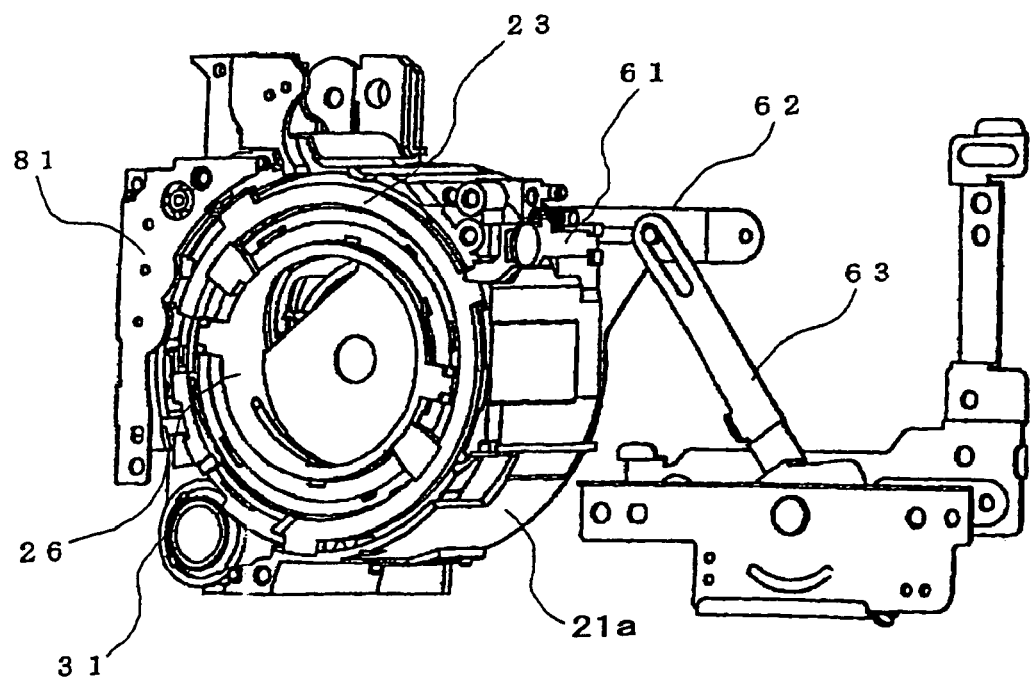
FIG. 4 is a schematic perspective view showing the structure of the main part of the lens barrel shown in FIG. 3, as viewed from the imaging plane.
Figure 5:
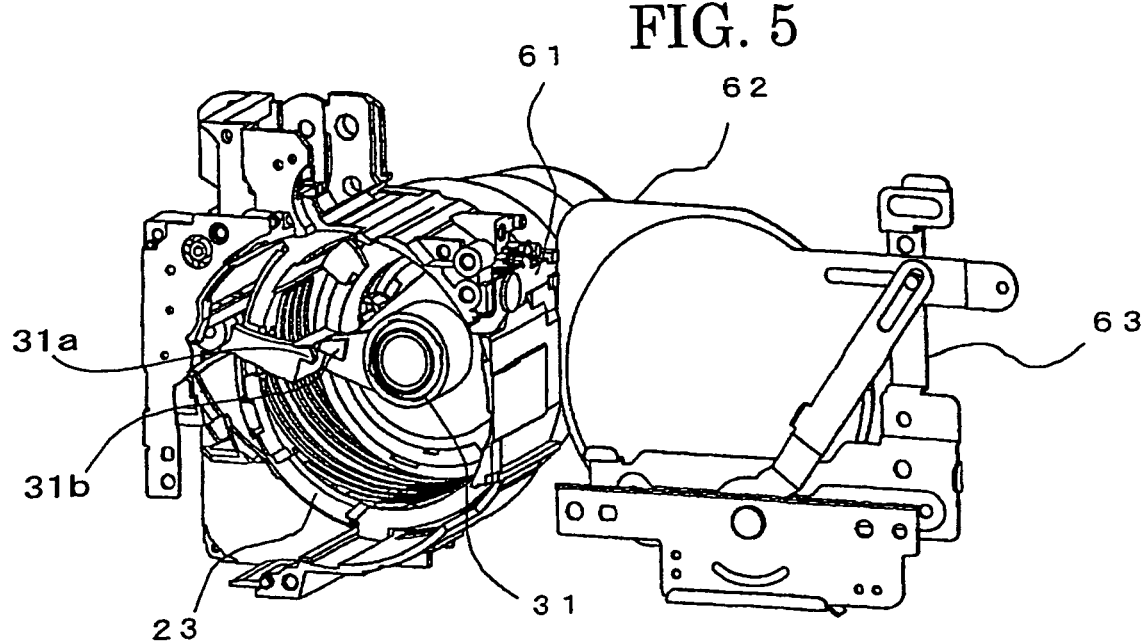
FIG. 5 is a schematic perspective view of the structure of the main part of the lens barrel in a state in which the lens barrier is opened in a photographing state with the lens groups extended, as viewed from the imaging plane.
Figure 6:
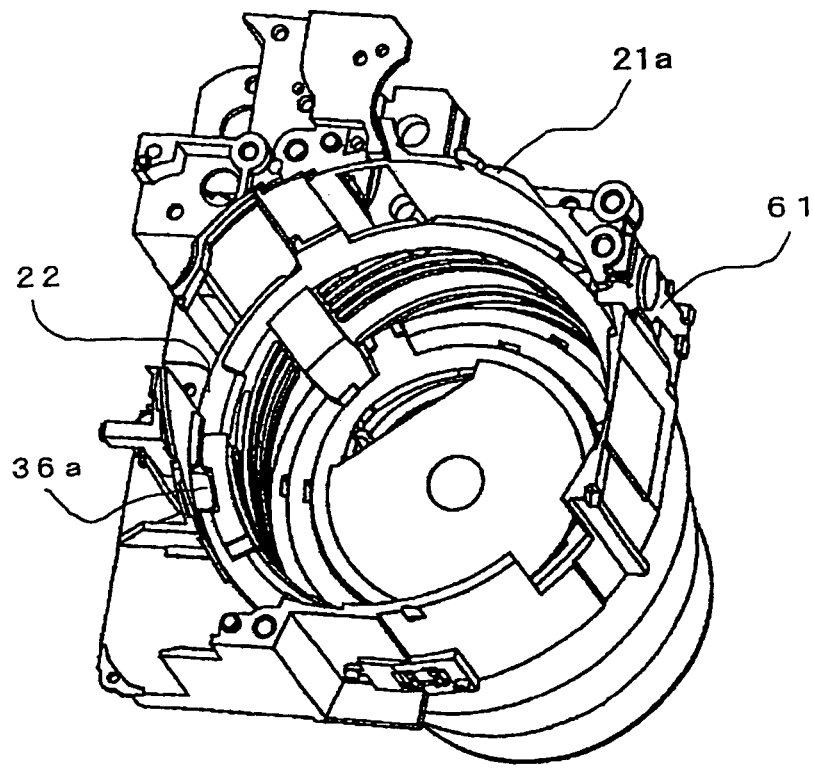
FIG. 6 is a perspective view of the structure of the main part of the lens barrel in the photographing state with the lens groups extended, as viewed from the imaging plane.

The lens barrier 62 shown in FIG. 3 to FIG. 5 is disposed to cover a side of the first lens group 11 facing the subject, in the stored state, and protects the lens group from contaminations or damages. The lens barrier 62 is moved in back and forth directions transverse to the optical axis by a barrier drive system 63. FIGS. 3 and 4 show a state in which the lens barrier 62 is closed, and FIG. 5 shows a state in which the lens barrier 62 is almost opened. The barrier drive system 63 drives the lens barrier 62 between the closed position (FIGS. 3 and 4) and the opened position (a position farther from the optical axis than the position shown in FIG. 5) through the operation of a barrier-operating element (see a barrier-operating element 301 in FIG. 17 A). The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position. Also, when an attempt is made to close the lens barrier 62 from the opened state, the lens barrier 62 is moved to the closed state semi-automatically when the lens barrier 62 passes a predetermined position. The position in the closed state is not necessarily required to be the same as the predetermined position in the opened state, rather, it is preferable that the lens barrier has a certain degree of hysteresis characteristics in the movement to accomplish a smooth operation of the lens barrier 62.

A barrier control strip 61 is provided on a side of the fixed lens cylinder 21a in the direction of opening the lens barrier 62 so as to be capable of sliding in a direction along the optical axis, and is biased toward the subject by a spring or the like as needed. In the stored state, an engaging portion of the barrier control strip 61 which is formed into a bent shape engages with base edge surfaces of the first rotary cylinder 22 and the first liner 23 and is biased toward the image surface against a biasing force of the spring, and hence is not in contact with the lens barrier 62. In the used or photographing state, the lens barrier 62 is completely away from the respective lens groups and retaining frames thereof. In this state, engagement of the engaging portion of the barrier control strip 61 is released, and hence the barrier control strip 61 is biased toward the subject by the biasing force, and then, a barrier-intercepting portion at the distal end enters into a passage of the lens barrier 62.

In this state, when the lens barrier 62 is rapidly operated to move the lens barrel to the stored position, there is a possibility that the lens barrier 62 hits against the lens barrel. However, since the barrier-intercepting portion at the distal end of the barrier control strip 61 crosses the passage of the lens barrier 62 to prevent the lens barrier 62 from entering into a moving passage of the lens barrel. When the respective lens groups are stored and the stored state is completed, the base edge surfaces of the first rotary cylinder 22 and the first liner 23 engage with the engaging portion of the barrier control strip 61, which is formed into the bent shape, to energize the engaging portion toward the image surface against the biasing force. Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

<Actuation Sequence>

Figure 22:
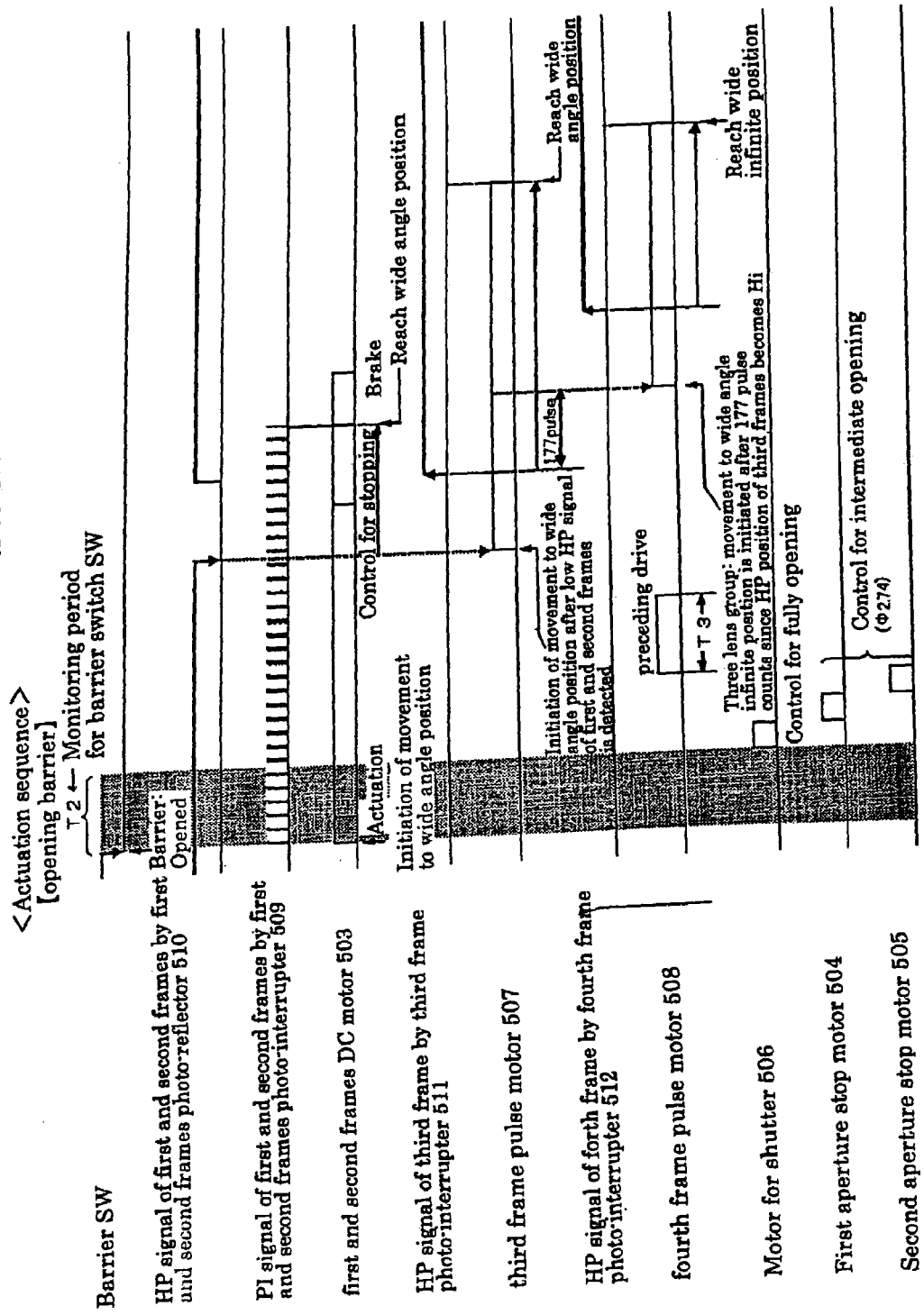
FIG. 22 is a back view of the structure of the front cover of the camera from which an inner cover is removed, as viewed from the imaging plane.

An actuation sequence of the above-mentioned drive control system is explained with reference to FIG. 22.

By opening the lens barrier 62, a barrier switch signal from a barrier switch (not shown) changes from the H to the L and an initial setting of the lens barrel is initiated. Meanwhile, the barrier switch is operated by opening mechanically the lens barrier 62 with an operating lever or the like (not shown), while the lens barrier may be opened by operation of the barrier switch. Executing the initial setting causes the initialization of the motor driver 502 for driving the motor system, and the initialization of the first and second group photo-interrupter 509, the first and second group photo-reflector 510, the third group photo-interrupter 511, and the fourth group photo-interrupter 512, as the position detecting device for a position through the first and second group photo-interrupter drive circuit 513, the first and second group photo-reflector drive circuit 514, the third group photo-interrupter drive circuit 515, and the fourth group photo-interrupter drive circuit 516.

In the case that detected results by the first and second group photo-interrupter 509, the third group photo-interrupter 511, and the fourth group photo-interrupter 512 indicate the stored position, the first and second group DC motor 503 is adapted to drive to the wide angle position. A driven amount of the first and second group DC motor 503 is detected by the first and second group photo-interrupter 509 for detecting the moving amount of the first and second lens groups. The moving amount is detected by counting edge portions of the pulse signal (PI signal) by the first and second group photo-interrupter 509.

A period for actuating right after the first and second group DC motor 503 is actuated is set, during which, the drive voltage is lower than a constant voltage in order to prevent an incoming current by the DC motor. After the actuation period is completed, the drive voltage is increased to a stationary voltage.

A period for monitoring the barrier switch or barrier SW right after the initiation of the actuation of the first and second group DC motor 503 is set and a state of the barrier switch signal is monitored by the CPU 501. During monitoring period, if the barrier switch signal indicates the opening state of the lens barrier, the shutter is set in the full opening by the shutter motor 50 for driving the shutter. Then, the aperture stop is set in an intermediately restricted state by the first and second aperture stop motors 504 and 505.

In this example, although the aperture stop is set in the intermediately restricted state, it may be set in an opened state or fully opened state.

Next, the fourth lens group 14 is previously driven through the fourth pulse motor 508. By achieving the previous drive of the fourth lens group 14, the total time from the initiation of the drive of the first and second lens groups to the completion of the drive of the final fourth lens group 14 can be reduced. Moreover, it is possible to greaten a torque when driving and prevent the interference of the fourth lens group with the other parts by setting a pulse rate of the fourth group pulse motor 508 in the previous drive thereof lately than that in the normal driving state.

Meanwhile, the driven amount of the fourth lens group by the fourth group pulse motor 508 is set so that the third and fourth lens groups interfere with respect to each other.

When the previous drive of the fourth lens group 14 is completed, the waiting for detecting reference position by the first and second group photo-reflector 510 is set. A place where the reference position signal changes from the H to the L becomes the reference position or HP position of the first and second lens groups 11 and 12. When the reference position or HP position of the first and second lens groups 11 and 12 is detected, positional information of the first and second lens groups 11 and 12 is reset. The movement of the first and second lens groups is controlled by counting the pulse-like signal (PI signal) by the first and second group photo-interrupter 509 based on the positional information to acquire the moved amount of the first and second lens groups until the wide angle position. The wide angle position is previously set, but it can be changed by storing it in a nonvolatile memory and rewriting it.

A specified pulse period before reaching the wide angle position is a stop controlling period, overrun in reaching the wide angle position can be reduced by lowering the drive voltage in accordance with residual pulse numbers to the wide angle position. If the first and second lens groups reach the wide angle position by counting the PI signal by the first and second group photo-interrupter 509, a braking control is made in order to stop the first and second lens groups. An amount of overrun during the braking period is counted so that the final position of the first and second lens groups 11 and 12 is decided.

Moreover, when the reference position or HP position of the first and second lens groups 11 and 12 is detected, the drive of the third group pulse motor 507 in the direction of wide angle position is initiated to control the third lens group 13 with the first and second lens groups 11 and 12. The driving time of the third lens group 13 can be reduced by setting the pulse rate in driving the third group pulse motor highly or rapidly than that in the normal drive.

The third lens group 13 is waited for detecting the reference position by the third group photo-interrupter 511. A place where the reference position signal or HP signal by the third group photo-interrupter 511 changes from the L to the H becomes the reference position or HP position of the third lens group 13. When the reference position or HP position is detected, positional information of the third lens group 13 is reset. The third lens group 13 is pulse-driven by the third group pulse motor 507 based on the positional information to obtain the moved amount of the third lens group 13 to the wide angle position. The wide angle position is previously set, but it can be changed by storing it in a nonvolatile memory such as an EEPROM or the like and rewriting it.

In addition, the final stopping position of the third lens group 13 becomes a position in consideration of overrun of the first and second lens groups 11 and 12. That is to say, because the stopping position of the first and second lens groups 11 and 12 is the wide angle position plus overrun amount, the stopping position of the third lens group 13 is also the wide angle position plus α in consideration of overrun of the first and second lens groups 11 and 12. A value of the α is obtained by a linear calculation depending on pulse numbers between the zooming positions of the first and second lens groups 11 and 12, the overrun amount and a pulse number between the zooming positions of the third lens group 13. The zooming position is one of sections divided into 16 equally between the wide angle and the telescope (between W and T).

If the drive of the first and second lens groups 11 and 12 is completed, the reference position or HP position of the third lens group 13 is detected, and the third lens group 13 is driven more than the specified pulse number, the drive of the fourth group pulse motor 508 in the direction of a wide angle infinite position is initiated. If the drive of the first and second lens groups 11 and 12 is not completed, or the third lens group 13 is not driven more than the specified pulse from the reference position, the drive of the first and second lens groups 11 and 12 is completed, and a standby state is set until the third lens group 13 is driven more than the specified pulse from the reference position. When the drive of the first and second lens groups 11 and 12 are not completed and the fourth group pulse motor 508 is driven, the three motors are driven simultaneously to increase current consumption. Therefore, in the example, only the third and fourth lens groups are driven simultaneously. Moreover, when the fourth lens group 14 is driven before the third lens group 13 reaches the position more than the specified pulse number, the interference between the third and fourth lens groups 13 and 14 occurs. Therefore, the drive of the fourth lens group 14 is initiated after the third lens group 13 is driven more than the specified pulse number.

The fourth lens group 14 is waited for detecting the reference position by the fourth group photo-interrupter 512. In addition, current consumption can be reduced by setting the drive voltage of the fourth group pulse motor 508 to be lower than that of the normal drive. A place where the reference position signal or HP signal by the fourth group photo-interrupter 512 changes from the L to the H becomes the reference position or HP position of the fourth lens group 14. When the reference position or HP position of the fourth lens group is detected, positional information of the fourth lens group 14 is reset. The fourth lens group 14 is pulse-driven by the fourth group pulse motor 508 based on the positional information to obtain the moved amount of the fourth lens group 14 to the wide angle position. The wide angle position is previously set, but it can be changed by storing it in a nonvolatile memory such as an EEPROM or the like and rewriting it.

In the embodiment, as described above and shown in a timing chart of FIG. 22, the current consumption can be reduced by limiting the simultaneously driven motors to two motors, and a time of actuating the motors can be shortened by the optimum drive of the motors.

Next, a case in which the barrier switch signal is changed in a closed state during a period for monitoring the barrier switch right after the actuation of the first and second group DC motor 503 is initiated is explained with reference to FIG. 23. If the barrier switch signal is changed from the opened state to the closed state during the period, the drive of the first and second group DC motor 503 is stopped.

Thereafter, the drive of the first and second group DC motor 503 is initiated by a moved amount in the direction of the stored position or the specified pulse number. In this case, the drive voltage is lower and breaking and damage are prevented from generating even if operating parts of the lens barrier impact with switch first and second lens groups and so on in the end of a stored position. By such a control, the first and second lens groups are prevented from interfering with the lens barrier.

[Reset Sequence]

Moreover, if the detected result of the first and second photo-reflector 510 is not the stored position (reference position HP, signal L), the detected result of the third group photo-interrupter 511 is not the stored position (reference position HP, signal H), or the detected result of the fourth group photo-interrupter 512 is not the stored position (reference position HP, signal H), the reset sequence drive is executed.

Figure 24A:
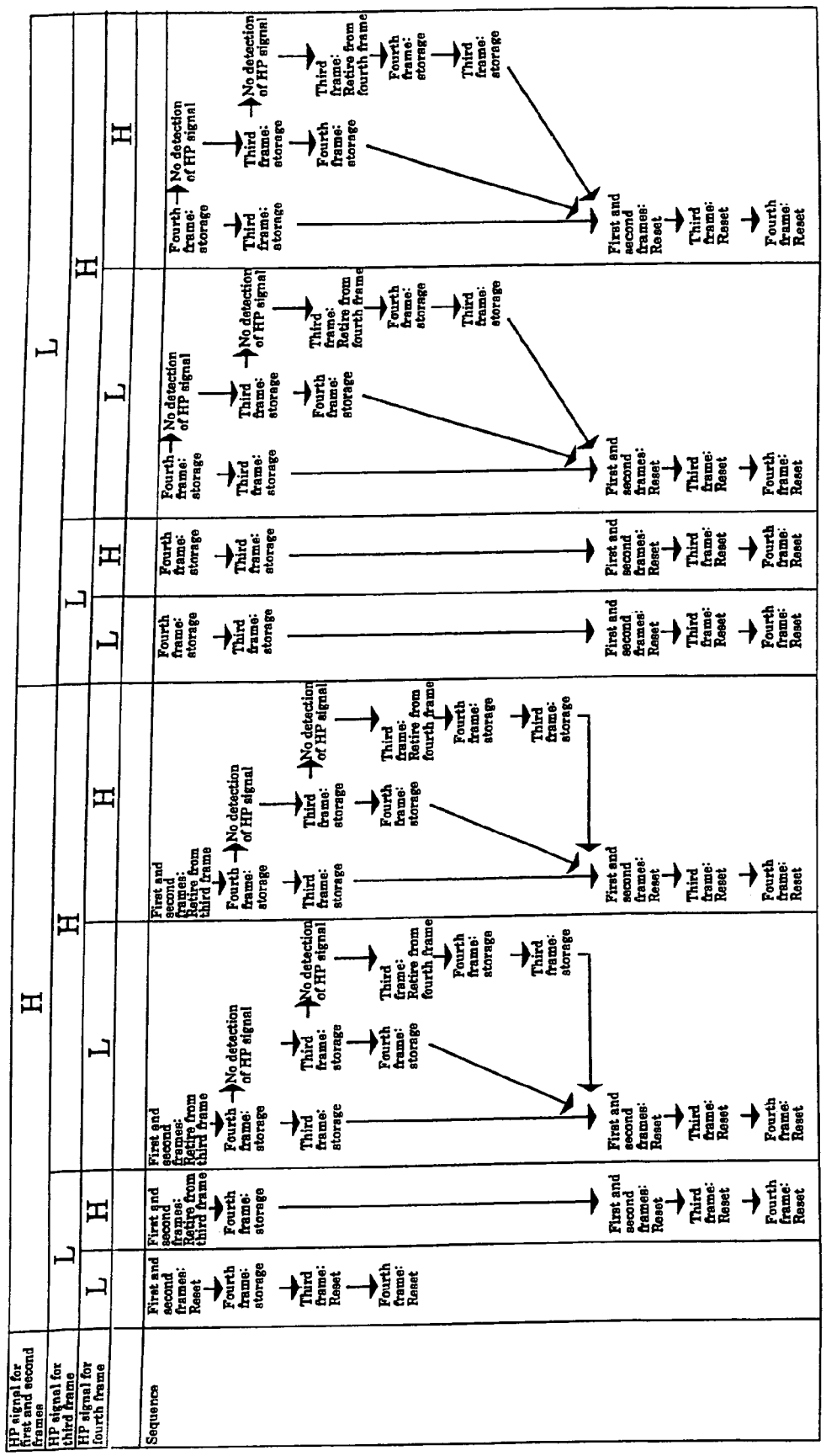
FIG. 24 A is a table showing a reset sequence of the lens barrel.
Figure 25:
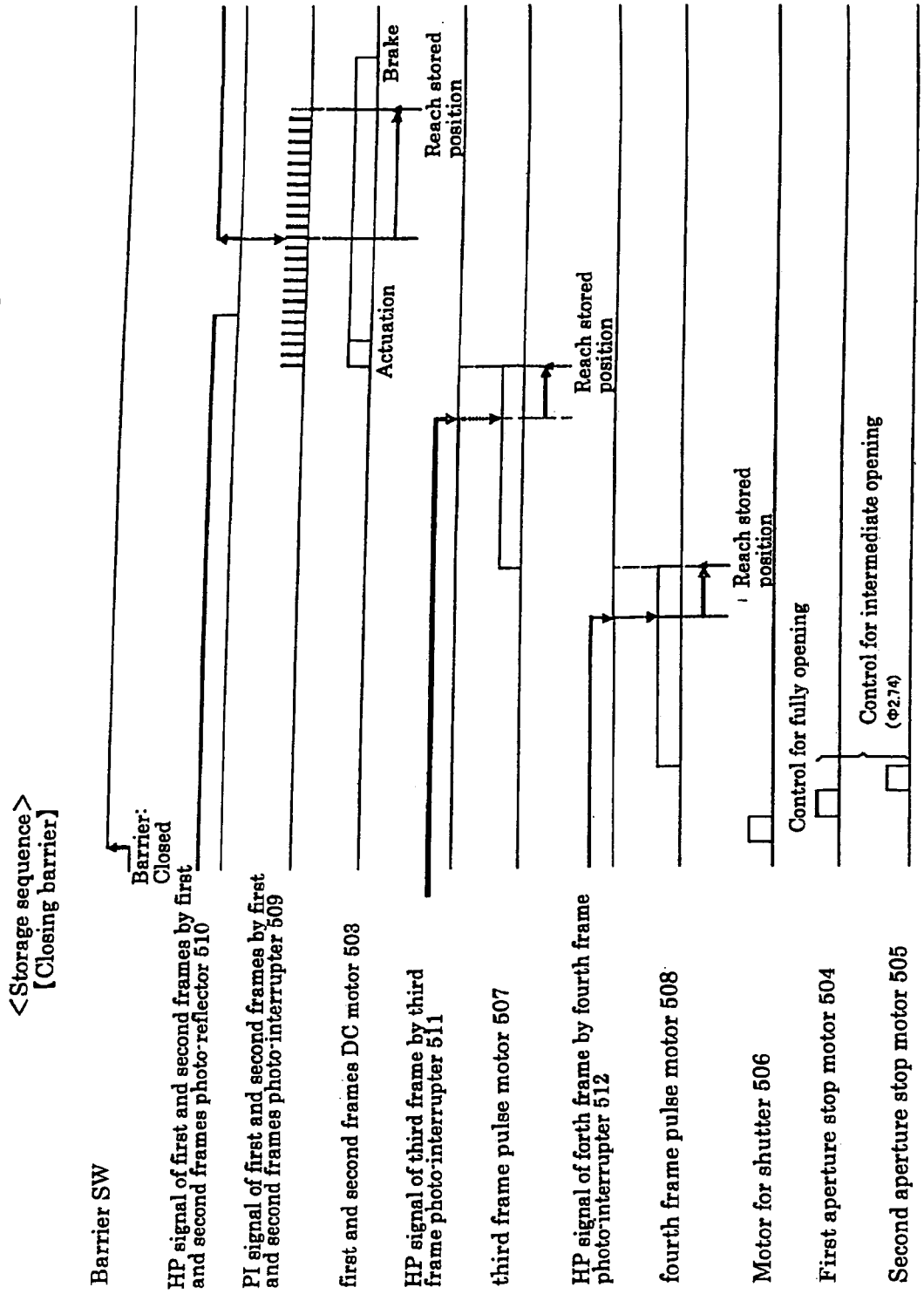
FIG. 25 is a timing chart showing a storage sequence in a state in which the lens barrier is closed.

The reset sequence is described referring to FIG. 24 as follows.

<With respect to first and second group HP signal=H, third group HP signal=L, fourth group HP signal=L>

First, as the reset operation of the first and second lens groups 11 and 12, the reference position or HP position of the first and second lens groups is detected, and the first and second lens groups are moved to the wide angle position (first and second groups: Reset). Next, as the storing operation of the fourth lens group 14, the reference position or HP position of the fourth lens group 14 is detected, and the fourth lens group is moved to the stored position (fourth group: storage).

Subsequently, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=H, third group HP signal=L, fourth group HP signal=H>

First, as the retiring operation of the first and second lens groups 11 and 12, the first and second lens groups are driven in the direction of the telescope and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the stored position (fourth group: storage). Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=H, third group HP signal=H, fourth group HP signal=L, first and second group HP signal=H, third group HP signal=H, fourth group HP signal=H>

First, as the retiring operation of the first and second lens groups 11 and 12, the first and second lens groups are driven in the direction of the telescope and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the stored position (fourth group: storage). If the reference position or HP position of the fourth lens group 14 can be detected, as the storing operation of the third lens group, the reference position or HP position of the third lens group 13 is detected, and the third lens group is moved to the stored position (third group: storage). If the reference position or HP position of the fourth lens group 14 cannot be detected, because it is considered that the fourth lens group is interfered with the third lens group 13, the storing operation of the third lens group 13 is previously carried out (third group: storage).

If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telescope (third group: retire). Thereafter, the storing operation (fourth group: storage) of the fourth lens group 14 and the storing operation (third group: storage) of the third lens group 13 are carried out.

Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=L, third group HP signal=L, fourth group HP signal=L, first and second group HP signal=L, third group HP signal=L, fourth group HP signal=H>

First, as the storing operation of the fourth lens group 14, the reference position or HP position of the fourth lens group 14 is detected, and the fourth lens group is moved to the stored position (fourth group: storage). Next, as the storing operation of the third lens group 13, the reference position or HP position of the third lens group 13 is detected, and the third lens group is moved to the stored position (third group: storage). Next, as the reset operation of the first and second lens groups 11 and 12, the reference position or HP position of the first and second lens groups is detected, and the first and second lens groups are moved to the wide angle position (first and second groups: Reset). Subsequently, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With respect to first and second group HP signal=L, third group HP signal=H, fourth group HP signal=L, first and second group HP signal=L, third group HP signal=H, fourth group HP signal=H>

First, as the storing operation of the fourth lens group 14, the reference position or HP position of the fourth lens group 14 is detected, and the fourth lens group is moved to the stored position (fourth group: storage). If the reference position or HP position of the fourth lens group 14 can be detected, as the storing operation of the third lens group 13, the reference position or HP position of the third lens group 13 is detected, and the third lens group is moved to the stored position (third group: storage).

If the reference position or HP position of the fourth lens group 14 cannot be detected, because it is considered that the fourth lens group is interfered with the third lens group 13, the storing operation of the third lens group 13 is previously carried out (third group: storage). If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telescope (third group: retire).

Thereafter, the storing operation (fourth group: storage) of the fourth lens group 14 and the storing operation (third group: storage) of the third lens group 13 are carried out. Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP signal of the fourth lens group 14 is detected, and the fourth lens group is moved to the wide angular infinite position (fourth group: Reset).

[Storing Sequence]

The barrier switch signal changes from L to H by closing the lens barrier 62 to initiate the storing operation. Meanwhile, the barrier switch may be operated by mechanically closing the lens barrier 62 by means of an operating lever or the like, or the lens barrier 62 may be closed by operation of the barrier switch.

The shutter of the shutter/aperture stop unit 15 is set in the fully closed state through the full closing control of the shutter by the shutter motor 506. Next, the aperture stop of the shutter/aperture stop unit 15 is set in the intermediately restricted state through the intermediate restricting control of the aperture stop by the first and second aperture stop driving motors 504 and 505. Subsequently, the storing drive of the fourth lens group 14 is achieved through the fourth group pulse motor 508. The standby for detecting the reference position of the fourth group pulse motor 508 by the fourth group photo-interrupter 512 is set after the drive of the fourth group pulse motor 508 to the stored position is initiated.

The fourth group pulse motor 508 is pulse-driven by a moved amount to the stored position from a place where the reference positional signal or HP signal by the fourth group photo-interrupter 512 changes from H to L to the stored position. The moved amount to the stored position is previously set, but the moved amount can be changed by storing it in a nonvolatile memory such as an EEPROM or the like and rewriting it.

Next, the drive of storing the third lens group 13 is executed through the third group pulse motor 507. The third lens group 13 is waited for detecting the reference position by the third group photo-interrupter 511 by initiating the drive of the third group pulse motor 507 in the direction of the stored position.

The third lens group 13 is pulse-driven by the moved amount to the stored position from the place where the reference position signal or HP signal by the third group photo-interrupter 511 changes from H to L to the stored position. Although the moved amount to the stored position is set previously, the moved amount can be changed by storing it in a nonvolatile memory such as an EEPROM or the like and rewriting it.

The drive pulse rate of the third group pulse motor 507 between the reference position and the stored position is lower than the drive pulse rate until the reference position. In this way, a smooth pulse drive can be accomplished by changing the pulse rate in accordance with an area in which a torque is necessary.

Next, the drive of storing the first and second lens groups 11 and 12 is executed through the first and second group DC motor 503. The first and second lens groups are waited for detecting the reference position by the first and second group photo-reflector 510 by initiating the drive of the first and second group DC motor 503 in the direction of the stored position.

The control for the moved amount of the first and second lens groups 11 and 12 is achieved by counting the pulse-like signal or PI signal by the first and second group photo-interrupter 509 to acquire the moved amount to the stored position from the place where the reference position signal or HP signal by the first and second group photo-reflector 510 changes from L to H to the stored position. Although the moved amount to the stored position is set previously, the moved amount can be configured to be changed by storing it in a nonvolatile memory such as an EEPROM or the like and rewriting it.

In the drive for storing the first and second lens groups 11 and 12, if the first and second lens groups 11 and 12 reach the stored position by counting the PI signal by the first and second group photo-interrupter 509 without dropping the voltage of the first and second group DC motor 503 before stopping it, a breaking control is achieved in order to stop the drive of the first and second lens groups 11 and 12. This is reason the first and second group DC motor is not stopped at the middle of drive due to the dropping of voltage.

[Variable Power Sequence]

Figure 26:
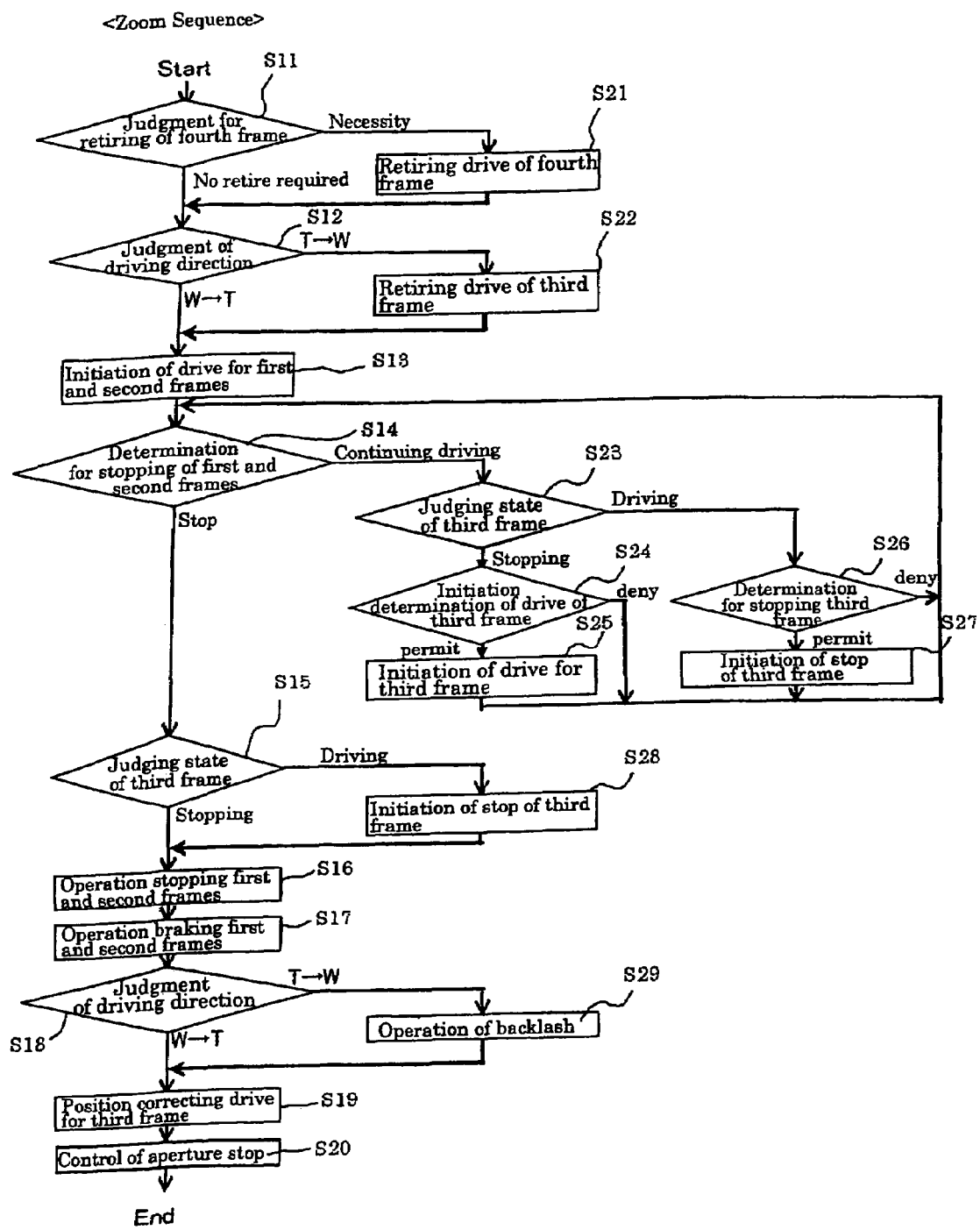
FIG. 26 is a flow chart showing a zoom sequence.

A sequence for operating a variable power is described with reference to a flow chart shown in FIG. 26.

When a variable power process is initiated by operating a zoom lever, zoom button or the like, whether it is necessary to retire the fourth lens group 14 is determined (step S11). It is determined in the step S11 that the retire process for the fourth lens group is required if the fourth lens group 14 is disposed in a nearer position than a predetermined position in the variable power process from the telescope to the wide angle. Next, a direction of drive of the variable power is determined (step S12). If it is the variable power from the wide angle to the telescope, the drive of the first and second lens groups 11 and 12 is initiated by operating the first and second group DC motor 503 (step S13).

Next, whether the first and second lens groups 11 and 12 are stopped is determined (step S14). It is determined in the step S 14 that the first and second lens groups 11 and 12 are stopped in a case satisfying either one of conditions in which if a zoom driving switch operated by variable power manipulation through the zoom lever or zoom button or the like becomes off, if the first and second lens groups reach a position in front of a predetermined amount from the telescopic position in the drive from the wide angle to the telescope, and if the first and second lens groups reach a position in front of a predetermined amount from the wide angle position in the drive from the telescope to the wide angle.

If the first and second lens groups 11 and 12 are stopped, whether the third lens group 13 is driving is determined (step S15), if the third lens group 13 is stopping, the stopping operation of the first and second lens groups 11 and 12 is executed (step S16) and the breaking operation of the first and second lens groups 11 and 12 is executed (step S17). Subsequently, the driving direction of the variable power is determined (step S18), if it is the variable power from the wide angle to the telescope, drive for correcting a position of the third lens group 13 is achieved (step S19), the drive of the aperture stop is executed (step S20), and the process is completed and returned from the step S20 to a process waiting state.

In the step S11, if it is determined that the retire process of the fourth lens group 14 is required, the retire process of the fourth lens group 14 is executed (step S21), and the process is shifted from the step S21 to the step S12. In the step S12, if it is determined the variable power driving direction is the variable power from the telescope to the wide angle, the retire process of the third lens group 13 is executed (step S22), the process is shifted from the step S22 to the step S 14.

In the step S14, if it is determined that the first and second lens groups 11 and 12 continue to drive without stopping them, whether the third lens group 13 is driving is determined (step S23), if the third lens group 13 is stopping, whether the drive of the third lens group 13 is initiated is determined (step S24).

It is determined in the step S 24 that the drive of the third lens group 13 is permitted in a case satisfying one of conditions in which if the first and second lens groups 11 and 12 are driven more than the specified driven amount after the initiation of the drive of the first and second lens groups, if the position of the third lens group 13 is away a predetermined amount or more from the position of the first and second lens groups 11 and 12 when the first and second lens groups pass a predetermined zooming point in the driving state that the third lens group 13 is re-driven from the wide angle to the telescope, and if the position of the third lens group 13 is approaching a predetermined amount or more to the position of the first and second lens groups 11 and 12 when the first and second lens groups pass a predetermined zooming point in the driving state that the third lens group 13 is re-driven from the telescope to the wide angle.

In the step S24, if the drive of the third lens group 13 is permitted, the drive of the third lens group is initiated (step S25), the process is returned from the step S25 to the step S14. In the step S 24, if the drive of the third lens group 13 is not permitted, the process is returned from the step S24 to the step S14 directly.

In the step S23, if it is determined that the third lens group 13 is driving, whether the drive of the third lens group 13 is stopped is determined (step S 26). It is determined in the step S 26 that the third lens group 13 is permitted in a case satisfying one of conditions in which if the position of the third lens group 13 approaches a predetermined amount or more to the position of the first and second lens groups 11 and 12 in the drive from the wide angle to the telescope, and if the position of the third lens group 13 is away a predetermined or more from the position of the first and second lens groups 11 and 12 in the drive from the telescope to the wide angle.

In the step S26, if the stop of the third lens group 13 is permitted, the stop of the third lens group is initiated (step S27), the process is returned from the step S27 to the step S14. In the step S26, if the stop of the third lens group 13 is not permitted, the process is returned the step S26 to the step S14 directly.

In the step S15, if it is determined that the third lens group 13 is driving, the stop of the third lens group 13 is initiated (step S 28), the process is shifted from the step S28 to the step S16. In the step S18, if it is determined that the variable power driving direction is the variable power from the telescope to the wide angle, a backlash operation is executed (step S29), the process is shifted from the step S29 to the step S19.

Next, a variable power operation depending on the flow chart is explained every the direction of variable power in detail.

[From Wide Angle to Telescope]

Figure 27:
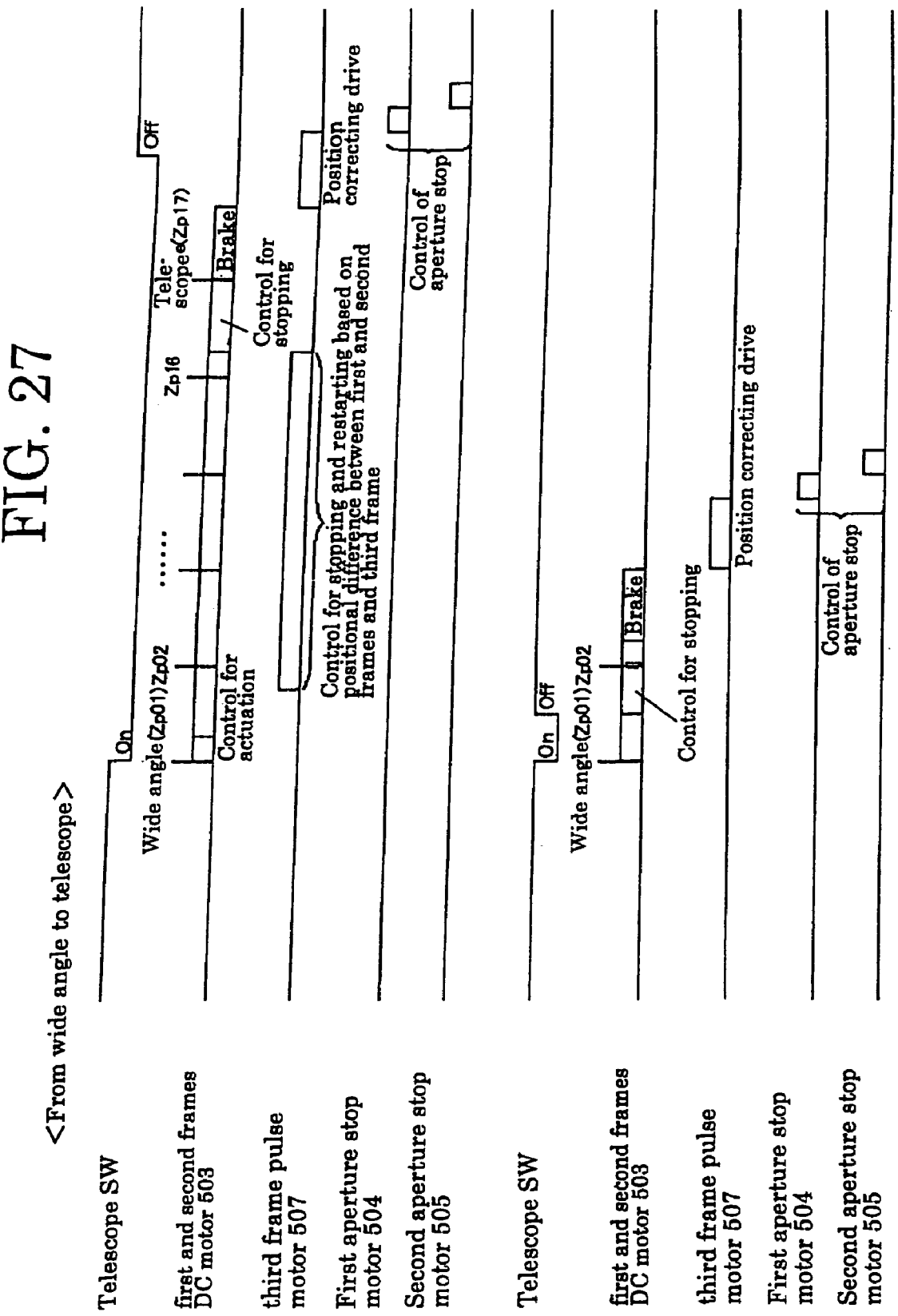
FIG. 27 is a timing chart showing a state from the wide angle to the telescopic.

First, a variable power operation from the wide angle to the telescope is explained referring to the timing chart shown in FIG. 27.

By pressing down the zoom button, which is in a telescopic mode, the telescopic switch signal changes from H to L, a variable sequence to the telescopic direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Variable power drive from telescope to the wide angle.

(2) The fourth lens group 14 is positioned in a nearer position to the subject or drawing out position away from a predetermined position or retired threshold position.

However, because the above-mentioned conditions are not satisfied in the drive from the wide angle to the telescope, the fourth lens group 14 is not retired.

Next, the driving direction, whether the third lens group 13 is retired is determined (step S112). In the case of the variable power drive from the wide angle to the telescope, the retiring drive of the third lens group 13 is not required. The drive of the first and second lens groups 11 and 12 is initiated through the first and second group DC motor 503 (step S13).

In an actuating period right after the initiation of actuation of the first and second group DC motor 503, the drive voltage is set to be lower than the stationary voltage in order to prevent an incoming current by the first and second group DC motor. After the actuating period is lapsed, the drive voltage is increased to the stationary voltage. The drive voltage between the wide angle and the telescope is set to be lower than that between the stored position and wide angle position. This is reason a higher speed is required between the stored and wide angle positions, hence a higher voltage is set and a suitable voltage setting is made between the wide angle and the telescope to allow the first and second group DC motor 503 to stop at a desired position by operation of the zoom button.

The control of the moved amount of the first and second lens groups 11 and 12 is achieved by counting the pulse-like signal or PI signal by the first and second group photo-interrupter 509. The zooming points each of which is a control reference position are set in 17 points in which a distance between the wide angle and the telescope is divided into 16 equally.

Next, whether the first and second lens groups 11 and 12 are stopped is determined (step S14). In the determination for stopping the drive of the first and second lens groups 11 and 12, if either one of the following conditions is satisfied (OR), a stopping process is executed.

(1) A telescopic zooming drive switch operated by the variable-power operation through the zoom lever or zoom button or the like is turned off, in other words, changed from L to H.

(2) The first and second lens groups reach a position in front of the telescopic position when driving from the wide angle to the telescope.

During the first and second lens groups 11 and 12 continue to drive, the determination of driving initiation/driving stop of the third lens group 13 is executed in response to the status (during driving or stopping) of the third lens group 13 (step S23). If the third lens group 13 is stopping, the determination of drive initiation of the third lens group 13 is executed (step S24), if the initiation is permitted, the drive of the third lens group 13 is initiated. In the step S24, the drive of the third lens group 13 is initiated if either one of the following conditions is satisfied.

(1) The first and second lens groups 11 and 12 are driven the specified driven amount or more after the initiation of the drive of the first and second lens groups.

(2) During the third lens group 13 is re-driving in the drive from the wide angle to the telescope, the position of the third lens group 13 is away by a predetermined amount from the position of the first and second lens groups 11 and 12 when the first and second lens groups 11 and 12 pass a predetermined zooming point.

Moreover, if the third lens group is driving, whether the third lens group 13 is stopped is determined (step S26), if the stop is permitted, the drive of the third lens group 13 is stopped. In the determination whether the third lens group 13 is stopped, the third lens group 13 is stopped if the following condition is satisfied.

The position of the third lens group 13 is positioned close than the predetermine amount to the position of the first and second lens groups 11 and 12 in the drive from the wide angle to the telescope.

That is to say, the first and second lens group 11 and 12 are actuated, if the driven amount of the first and second lens groups 11 and 12 becomes the specified pulse or more, the drive of the third lens group 13 is initiated. During simultaneous drive of the first, second and third lens groups, if the position of the third lens group 13 approaches by the predetermined amount to the position of the first and second lens groups 11 and 12, the drive of the third lens group 13 is stopped. Thereafter, the first and second lens groups 11 and 12 are away from the third lens group 13, if they are away from the third lens group 13 by a predetermined amount, the drive of the third lens group 13 is re-started.

The drive and stop of the third lens group 13 are repeated in response to a positional relationship among the first and second lens groups 11 and 12, and the third lens group 13. Thereby, it is possible to achieve the variable power drive while maintaining a distance among the first, second, and third lens groups 11, 12 and 13.

When actuating these lens groups, the influence of the incoming current can be avoided by initiating the drive of the third lens group 13 after the drive of the specified amount or more is carried out, therefore the current consumption is reduced.

If the telescopic switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second group DC motor 503 is lowered depending on a residual pulse number to a target position.

Thereby, the overrun amount of the first and second lens groups when reaching the target position is decreased. If the first and second lens groups reach the target position by counting the PI signal by the first and second group photo-interrupter 509, a breaking operation is executed in order to stop the drive of the first and second lens groups 11 and 12. A final position of the first and second lens groups 11 and 12 is decided by further counting the overrun amount during the period of breaking.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. Thereafter, the drive of the aperture stop is achieved to set a position of the aperture stop corresponding to the stopped zooming position of the third lens group 13 (step S20).

[From the Telescope to the Wide Angle]

Figure 28:
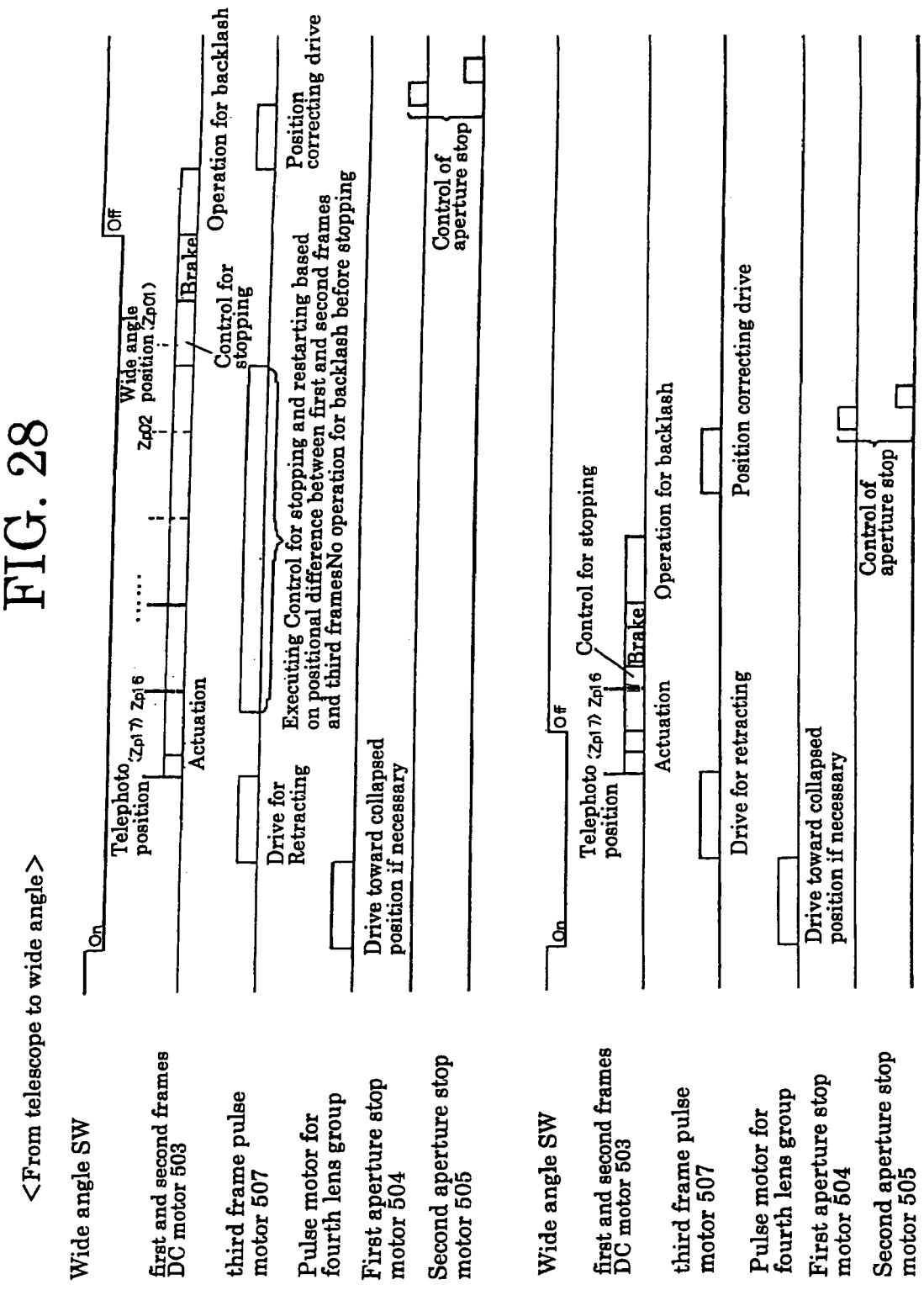
FIG. 28 is a timing chart showing a state from the telescopic to the wide angle.

Next, a variable power operation from the telescope to the wide angle is described with reference to the timing chart shown in FIG. 28.

By pressing down the zoom button, which is in a wide angular mode, the wide angular switch signal changes from H to L, a variable sequence with respect to the wide angular direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Variable power drive from telescope to the wide angle.

(2) The fourth lens group 14 is positioned in a closer position to the subject or drawing out position away from a predetermined position or retired threshold position.

If the position of the fourth lens group 14 is in the nearer position than the predetermined position when driving from the telescope to the wide angle. The retired amount is set to a range in which the third lens group 13 does not interfere with the fourth lens group 14 in the variable operation of the third lens group 13.

Next, the third lens group 13 is retired. In order to prevent the interference of the third lens group with the first and second lens groups 11 and 12 depending on the drive of the first and second lens groups 11 and 12, the third lens group 13 is driven previously by the specified amount. The drive of the first and second lens groups 11 and 12 is then initiated through the first and second group DC motor 503.

As described above, in the actuating period right after the initiation of actuation of the first and second group DC motor 503, the drive voltage is set to be lower than the stationary voltage in order to prevent the incoming current by the first and second group DC motor. After the actuating period is lapsed, the drive voltage is increased to the stationary voltage.

The control of the moved amount of the first and second lens groups 11 and 12 is achieved by counting the pulse-like signal or PI signal by the first and second group photo-interrupter 509. As described above, the zooming points each of which is a control reference position are set in 17 points in which a distance between the wide angle and the telescope is divided into 16 equally.

In the determination for stopping the drive of the first and second lens groups 11 and 12, if either one of the following conditions is satisfied (OR), the stopping process is executed, as described above.

(1) A telescopic zooming drive switch operated by the variable-power operation through the zoom lever or zoom button or the like is turned off, in other words, changed from L to H.

(2) The first and second lens groups 11 and 12 reach a position in front of the telescopic position when driving from the telescope to the wide angle.

During the first and second lens groups 11 and 12 continue to drive, the determination of driving initiation/driving stop of the third lens group 13 is executed in response to the status (during driving or stopping) of the third lens group 13. If the third lens group 13 is stopping, the determination for the initiation of drive of the third lens group 13 is executed, if the initiation is permitted, the drive of the third lens group 13 is initiated. In the determination for initiating the drive of the third lens group 13, the drive of the third lens group 13 is initiated if either one of the following conditions is satisfied.

(1) The first and second lens groups 11 and 12 are driven the specified driven amount or more after the initiation of the drive of the first and second lens groups 11 and 12.

(2) During the third lens group 13 is re-driving in the drive from the telescope to the wide angle, the position of the third lens group 13 approaches by a predetermined amount to the position of the first and second lens groups 11 and 12 when the first and second lens groups 11 and 12 pass a predetermined zooming point.

Moreover, if the third lens group 13 is driving, the determination for stopping the drive of the third lens group 13 is executed, if the stop is permitted, the drive of the third lens group 13 is stopped. In the determination whether the third lens group 13 is stopped, the third lens group 13 is stopped if the following condition is satisfied.

The position of the third lens group 13 is away the predetermine amount or more from the position of the first and second lens groups 11 and 12 in the drive from the telescope to the wide angle.

That is to say, the first and second lens group 11 and 12 are actuated, if the driven amount of the first and second lens groups 11 and 12 becomes the specified amount or more, the drive of the third lens group 13 is initiated. During simultaneous drive of the first, second and third lens groups 11, 12 and 13, if the position of the third lens group 13 is away the predetermined amount from the position of the first and second lens groups 11 and 12, the drive of the third lens group 13 is stopped. Thereafter, the first and second lens groups 111 and 12 approach to the third lens group 13, if they approach to the third lens group 13 the specified amount or more, the drive of the third lens group 13 is re-started.

The drive and stop of the third lens group 13 are repeated in response to a positional relationship among the first and second lens groups 11 and 12, and the third lens group 13. Thereby, it is possible to achieve the variable power drive while maintaining a distance among the first, second, and third lens groups 11, 12, and 13.

In actuating these lens groups, the influence of the incoming current of the first and second group DC motor 503 can be avoided by initiating the drive of the third lens group 13 after the specified pulse or more is counted, therefore the current consumption is reduced.

When the third lens group 13 is driven to the wide angular direction, during the drive of the first and second lens groups 11 and 12, basically a control for eliminating a backlash in the movement of the third lens group 13 is required when it is stopped, but the control is not carried out during the variable power operation to accomplish a smooth movement of the third lens group.

If the wide angular switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second group DC motor 503 is lowered depending on a residual pulse number to a target position.

Thereby, the overrun amount of the first and second lens groups when reaching the target position is decreased. If the first and second lens groups reach the target position by counting the PI signal by the first and second group photo-interrupter 509, a breaking operation is executed in order to stop the drive of the first and second lens groups 11 and 12. A final position of the first and second lens groups 11 and 12 is decided by further counting the overrun amount during the period of breaking.

Furthermore, a control for eliminating a backlash of the first and second lens groups 11 and 12 is executed in the movement from the telescope to the wide angle thereof.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. In the drive in the wide angular direction of the third lens group 13, the control for eliminating the backlash of the third lens group 13 is executed after it is stopped. Thereafter, the drive of the aperture stop is achieved so that the aperture stop is disposed in a position corresponding to the stopped zooming position of the third lens group 13.

In this example, the drive voltage of the first and second group DC motor 503 when it is driven in the wide angular direction is set to be higher than that in the telescopic direction in the variable power operation between the wide angle and the telescope. The pulse rate of the third group pulse motor 507 in the wide angular direction is set to be faster than that in the telescopic direction. An intermittent control for the third lens group 13 is accomplished based on the positional relationship among the first, second, and third lens groups 11, 12, and 13 in order to maintain the distance among the first, second, and third lens groups 11, 12, and 13. Therefore, the drive speed of the third lens group 13 is set to be the same as or faster than the drive speed of the first and second lens groups 11 and 12, in the movement in the telescopic direction.

Similarly, the drive speed of the third lens group 13 is set to be the same as or faster than the drive speed of the first and second lens groups 11 and 12, in the movement in the wide angular direction. With such a structure, the third lens group 13 is driven so that the third lens group 13 is not away a predetermined amount or more from the first and second lens groups 11 and 12 in the movement in the telescopic direction, and does not contact with the first and second lens groups 11 and 12 in the movement in the wide angular direction.

Moreover, although the driving re-start timing of the third lens group 13 is set at the time of passing the predetermined zooming point in this example, the timing may be set every the time of detecting the pulse-like signal or PI signal by the first and second group photo-interrupter 509 generating in driving the first and second lens groups 11 and 12, or every a predetermined count number of the PI signal.

Thereby, it is possible to accomplish a further fine intermittent control of the third lens group 13 and improve accuracy of the distance among the first, second and third lens groups.

In the above-mentioned embodiments, the structure in which the third lens group 13 can be retracted out the lens cylinder unit transverse to the optical axis X has been described. In this structure, the retracted third lens group has the minimum outer diameter. When the third lens group having the minimum outer diameter is retracted, a projective size of the lens barrel in which the third lens group is retracted can be minimized efficiently, and the thickness of the lens barrel can be reduced.

Moreover, when the retracted lens is extended out of the fixed frame, a size of the device (lead screw and so on) for driving the retired lens group or the third lens group is minimized by taking a structure such that the retracted lens is not way from the imaging plane possibly.

Furthermore, the lens retaining frame of the retracted lens group 13 or the retracted lens group 13 itself is larger than the lens retaining frames of the other lens groups 11, 12, 14 or the other lens groups 11, 12, 14 in length along the optical axis X, in other words, thickness.

When the thickness of the retracted lens group 13 is larger than that of the other lens groups 11, 12, and 14, consequently, the thickness of the other lens groups decreases, therefore, the thickness of the lens barrel can be reduced when the lens barrel is in the collapsible position.

As a result, the thickness of the lens barrel or a size in the direction of the optical axis of the lens barrel is minimized.

Because the retract lens group or the third lens group 13 is disposed behind and adjacent the shutter having the aperture stop function, the diameter of the lens barrel is less, and the retraction of the third lens group is simplified without considering the interference of the shutter with the lens group unit and separating the position of the shutter from the lens cylinder unit, excessively.

Next, a structure of the plurality of lens groups is explained in further detail.

The first lens group 11 has a positive power, the second lens group 12 has a negative power, the third lens group 13 has a positive power, and the fourth lens group 14 has a positive power. A variable power operation is achieved by changing at least one of intervals between the first and second lens groups 11 and 12, between the second and third lens groups 12 and 13, and between the third and fourth lens groups 13 and 14. A focusing operation is achieved by moving the fourth lens group 14 along the optical axis X.

The shutter/aperture unit 15 is disposed between the second lens group 12 and the third lens group 13. In other words, the shutter having the function of the aperture stop is positioned in front of the third lens group 13. The four lens groups are provided in the lens cylinder unit. Because the third lens group having the minimum outer diameter is retracted out of the lens cylinder unit without separating from the image plane excessively, the retraction of the third lens group 13 can be accomplished with the minimum movement and the outer diameter of the lens barrel can be minimized. In addition, the thickness of the lens barrel is decreased by retraction of at least one lens group.

Furthermore, it is possible to provide a compact lens barrel having a high variable power ratio, 4 times or more.

Meanwhile, the lens groups may be structured from a first lens group having a positive power, a second lens group having a negative power, and a third lens group having a positive power, and the third lens group may be retracted.

Alternatively, the lens groups may be structured by a first lens group having a negative power, a second lens group having a positive power, and a third lens group having a positive power, and the second lens group or the third lens group may be retracted.

Each of the lens groups may be structured from one or more lenses, and the lens groups herein indicate integral one or more lenses. Therefore, all the lens groups may be structured by one lens, respectively.

Figure 17A:
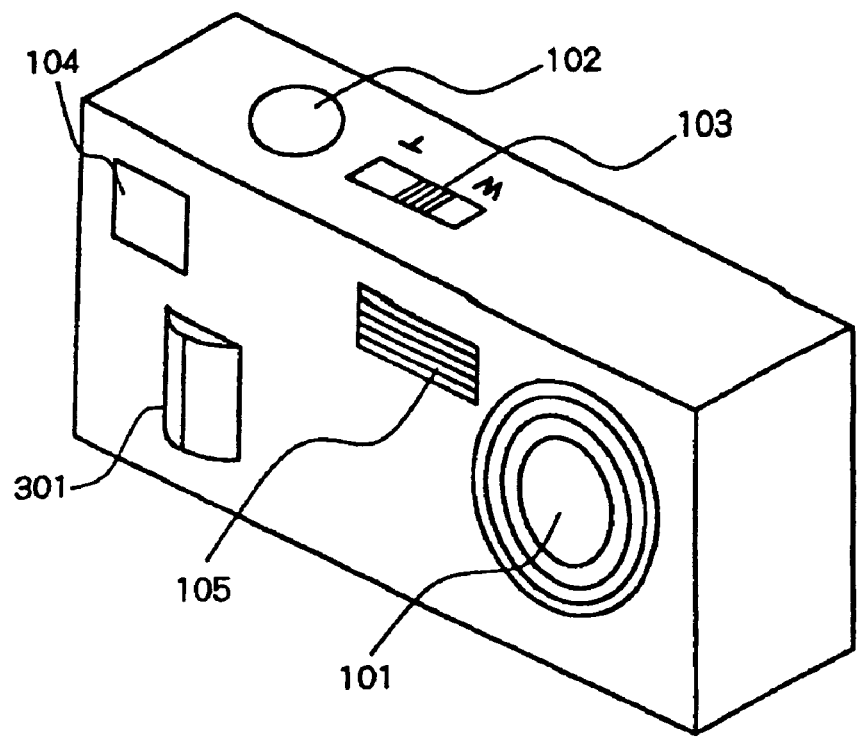
Figure 17B:
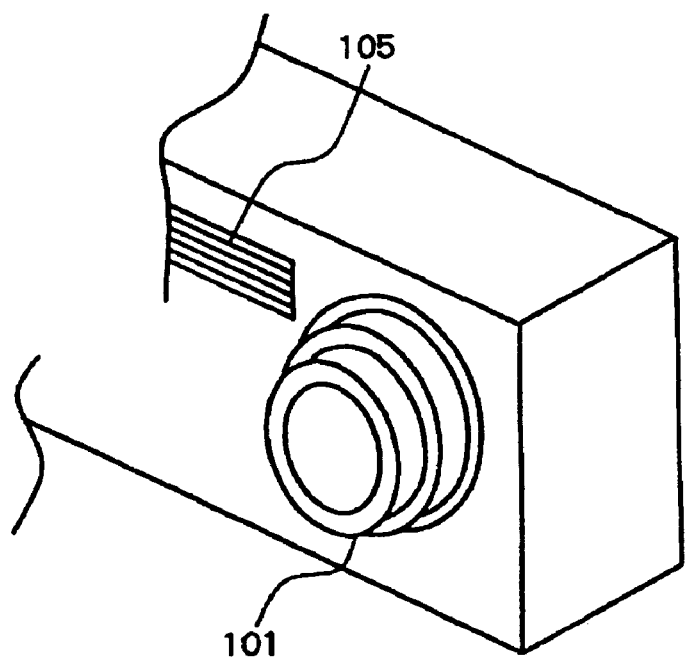
Figure 18:
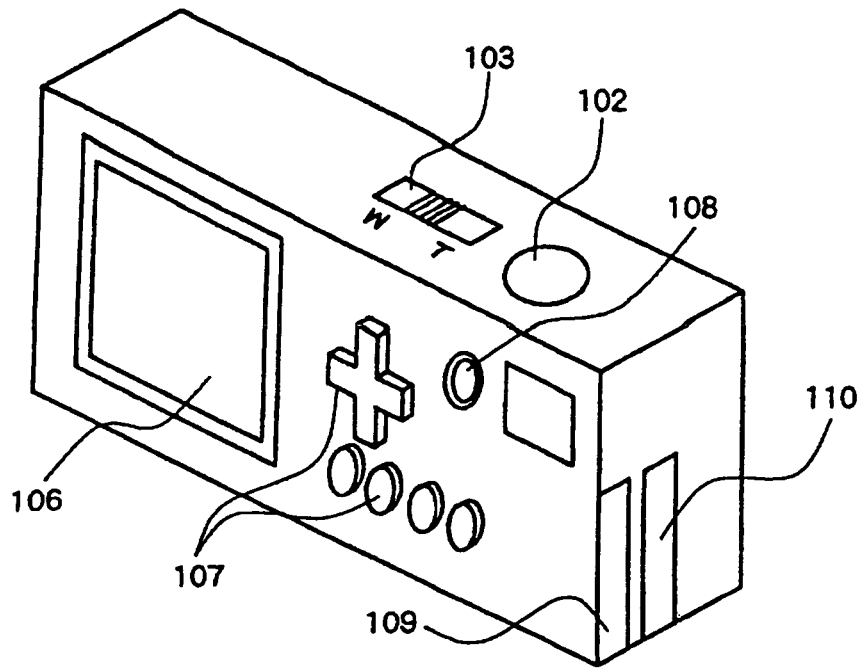
FIG. 18 is a perspective view schematically showing the exterior appearance and structure of the camera of FIGS. 17A and 17B as viewed from a user.
Figure 19:
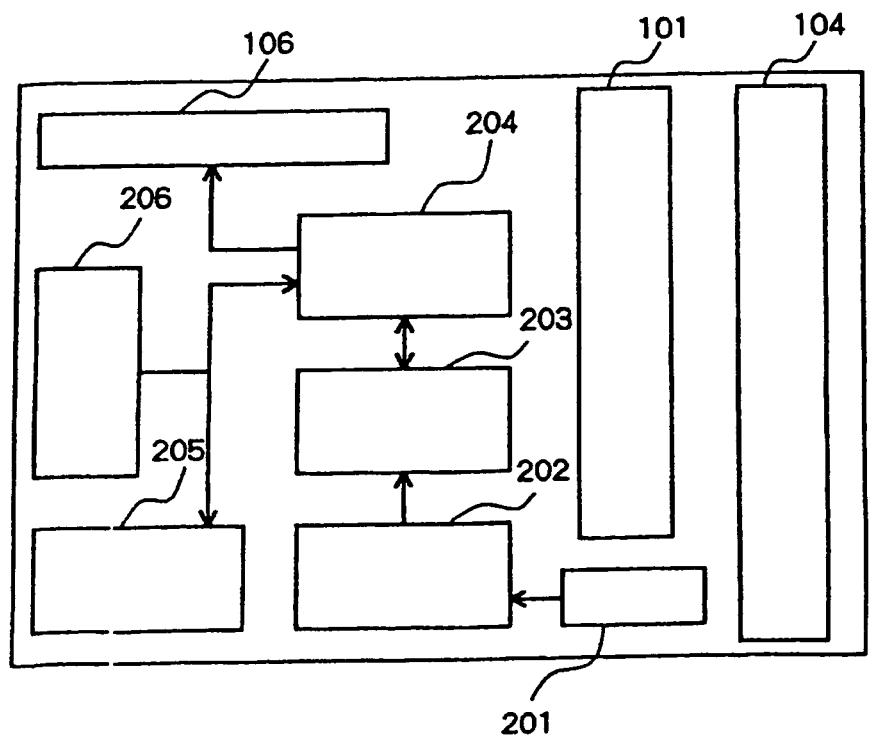
FIG. 19 is a block diagram schematically showing a functional structure of the camera of FIGS. 17A and 17B.

Referring now to FIG. 17 to FIG. 19, a camera including an optical system device having the lens barrel according to the present invention as shown in the first embodiment will be described.

Although the lens barrel is applied to the camera here, the lens barrel is also used to a portable information terminal such as so-called PDA (Personal Data Assistant) or a mobile phone, having a camera function or functional part installed therein.

Many of such portable information terminals have the function and the structure substantially identical to the function and the structure of the camera, although the appearance is slightly different, and hence the optical system device including the lens barrel according to the present invention may be employed in such mobile information terminals. Further, the lens barrel according to the present invention may be applied to an imaging device such as a copying machine, a scanner or the like.

As shown in FIG. 17 and FIG. 18, the camera includes an image pickup lens 101, a shutter button 102, a zoom lever 103, a finder 104, a strobe light 105, a liquid crystal monitor 106, an operating button 107, a power switch 108, a memory card slot 109, a communication card slot 110, the barrier-operating element 301 and so on.

Furthermore, as shown in FIG. 19, the camera also includes a light-receiving element 201, a signal-processing unit 202, an image-processing unit 203, a central processing unit (CPU) 204, a semiconductor memory 205, and a communication card or the like 206. Although it is not shown clearly, electric power is supplied from a battery as an electric source to the above-mentioned parts to operate the parts.

The light receiving element 201 serves as an area sensor such as a CCD (charge coupled device) image pickup element or the like to read an image of a subject to be photographed, that is, of an photographing subject, formed by the image pickup lens 101, which is a photographing optical system. As the image pickup lens 101, the optical system device including the lens barrel according to the present invention as described in the first embodiment is employed.

More specifically, the optical system device includes a plurality lens groups as optical elements and a telescopic lens cylinder unit retaining the lens groups, which constitute the lens barrel.

The lens barrel has a mechanism of retaining the respective lens groups in the lens cylinder such that the lens groups can be moved in response to the movement of the lens cylinder along the optical axis of the lens groups, similarly to the above-mentioned embodiment. The image pickup lens 101 to be integrated in the camera is generally integrated in the form of this optical system device.

An output from the light-receiving element 201 is processed by the signal-processing unit 202, which is controlled by the central processing unit 204, and is converted into digital image information. The image information digitized by the signal-processing unit 202 is subjected to a predetermined image processing in the image-processing unit 203 which is also controlled by the central processing unit 204, and then stored in the semiconductor memory 205 such as a non-volatile memory.

In this case, the semiconductor memory 205 may be a memory card inserted in the memory card slot 109, or may be a semiconductor memory integrated in a body of the camera. The liquid crystal monitor 106 may display the photographing image or may display the image stored in the semiconductor memory 205. An image stored in the semiconductor memory 205 can be transmitted to the outside of the camera via the communication card or the like 206 inserted in the communication card slot 110. Meanwhile, the above-mentioned central processing unit (CPU) 501 shown in FIG. 21 to control the drive of the lens groups may be included in the central processing unit 204, otherwise structured by use of other micro-processor connecting with the unit 501.

The image pickup lens 101 is embedded within the camera body into a collapsed or stored state as shown in FIG. 17 A when being transported, and the lens barrier 62 is also into a closed state. When a user operates the barrier-operating element 301 and opens the lens barrier 62, the power is turned on and the lens barrel is moved from the closed position to an opened position and projected from the camera body as shown in FIG. 17 B, so that the photographing state is established. At this time, the image pickup lens 101 within the lens barrel is set so that the respective lens groups of the optical systems constituting a zoom lens are arranged, for example, at a short-focus wide angle limit.

When the zoom lever 103 is operated, the arrangement of the respective lens groups in the optical system is changed through the movement of the lens groups along the optical axis, therefore, the zoom can be varied to the telescopic limit.

Preferably, an optical system of the finder 104 is configured such that the zooming is varied in association with the change of the angle of field of the image pickup lens 101.

In many cases, focusing is achieved by half-pressing operation of the shutter button 102. The focusing with the zoom lens in the lens barrel according to the present invention is achieved mainly by moving the fourth lens group 14. When the shutter button 102 is further pressed to a completely pressed state, the photographing is achieved, and subsequently the processing as described above is performed.

In order to display the image stored in the semiconductor memory 205 on the liquid crystal monitor 106 or transmit the same to the outside of the camera via the communication card or the like 206, the operating button 107 is operated in a predetermined manner. The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted out of the optical axis, and hence is stored in a line with the first lens group 11 and the second lens group 12 in a juxtaposed manner. Therefore, further reduction in thickness of the camera is achieved.

Generally, because a finder mechanism is disposed above of the lens barrel, therefore, certain camera operation is easy. Moreover, if the lens barrel includes a zoom variable power mechanism, because the finder mechanism also needs the zoom variable power mechanism, it is preferable that a drive source (DC motor, pulse motor or the like) for conducting the zoom variable power operation and a transmission mechanism (gear connecting mechanism or the like) for transferring a driving force of the drive source to the lens groups are disposed adjacent the finder mechanism. For example, if the finder mechanism is disposed on upper and left position of the lens barrel, the drive source and the transmission mechanism are disposed adjacent the upper and left position of the lens barrel to use a limited space effectively.

Next, the frame 31 for the retracted lens group or third lens group 13 is retracted, the retaining frame is stored below the lens barrel in consideration of the left space. The space is lower and right position or lower and left position of the lens barrel. In the embodiment, the space is disposed on the lower and right position of the lens barrel to store the retaining frame of the retracted third lens group. The above-mentioned storage part of the fixed lens cylinder is disposed at the position.

The drive source and the transmission mechanism for driving the lens groups are disposed at the lower and left position. As a result, a miniaturized lens barrel can be accomplished with effective use of fourth corners, the upper and left position, the upper and right position, the lower and right position, and the lower and left position of a usual circular lens barrel.

Next, an embodiment of a preferred zoom lens will be specifically explained by using the lens barrel, lens driving device, camera and mobile information terminal according to the above embodiment.

Referring herein below to the drawings, a zoom lens included in the above lens barrel (hereinafter, referred to as a zoom lens), lens unit, camera and mobile information terminal according to the present invention will be described in detail based on a third embodiment of the present invention.

Next, the third embodiment according to the present invention will be more specifically described.

The zoom lens according to the present invention comprises a four lens group structure, sequentially arranged from an object side, positive, negative, positive and positive, more particularly, a first lens group having positive refracting power, a second lens group having negative refracting power, a third lens group having positive refracting power, a fourth lens group having positive refracting power and an aperture stop disposed between the second lens group and third lens group. In the above zoom lens comprising the four lens groups having the positive, negative, positive and positive, the second lens group generally has a major variable power function, and is constructed as a so-called variator. However, in the zoom lens according to the present invention, the third lens group shares the variable power function to reduce the share of the second lens group. Therefore, the flexibility of aberration correction to be difficult with wide angle and high variable power is ensured. In the variable power from the wide angle limit to the telescopic limit, by largely moving the first lens group to the object side, the height of ray passing the first lens group at the wide angle limit (distance from the optical axis) is lowered to control the size of the first lens group with the wide angle, and also large spacing between the first lens group and the second lens group is ensured at the telescopic limit to accomplish a long focus.

Moreover, in the zoom lens of the present invention, the lens barrel structure is simplified and the eccentric accuracy between the groups is ensured by keeping the second lens group in a fixed position in the variable power. Of course, giving priority to the aberration correction, it is advantageous to move all lens groups. However, it complicates the structure of the lens barrel, and easily causes a manufacturing error The fixed second lens group in the variable power is a major premise of the present invention.

In the variable power from the wide angle limit to the telescopic limit, when the first and third lens groups monotonically move to the object side, the spacing between the first lens group and the second lens group is increased, and the spacing between the second lens group and the third lens group is reduced. Thereby, the magnifications of the second and third lens groups is increased, and the second and third lens groups share the variable power function each other.

Moreover, the fourth lens group moves to be located closer to the image side than the wide angle limit at the telescopic limit. By this moving, the magnification of the fourth lens group is increased in the variable power from the wide angle limit to the telescopic limit, so that the fourth lens group can share the variable power function. Accordingly, the variable power is effectively performed in a limited space.

In addition, sufficient aberration correction becomes possible after accomplishing a target wide angle and high variable power by satisfying the following condition equation.

$$0.60 < m4T < 0.85$$

Where m4T indicates an imaging magnification of the fourth lens group at the telescopic limit.

In this case, if m4T is 0.60 or less, the luminous flux emitted from the third lens group comes close to an afocal; thus, the third lens group can not effectively contribute to the variable power. As a result, the share of the variable power of the second lens group is increased. Accordingly, it becomes difficult to correct the curved field and astigmatism which increase with the wide angle. On the contrary, if m4T is 0.85 or more, the fourth lens group becomes too close to the image surface. Thereby, a necessary back-focus can not be ensured or the refracting power of the fourth lens group becomes too small. If the refracting power of the fourth lens group becomes too small, the exit pupil comes close to the image surface. Therefore, the ray incidence angle to the peripheral part of the light receiving element is increased, thereby, easily causing the shortage of the light volume in the peripheral part.

It is more preferable to satisfy the following condition equation.

$$0.65 < m4T < 0.80$$

Furthermore, it is preferable to satisfy the following condition equation regarding the change in the magnification of the fourth lens group in the variable power from the wide angle limit to the telescopic limit.

$$1.0 < m4T/m4W < 1.3$$

Where m4W indicates an imaging magnification of the fourth lens group at the wide angle limit.

In this case, if (m4T/m4W) is 1.0 or less, the fourth lens group can not contribute to the variable power. As a result, the shares of the variable power of the second and third lens groups are increased. Accordingly, it becomes difficult to balance the image surface in the variable power. On the contrary, if (m4T/m4W) is 1.3 or more, the share of the variable power of the fourth lens group becomes too big. Therefore, it becomes difficult to correct the aberration with the simple structure of the fourth lens group, for example, one positive lens.

It is more preferable to satisfy the following condition equation.

$$1.05 < m4T/m4W < 1.2$$

In the present invention, the second lens group is kept in the fixed position in the variable power, so that the spacing between the first lens group and the second lens group is determined only by the amount of moving of the first lens group. In this relation, it is preferable to satisfy the following condition equation.

$$0.50 < X1/f_T < 0.85$$

Where X1 indicates a total amount of moving of the first lens group in the variable power from the wide angle limit to the telescopic limit, and $f_T$ indicates a focal length of the entire system at the telescopic limit.

In this case, if (X1/$f_T$) is 0.50 or less, the contribution of the second lens group to the variable power is reduced. Thereby, the share of the third lens group is increased or the refracting power of the first and second lens groups has to be strengthened. Anyhow, various types of aberration are deteriorated. In addition, the total length of the lens is increased at the wide angle limit, and the height of ray passing the first lens group is thereby increased. Accordingly, the size of the first lens group is increased. On the contrary, if(X1/$f_T$) is 0.85 or more, the total length becomes too short at the wide angle limit or the total length becomes too long at the telescopic limit. If the total length becomes too short at the wide angle limit, the moving space of the third lens group is limited; thus, the contribution of the third lens group to the variable power is reduced. Therefore, it becomes difficult to correct the entire aberration. If the total length becomes too long at the telescopic limit, it disturbs downsizing the total length, and also the diameter is increased to ensure the peripheral light volume at the telescopic limit. In addition, the image performance is easily deteriorated by the manufacturing error such as the falling of the lens barrel.

It is more preferably to satisfy the following condition equation.

$$0.60 < X1/f_T < 0.75$$

The spacing between the second lens group and the third lens group is determined only by the amount of moving of the third lens group as well as the spacing between the first lens group and second lens group is determined only by the amount of moving of the first lens group. In this relation, it is preferable to satisfy the following condition equation.

$$0.25 < X3/f_T < 0.50$$

Where X3 indicates a total amount of moving of the third lens group in the variable power from the wide angle limit to the telescopic limit.

In this case, if (X3/$f_T$) is 0.25 or less, the contribution of the third lens group to the variable power is reduced. As a result, the share of the second lens group is increased or the refracting power of the third lens group has to be strengthened. Anyhow, various types of aberration are deteriorated. On the contrary, if (X3/$f_T$) is 0.45 or more, the total length of the lens becomes too long at the wide angle limit, and the height of ray passing the first lens group is thereby increased. Accordingly, the size of the first lens group is increased.

It is more preferable to satisfy the following condition equation.

$$0.30 < X3/f_T < 0.45$$

Regarding the aberration correction, it is further preferable to satisfy the following condition equations.

$$0.6 < |f_2|/f_3 < 1.0$$

$$6.0 < f_1/f_W < 10.0$$

Where $f_1$ indicates a focal length of the first lens group, $f_2$ indicates a focal length of the second lens group, $f_3$ indicates a focal length of the third lens group, and $f_W$ indicates a focal length of the entire system at the wide angle limit.

In this case, if ($|f_2|/f_3$) is 0.6 or less, the refracting power of the second lens group becomes too strong. If ($|f_2|/f_3$) is 1.0 or more, the refracting power of the third lens group becomes too strong. Anyhow, the aberration fluctuation tends to be increased in the variable power.

Moreover, if ($f_1/f_W$) is 6.0 or less, the imaging magnification of the second lens group comes close to the equal magnification to increase the variable power efficiency. It is advantageous in the high variable power, but each of the lenses in the first lens group requires large refracting power. Therefore, it has a negative effect such as the deterioration in the chromatic aberration especially at the telescopic limit. Moreover, the thickness and the diameter of the first lens group are increased. Accordingly, it is disadvantageous in downsizing especially with a hosed state. On the contrary, if ($f_1/f_W$) is 12.0 or more, the contribution of the second lens group to the variable power is reduced. Therefore, it becomes difficult to obtain the high variable power.

In addition, the above described object of the present invention can be accomplished by the following structure. More particularly, in a zoom lens comprising four lens groups, sequentially arranged from an object side, a first lens group having positive refracting power, a second lens group having negative refracting power, an aperture stop, a third lens group having positive refracting power and a fourth lens group having positive refracting power, the first lens group and the third lens group monotonically move to the object side with the variable power from the wide angle limit to the telescopic limit, the second lens group is kept in a fixed position in the variable power from the wide angle limit to the telescopic limit and fourth lens group moves to be located closer to the image side than the wide angle limit at the telescopic limit. Such a zoom lens can be constructed to satisfy the following condition equation.

$$0.50 < X1/f_T < 0.85$$

Where X1 indicates a total amount of moving of the first lens group in the variable power from the wide angle limit to the telescopic limit, and $f_T$ indicates a focal length of the entire system at the telescopic limit.

In the zoom lens of the present invention, the aperture stop moves independently of the second and third lens groups adjacent to the aperture stop, and it is preferable for the spacing between the aperture stop and the third lens group to be the widest at the wide angle limit and to be the narrowest at the telescopic limit.

It becomes possible to bring the aperture stop close to the first lens group at the wide angle limit to lower the height of ray passing the first lens group by making the spacing between the aperture stop and the third lens group to be the widest at the wide angle limit. Accordingly, the first lens group can be further downsized.

Next, conditions for performing further preferable aberration correction will be described within a range without discouraging the downsizing.

It is preferable for the second lens group to include three lenses, sequentially arranged from the object side, a negative lens having a large curvature surface on the image side, a positive lens having a large curvature surface on the image side and a negative lens having a large curvature surface on the object side.

When the second lens group comprises three lenses as a variable power group having negative refracting power, there is a well known structure, sequentially arranged from an object side, a negative lens, a negative lens and a positive lens. However, compared with this structure, the above described structure is superior to the correction ability of the chromatic aberration of magnification with the wide angle. Here, in the second lens group, the second lens and the third lens from the object side can be appropriately cemented.

In this case, it is preferable for the respective lenses of the second lens group to satisfy the following condition equations.

$$1.75 < N_{21} < 1.90, 35 < v_{21} < 50$$

$$1.65 < N_{22} < 1.90, 20 < v_{22} < 35$$

$$1.75 < N_{23} < 1.90, 35 < v_{23} < 50$$

Where $N_{2i}$ indicates a refraction index of i-th lens counting from the object side in the second lens group, and $v_{2i}$ indicates an Abbe number of i-th lens counting from the object side in the second lens group.

The chromatic aberration can be further preferably corrected by selecting such a glass type.

It is preferable for the first lens group to comprise at least one negative lens and at least one positive lens, sequentially arranged from the object side. More particularly, it is preferable for the first lens group to comprise two lenses, sequentially arranged from the object side, a negative meniscus lens having a convex surface on the object side and a positive lens having a strong convex surface on the object side, or to comprise three lenses, sequentially arranged from the object side, a negative meniscus lens having a convex surface on the object side, a positive lens having a strong convex surface on the object side and a positive lens having a strong convex surface on the object side.

It is preferable for the third lens group to comprise three lenses, sequentially arranged from the object side, a positive lens, positive lens and negative lens. Here, in the third lens group, the second lens and the third lens from the object side can be appropriately cemented.

It is preferable for the fourth lens group to comprise one positive lens. When focusing to a finite distance, it is preferable to use a method for moving only the fourth lens group because the weight of the object to be moved is the smallest. In addition, the amount of moving of the fourth lens group in the variable power is small, and the fourth lens group also has a merit capable of using a moving mechanism both as the variable power and the focusing.

In order to further improve the downsizing while keeping preferable aberration correction, it is necessary to use an aspheric surface. It is desirable for at least the second lens group and the third lens group to use at least one aspheric surface, respectively. Especially, in the second lens group, if the surface of the object most side and the surface of the image most side are the aspheric lenses, it is possible to obtain a high effect for the correction of the distortion, astigmatism and the like which tend to be increased with the wide angle.

A molded optical glass and a molded optical plastic (referred to as a glass mold aspheric surface and a plastic mold aspheric surface), and also an aspheric surface lens formed by molding a thin resin layer on a glass lens, and forming the surface as an aspheric surface (referred to as a hybrid aspheric surface, replica aspheric surface or the like), etc., can be used as the aspheric surface lens.

In order to simplify the mechanism, it is desirable for the opening diameter of the aperture stop to be a constant regardless of the variable power. However, the change in the F-number (F value) with the variable power can be reduced by setting the opening diameter of the long focus limit larger than the short focus limit. In addition, when the light volume reaching the image surface is necessary to be reduced, the aperture stop can be downsized. However, it is preferable to reduce the light volume by inserting a ND (Natural Density) filter and the like without largely changing the diameter of the aperture stop, because the deterioration in the resolution by the diffraction phenomenon can be prevented.

If a camera is constructed by using the above zoom lens or the lens unit using the zoom lens as an optical system for photographing, a sufficient wide field angle that the half field angle of the wide angle limit is 38 degrees or more can be obtained, and also a variable power ratio of 4.5 times or more can be obtained. Moreover, by using the compact zoom lens having a resolution corresponding to an image pick up device having three million to five million pixels or more, it is possible to obtain a compact and highly portable camera. Furthermore, it is possible to obtain a high image quality by the high resolution.

If a mobile information terminal is constructed by using the above zoom lens or the lens unit using the zoom lens as an optical system for photographing of a camera functional part, a sufficient wide field angle that the half field angle of the wide angle limit is 38 degrees or more can be obtained, and also a variable power ratio of 4.5 times or more can be obtained. Moreover, by using the compact zoom lens having a resolution corresponding to an image pick up device having three million to five million pixels or more, it is possible to obtain a compact and highly portable mobile information terminal. Furthermore, it is possible to obtain a high image quality by the high resolution.

Embodiment 1

Next, specific embodiments will be described in detail based on the above embodiment of the present invention. The following embodiments 1, 2, 3, 4 are the embodiments specifically structured by the specific numerical examples of the zoom lenses according to the present invention. The embodiment 5 is the specific embodiment of the camera or the mobile information terminal according to the present invention using the lens unit comprising the zoom lens as described in the embodiments 1 to 4 as the optical system for photographing.

The embodiments 1 to 4 of the zoom lenses according to the present invention indicate the structures of the zoom lenses and the specific numeral examples. In addition, in the embodiments 1 to 4, the maximum image height is 3.70 mm.

In each of the embodiments 1 to 4, an optical element comprising a parallel plate disposed on the image side of the fourth lens group assumes various types of optical filters such as an optical lowpass filter and infrared cut filter, or a cover glass (seal glass) of a light receiving element such as a CCD sensor. In this case, a filter/cover is used as the optical element.

Optical glasses are used for the materials of the respective lenses except that optical plastics are used for the ninth lens (fourth lens group) in the embodiment 1 and the tenth lens (fourth lens group) in the embodiment 3.

In each of the embodiments 1 to 4, the surface of the object most side and the surface of the image most side in the second lens group, both surfaces of the lens of the object most side in the third lens group and the surface of the object most side in the fourth lens group use the aspheric surfaces, respectively. In addition, as described above, each of the aspheric surfaces in the embodiments 1 to 4 is explained by directly adopting the lens surface as the aspheric surface like a so-called mold aspheric surface lens. However, the aspheric surface may comprise a so-called aspheric surface lens of hybrid lens type which obtains the aspheric surface similar to the above aspheric surface by providing a resin thin film forming the aspheric surface on a lens surface of aspheric lens.

The aberration in the embodiments 1 to 4 is sufficiently corrected and the zoom lens can correspond to a light receiving element having three million pixels to five million pixels. It is apparent from the embodiments 1 to 4 that a preferable image performance is ensured and obtained while accomplishing the sufficient downsizing by constructing the zoom lens in accordance with the present invention.

The meanings of symbols in the embodiments 1 to 4 are as follows.
f: focal length of the entire system
F: F-number
ω: half field angle
R: radius of curvature
D: surface separation
$N_d$: refraction index (d is a lens number=1 to 10)
$v_d$: Abbe number (d is a lens number 1 to 10)
K: conical constant of aspheric surface
$A_4$: fourth-order aspheric surface coefficient
$A_6$: sixth-order aspheric surface coefficient
$A_8$: eighth-order aspheric surface coefficient
$A_{10}$: tenth-order aspheric surface coefficient Where C is a reciprocal of the radius of curvature of paraxial (paraxial curvature) and H is height from the optical axis, the aspheric surface used herein is defined by the following equation.

$$X = [(CH^2)/\{1 + \sqrt{(1-(1+K)CH)}\}] + A_4 \cdot H^4 + A_6 \cdot H^6 + A_8 \cdot H^8 + A_{10} \cdot H^{10} \quad \text{Equation 1}$$

FIGS. 29A, 29B, 29C show the structures of the optical systems of the zoom lenses according to the embodiment 1 of the present invention. FIG. 29A illustrates the short focus limit, i.e., the wide angle limit. FIG. 29B illustrates the intermediate focal length. FIG. 29C illustrates the long focus limit, i.e., the telescopic limit.

The zoom lens illustrated in each of FIGS. 29A, 29B, 29C comprises a first lens E1, second lens E2, third lens E3, fourth lens E4, fifth lens E5, sixth lens E6, seventh lens E7, eighth lens E8, ninth lens E9, aperture stop FA and filter/cover FC. In this case, a first lens group G1 comprises the first and second lenses E1, E2. A second lens group G2 comprises the third, fourth and fifth lenses E3, E4, E5. A third lens group comprises the sixth, seventh, and eighth lenses, E6, E7, E8. A fourth lens group comprises the ninth lens E9. Each of the lens groups is supported by an appropriate common supporting frame and the like, and is integrally operated in zooming and the like. Surface numbers of the respective optical surfaces are indicated in FIG. 29A. In order to avoid the explanation to be complicated by the increase in the digit numbers of the reference numerals, the respective reference numerals indicated in FIG. 29A, 29B, 29C are applied to the respective embodiments. Therefore, the reference numerals used in FIG. 29A, 29B, 29C are applied to the FIGS. 30A, 30B, 30C, 31A, 31B, 31C, 32A, 32B, 32C but those are not always the common structures with another embodiment.

In each of FIGS. 29A, 29B, 29C, each of the optical elements comprising the optical system of the zoom lens is sequentially arranged from the object side such as a photographic subject, the first lens E1, second lens E2, third lens E3, fourth lens E4, fifth lens E5, aperture stop FA, sixth lens E6, seventh lens E7, eighth lens E8, ninth lens E9 and filter/cover FC, and an image is imaged onto the back of the filter/cover FC.

The first lens E1 comprises a negative meniscus lens having a convex surface on the object side. The second lens E2 comprises a positive meniscus lens having a convex surface on the object side. The first lens group G1 comprising the first lens E1 and the second lens E2 has a positive focal length, i.e., positive refracting power, in its entirety. The third lens E3 comprises a negative meniscus having a convex surface on the object side, an aspheric surface on the surface of the object side and a strong concave surface on the image side. The fourth lens E4 is a positive lens comprising a biconvex lens having a strong convex surface on the image side. The fifth lens E5 is a negative lens comprising a biconcave lens having a strong concave surface on the object side and an aspheric surface on the image side. The fourth and fifth lenses E4, E5 are firmly cemented to form a cemented lens.

The second lens group G2 comprising the third lens E3, fourth lens E4 and fifth lens E5 has a negative focal length, i.e., negative refracting power, in its entirety. The sixth lens E6 is a positive lens comprising a biconvex lens having aspheric surfaces on the both surfaces. The seventh lens E7 is a positive lens comprising a biconvex lens having a strong convex surface on the image side. The eighth lens E8 is a negative lens comprising a biconcave lens. The seventh and eighth lenses E7, E8 are firmly cemented to form a cemented lens. The third lens group G3 comprising the sixth lens E6, seventh lens E7 and eighth lens E8 has positive refracting power in its entirety. The ninth lens E9 is a positive lens comprising a biconvex lens having a strong convex surface including an aspheric surface on the object side. The fourth lens group G4 comprising the ninth lens E9 has a positive focal length.

In the variable power from the short focus limit, i.e., the wide angle limit to the long focus limit, i.e., the telescopic limit, the first lens group G1, the third lens group G3 and the fourth lens group G4 move such that the variable spacing between the respective groups, more particularly, spacing DA between the surface of the object most side in the first lens group G1, i.e., the surface of the image side of the second lens E2 (surface number 4) and the surface of the object most side in the second lens group G2, i.e., the surface of the object side of the third lens E3 (surface number 5), spacing DB between the surface of the image most side in the second lens group G2, i.e., the surface of the image side of the fifth lens E5 (surface number 9) and the surface of the aperture stop FA (surface number 10), spacing DC between the surface of the aperture stop FA (surface number 10) and the surface of the object most side in the third lens group G3, i.e., the surface of the object side of the sixth lens E6 (surface number 11), spacing DD between the surface of the image most side in the third lens group G3, i.e., the surface of the image side of the eighth lens E8 (surface number 15) and the surface of the object most side in the fourth lens group G4, i.e., the surface of the object side of the ninth lens E9 (surface number 16), and spacing DE between the surface of the image most side in the fourth lens group G4, i.e., the surface of the image side of the ninth lens E9 (surface number 17) and the surface of the object side of the filter/cover FC (surface number 18) are changed, the first lens group G1 and the third lens group G3 monotonically move toward the object side with the variable power from the wide angle limit to the telescopic limit, the second lens group G2 is kept in a fixed position in the variable power from the wide angle limit to the telescopic limit, and the fourth lens group G4 is located closer to the image side than the wide angle limit at the telescopic limit.

In the embodiment 1, the focal length of the entire system f, F-number F, half filed angle ω are respectively changed by the zooming within the ranges of f=4.74 to 21.59, F=3.32 to 4.98, ω=39.14 to 9.55. The characteristics of respective optical surfaces are as follows.

| Surface Characteristics | | | | | | |
|---|---|---|---|---|---|---|
| Surface Number | R | D | $N_d$ | $v_d$ | | Remark |
| 01 | 23.330 | 1.00 | 1.84666 | 23.80 | First Lens | First Lens Group |
| 02 | 15.002 | 0.26 | | | | |
| 03 | 15.442 | 3.47 | 1.77250 | 49.60 | Second Lens | |
| 04 | 135.649 | Variable (DA) | | | | |
| 05* | 91.446 | 0.84 | 1.83481 | 42.70 | Thrid Lens | Second Lens Group |
| 06 | 4.439 | 1.77 | | | | |
| 07 | 15.704 | 2.67 | 1.74077 | 27.80 | Fourth Lens | |
| 08 | −6.205 | 0.74 | 1.83481 | 42.70 | Fifth Lens | |
| 09* | 632.018 | Variable (DB) | | | | |
| 10 | Aperture Stop | Variable (DC) | | | | |
| 11* | 8.333 | 2.78 | 1.58913 | 61.15 | Sixth Lens | Thrid Lens Group |
| 12* | −8.607 | 0.10 | | | | |
| 13 | 15.588 | 2.42 | 1.83481 | 42.70 | Seventh Lens | |
| 14 | −4.691 | 0.80 | 1.69895 | 30.10 | Eight Lens | |
| 15 | 4.498 | Variable (DD) | | | | |
| 16* | 12.500 | 2.21 | 1.54340 | 56.00 | Ninth Lens | Fourth Lens Group |
| 17 | −34.711 | Variable (DE) | | | | |
| 18 | ∞ | 0.90 | 1.51680 | 64.20 | | Filter/Cover |
| 19 | ∞ | | | | | |

The respective optical surfaces of the fifth surface, ninth surface, eleventh surface, twelfth surface and sixteenth surface denoted by applying * asterisk on the surface numbers in the table 1 are the aspheric surfaces. The parameters in the above equation "equation 1" of each aspheric surface are as follows.

Aspheric Surface: Fifth Surface
    K=0.0, $A_4$=2.42400×10$^{-4}$, $A_6$=−2.92208×10$^{-6}$, $A_8$=9.40210×10$^{-9}$, $A_{10}$=−4.16456×10$^{-11}$ Aspheric Surface: Ninth Surface
    K=0.0, $A_4$=−5.16761×10$^{-4}$, $A^6$=1.81605×10$^{-6}$, $A_8$=−1.01642×10$^{-6}$, $A^{10}$=−1.75699×10$^{-8}$ Aspheric Surface: Eleventh Surface
    K=0.0, $A_4$=−1.08496×10$^{-3}$, $A_6$=−2.17192×10$^{-5}$, $A_8$=5.79037×10$^{-6}$, $A_{10}$=−5.25493×10$^{-7}$ Aspheric Surface: Twelfth Surface
    K=0.0, $A_4$=4.85474×10$^{-4}$, $A_6$=−4.49460×10$^{-5}$, $A_8$=8.98429×10$^{-6}$, $A_{10}$=−5.68154×10$^{-7}$ Aspheric Surface: Sixteenth Surface
    K=0.0, $A_4$=−5.46424×10$^{-5}$, $A_6$=1.80637×10$^{-5}$, $A_8$=−9.17793×10$^{-7}$, $A_{10}$=2.09899×10$^{-8}$ The variable spacing DA between the first lens group G1 and the second lens group G2, the variable spacing DB between the second lens group G2 and the aperture stop FA, the variable spacing DC between the aperture stop FA and the third lens group G3, the variable spacing DD between the third lens group G3 and the fourth lens group G4 and the variable spacing DE between the fourth lens group G4 and the optical filter FC are changed with the zooming as the following table.

| Variable Spacing | | | |
|---|---|---|---|
| | short foucs limit f = 4.740 | intermediate focal length f = 10.131 | long foucs limit f = 21.591 |
| DA | 0.600 | 6.655 | 15.680 |
| DB | 7.051 | 4.217 | 1.200 |
| DC | 3.043 | 1.054 | 1.000 |

-continued

| Variable Spacing | | | |
|---|---|---|---|
| | short foucs limit f = 4.740 | intermediate focal length f = 10.131 | long foucs limit f = 21.591 |
| DD | 2.000 | 7.725 | 10.995 |
| DE | 3.484 | 2.583 | 2.382 |

The values according to the above described respective condition equations in the embodiment 1 are as follows.

Numerical values of condition equations.

$m4T=0.718$ $m4T/m4W=1.098$ $X1/f_T=0.698$ $X3/f_T=0.366$ $|f_2|/f_3=0.792$ $f_1/f_W=8.44$

Accordingly, the numerical values according to the above described respective condition equations in the embodiment 1 are within the ranges of the condition equations.

Embodiment 2

Figure 30A:
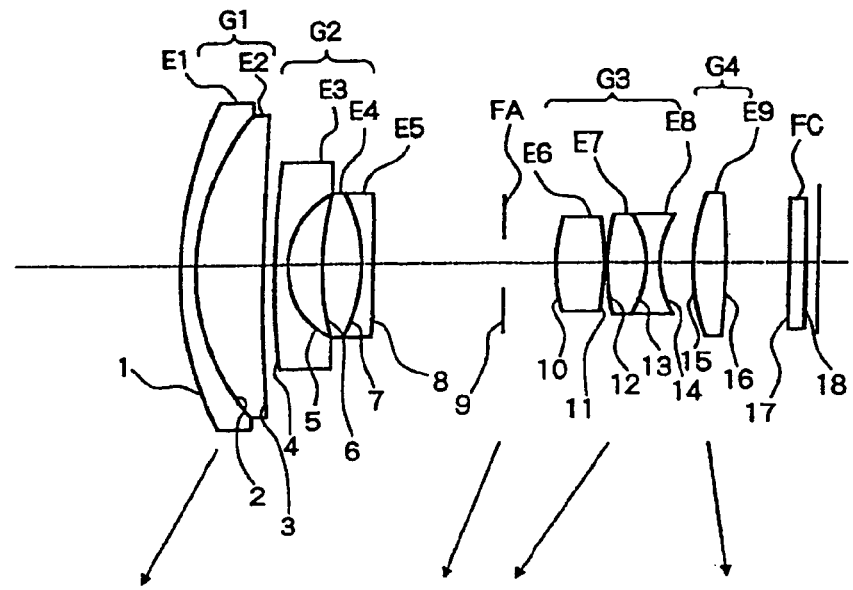
FIGS. 30A, 30B, 30C are schematic cross-section views along optical axes; each of the views illustrates a structure of an optical system of a zoom lens according to the embodiment 2 of the present invention.
Figure 30B:
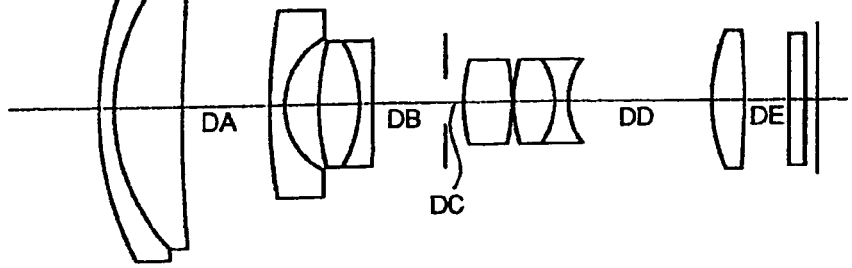
Figure 30C:
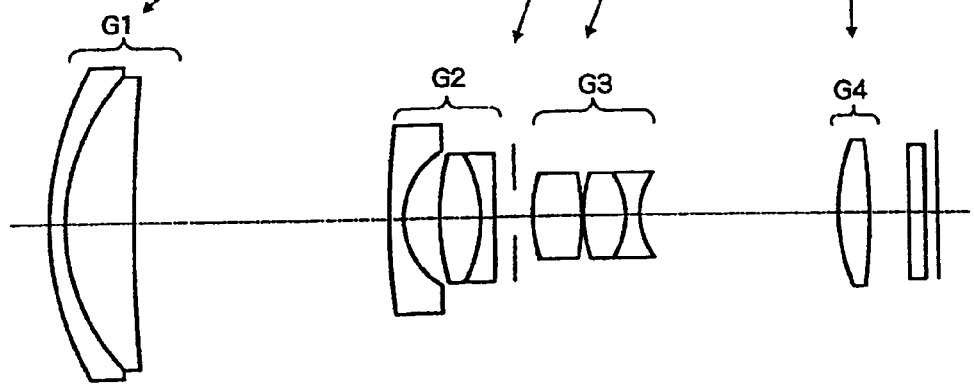

FIGS. 30A, 30B, 30C show the structures of the optical systems of the zoom lenses according to the embodiment 2 of the present invention. FIG. 30A illustrates the wide angle limit (short focus limit). FIG. 30B illustrates the intermediate focal length. FIG. 30C illustrates the telescopic limit (long focus limit).

The zoom lens illustrated in each of FIGS. 30A, 30B, 30C includes a first lens E1, second lens E2, third lens E3, fourth lens E4, fifth lens E5, sixth lens E6, seventh lens E7, eighth lens E8, ninth lens E9, aperture stop FA and filter/cover FC. In this case, a first lens group G1 comprises the first lens E1 and second lens E2. A second lens group G2 comprises the third lens E3, fourth lens E4 and fifth lens E5. A third lens group G3 comprises the sixth lens E6, seventh lens E7 and eighth lens E8. A fourth lens group G4 comprises the ninth lens E9. Each lens group is supported by an appropriate common supporting frame and the like, and is integrally operated in the zooming and the like. Surface numbers of respective optical surfaces are indicated in FIG. 30A. In order to avoid the explanation to be complicated by the increase in the digit numbers of the reference numerals, the respective reference numerals indicated in FIG. 30A are applied to the respective embodiments. Therefore, the reference numerals used in FIG. 30A, 30B, 30C are applied to the FIGS. 29A, 29B, 29C, 31A, 31B, 31C, 32A, 32B, 32C, but those are not always the common structures with other embodiments.

In FIG. 30A, each of the optical elements comprising the optical system of the zoom lens are sequentially arranged from the object side, the first lens E1, second lens E2, third lens E3, fourth lens E4, fifth lens E5, aperture stop FA, sixth lens E6, seventh lens E7, eighth lens E8, ninth lens E9 and filter/cover FC, and an image is imaged onto the back of the filter/cover FC.

The first lens E1 is a negative meniscus lens having a convex surface on the object side. The second lens E2 is a positive meniscus lens having a convex surface on the object side. The first lens E1 and the second lens E2 are firmly cemented to form a cemented lens. The first lens group G1 comprising the cemented lens of the first lens E1 and the second lens E2 has positive refracting power in its entirety. The third lens E3 is a negative meniscus lens, having a convex surface on the object side, an aspheric surface on the surface of the object side and a strong concave surface on the image side. The fourth lens E4 is a positive lens comprising a biconvex lens having a strong convex surface on the image side. The fifth lens E5 is a negative lens comprising a biconcave lens having a strong concave surface on the object side and an aspheric surface on the image side. The fourth lens E4 and the fifth lens E5 are firmly cemented to form a cemented lens. The second lens group G2 comprising the third lens E3, fourth lens E4 and fifth lens E5 has a negative focal length, i.e., negative refracting power, in its entirety. The sixth lens E6 is a positive lens comprising a biconvex lens having aspheric surfaces on the both surfaces.

The seventh lens E7 is a positive lens comprising a biconvex lens having a strong convex surface on the image side. The eighth lens E8 is a negative lens comprising a biconcave lens. The seventh lens E7 and the eighth lens E8 are firmly cemented to form a cemented lens. The third lens group G3 comprising the sixth lens E6, seventh lens E7 and eighth lens E8 has positive refracting power in its entirety. The ninth lens E9 is a positive lens, comprising a biconvex lens having a strong convex surface including an aspheric surface on the object side. The fourth lens group G4 comprising the ninth lens E9 has a positive focal length.

In the variable power from the wide angle limit (short focus limit) to the telescopic limit (long focus limit), the first lens group G1, third lens group G3 and fourth lens group G4 move such that the variable spacing between the respective groups, more particularly, spacing DA between the surface of the image most side in the first lens group G1, i.e., the surface of the image side of the second lens E2 (surface number 3) and the surface of the object most side in the second lens group G2, i.e., the surface of the object side of the third lens E3 (surface number 4), spacing DB between the surface of image most side in the second lens group G2, i.e., the surface of the image side of the fifth lens E5 (surface number 8) and the surface of the aperture stop FA (surface number 9), spacing DC between the surface of the aperture stop FA (surface number 9) and the surface of the object most side in the third lens group G3, i.e., the surface of the object side of the sixth lens E6 (surface number 10), spacing DD between the surface of the image most side in the third lens group G3, i.e., the surface of image side of the eighth lens E8 (surface number 14) and the surface of the object most side in the fourth lens group G4, i.e., the surface of the object side of the ninth lens E9 (surface number 15) and spacing DE between the surface of the image most side in the fourth lens group G4, i.e., the surface of the image side of the ninth lens E9 (surface number 16) and the surface of the object side of the filter/cover FC (surface number 17) are changed, the first lens group G1 and the third lens group G3 monotonically move toward the object side with the variable power from the wide angle limit to the telescopic limit, the second lens group G2 is kept in a fixed position in the variable power from the wide angle limit to the telescopic limit, and the fourth lens group G4 is located closer to the image side than the wide angle limit at the telescopic limit.

In the embodiment 2, the focal length of the entire system f, F-number F and half field angle ω are changed by the zooming within the ranges of f=4.74 to 21.57, F=3.56 to 5.00 and ω=39.15 to 9.57. The characteristics of the respective optical surfaces are as follows.

| | | Optical Characteristics | | | |
|---|---|---|---|---|---|
| Surface Number | R | D | $N_d$ | $v_d$ | Remark |
| 01 | 20.085 | 0.91 | 1.92286 | 18.90 First lens | First Lens Group |
| 02 | 12.792 | 4.11 | 1.72047 | 34.70 Second Lens | |
| 03 | 98.998 | Variable (DA) | | | |
| 04* | 63.441 | 0.84 | 1.83481 | 42.70 Thrid Lens | Second Lens Group |
| 05 | 4.533 | 2.09 | | | |
| 06 | 18.494 | 2.45 | 1.76182 | 26.50 Fourth Lens | |
| 07 | −8.130 | 0.74 | 1.83481 | 42.70 Fifth Lens | |
| 08* | 165.705 | Variable (DB) | | | |
| 09 | Aperture Stop | Variable (DC) | | | |
| 10* | 8.333 | 2.85 | 1.58913 | 61.15 Sixth Lens | Third Lens Group |
| 11* | −10.600 | 0.10 | | | |
| 12 | 13.000 | 2.42 | 1.83481 | 42.70 Seventh Lens | |
| 13 | −4.942 | 0.80 | 1.69895 | 30.10 Eighth Lens | |
| 14 | 4.527 | Variable (DD) | | | |
| 15* | 12.500 | 1.86 | 1.58913 | 61.15 Ninth Lens | Fourth Lens Group |
| 16 | −46.232 | Variable (DE) | | | |
| 17 | ∞ | 0.90 | 1.51680 | 64.20 | Filter/Cover |
| 18 | ∞ | | | | |

The respective optical surfaces of the fourth surface, eighth surface, tenth surface, eleventh surface and fifteenth surface denoted by applying * on the surface numbers in the table 3 are aspheric surfaces, and the parameters in the equation 1 of the respective aspheric surfaces are as follows.

Aspheric Surface: Fourth Surface
  $K=0.0$, $A_4=1.98102\times10^{-4}$, $A_6=-3.68668\times10^{-6}$, $A_8=4.52405\times10^{-8}$, $A_{10}=-2.67683\times10^{-10}$ Aspheric Surface: Eighth Surface
  $K=0.0$, $A_4=-4.56912\times10^{-4}$, $A_6=-2.43635\times10^{-6}$, $A_8=-7.31048\times10^{-7}$, $A_{10}=-1.13163\times10^{-8}$ Aspheric Surface: Tenth Surface
  $K=0.0$, $A_4=-7.28261\times10^{-4}$, $A_6=5.77887\times10^{-6}$, $A_8=1.03208\times10^{-6}$, $A_{10}=-1.81386\times10^{-7}$ Aspheric Surface: Eleventh Surface
  $K=0.0$, $A_4=4.65357\times10^{-4}$, $A_6=1.34799\times10^{-5}$, $A_8=-4.37956\times10^{-7}$, $A_{10}=6.85503\times10^{-8}$ Aspheric Surface: Fifteenth Surface
  $K=0.0$, $A_4=-6.80550\times10^{-5}$, $A_6=1.42409\times10^{-5}$, $A_8=-6.37766\times10^{-7}$, $A_{10}=1.29041\times10^{-8}$ The valuable spacing DA between the first lens group G1 and second lens group G2, the valuable spacing DB between the second lens group G2 and aperture stop FA, the valuable spacing DC between the aperture stop FA and third lens group G3, the valuable spacing DD between the third lens group G3 and fourth lens group G4 and the valuable spacing DE between the fourth lens group G4 and optical filter FC are changed by the zooming as the following table.

| | Variable Spacing | | |
| --- | --- | --- | --- |
| | Short Focus limit f = 4.737 | Intermediate Focal Length f = 10.117 | Long Focus Limit f = 21.575 |
| DA | 0.600 | 5.225 | 15.097 |
| DB | 7.709 | 4.171 | 1.269 |
| DC | 3.108 | 1.200 | 1.000 |
| DD | 2.000 | 8.520 | 11.831 |
| DE | 3.652 | 2.578 | 2.368 |

Moreover, the values according to the above described respective condition equations in the embodiment 2 are as follows.

Numerical values of the condition equations.

$m4T=0.722$ $m4T/m4W=1.117$ $X1/f_T=0.672$ $X3/f_T=0.396$ $|f_2|/f_3=0.799$ $f_1/f_W=8.84$

Therefore, the numerical values according to the above described respective condition equations in the embodiment 2 are within the ranges of the condition equations.

Embodiment 3

Figure 31A:
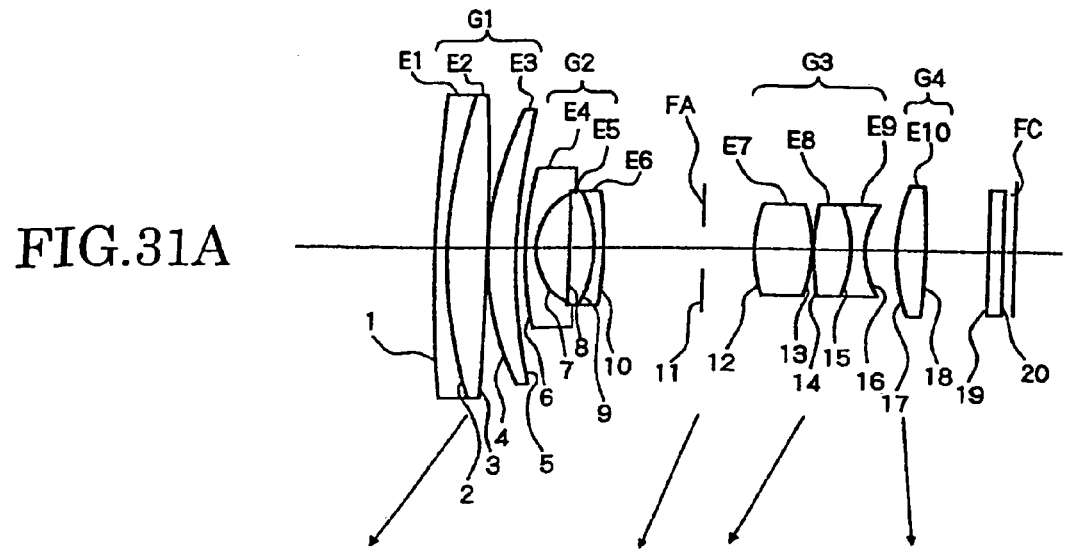
FIGS. 31A, 31B, 31C are schematic cross-section views along optical axes; each of the views illustrates a structure of an optical system of a zoom lens according to the embodiment 3 of the present invention.
Figure 31B:
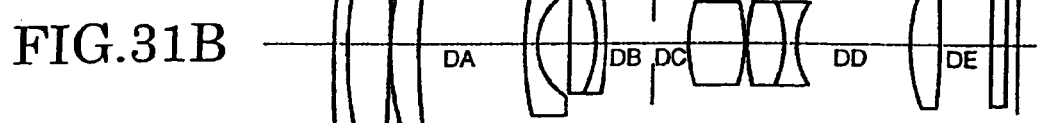
Figure 31C:
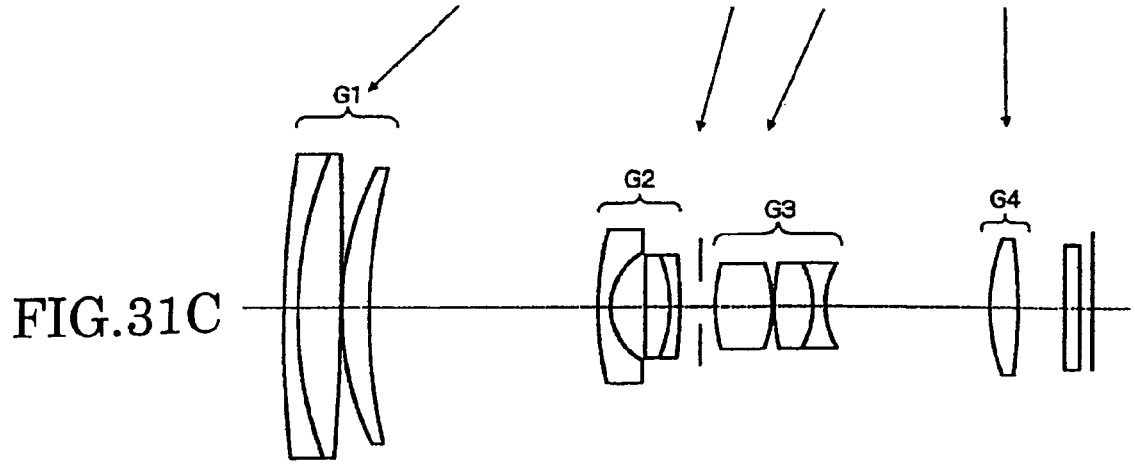

FIGS. 31A, 31B, 31C show structures of the optical systems of the zoom lenses according to the embodiment 3 of the present invention. FIG. 31A illustrates the wide angle limit (short focus limit). FIG. 31B illustrates the intermediate focal length. FIG. 31C illustrates the telescopic limit (long focus limit).

The zoom lens illustrated in each of FIGS. 31A, 31B, 31C comprises a first lens E1, second lens E2, third lens E3, fourth lens E4, fifth lens E5, sixth lens E6, seventh lens E7, eighth lens E8, ninth lens E9, tenth lens E10, aperture stop FA and filter/cover FC. In this case, a first lens group G1 comprises the first lens E1, second lens E2 and third lens E3. A second lens group G2 comprises the fourth lens E4, fifth lens E5 and sixth lens E6. A third lens group G3 comprises the seventh lens E7, eighth lens E8 and ninth lens E9. A fourth lens group G4 comprises the tenth lens E10. Each of the lens groups is supported by an appropriate common supporting frame and the like, and is integrally operated in the zooming and the like. The respective reference numerals in FIGS. 31A, 31B, 31C are independently used for each of the embodiments; therefore, the common reference numerals are used in FIGS. 29A, 29B, 29C, 30A, 30B, 30C, 32A, 32B, 32C. However, these are not always the common structures with other embodiments.

In each of FIGS. 31A, 31B, 31C, the respective optical elements comprising the optical system of the zoom lens are sequentially arranged from an object side such as a photographic subject, the first lens E1, second lens E2, third lens E3, fourth lens E4, fifth lens E5, sixth lens E6, aperture stop FA, seventh lens E7, eighth lens E8, ninth lens E9, tenth lens E10 and filter/cover FC, and an image is imaged onto the back of the filter/cover FC.

The first lens E1 is a negative meniscus lens having a convex surface on the object side. The second lens E2 is a positive lens comprising a biconvex lens having a strong convex surface on the object side. The first lens E1 and the second lens E2 are firmly cemented to form a cemented lens. The third lens E3 is a positive meniscus lens having a convex surface on the object side. The first lens group G1 comprising the first lens E1, second lens E2 and third lens E3 has positive refracting power in its entirety. The fourth lens E4 is a negative meniscus lens having a convex surface on the object side, an aspheric surface on the surface of the object side and a strong concave surface on the image side. The fifth lens E5 is a positive lens comprising a plane-convex lens having a plane surface on the object side. The sixth lens E6 is a negative meniscus lens having a convex on the image side and an aspheric surface on the surface of the image side. The fifth lens E5 and the sixth lens E6 are firmly cemented to form a cemented lens. The second lens group G2 comprising the fourth lens E4, fifth lens E5 and sixth lens E6 has a negative focal length, i.e., negative refracting power, in its entirety.

The seventh lens E7 is a positive lens comprising a biconvex lens having aspheric surfaces on the both surfaces. The eighth lens E8 is a positive lens comprising a biconvex lens having a strong convex surface on the image side. The ninth lens E9 is a negative lens comprising a biconcave lens. The eighth and ninth lenses E8, E9 are firmly cemented to form a cemented lens. The third lens group G3 comprising the seventh lens E7, eighth lens E8 and ninth lens E9 has positive refracting power in its entirety. The tenth lens E10 is a positive lens comprising a biconvex lens having a strong convex surface including an aspheric surface on the object side. The fourth lens group G4 comprising the tenth lens E10 has a positive focal length.

In the variable power from the wide angle limit (short focus limit) to the telescope end (long focus limit), the first lens group G1, third lens group G3 and fourth lens group G4 move such that the variable spacing between the respective groups, more particularly, spacing DA between the surface of the image most side in the first lens group G1, i.e., the surface of the image side of the third lens E3 (surface number 5) and the surface of the object most side in the second lens group 2, i.e., the surface of the object side of the fourth lens E4 (surface number 6), spacing DB between the surface of the image most side in the second lens group G2, i.e., the surface of the image side of the sixth lens E6 (surface number 10) and the surface of the aperture stop FA (surface number 11), spacing DC between the surface of the aperture stop FA (surface number 11) and the surface of the object most side in the third lens group G3, i.e., the surface of the object side of the seventh lens E7 (surface number 12), spacing DD between the surface of the image most side in the third lens group G3, i.e., the surface of the image side of the ninth lens E9 (surface number 16) and the surface of the object most side in the fourth lens group G4, i.e., the surface of the object side of the tenth lens E10 (surface, number 17) and spacing DE between the surface of the image most side in the fourth lens group G4, i.e., the surface of the image side of the tenth lens E10 (surface number 18) and the surface of the object side of the filter/cover FC (surface number 19) are changed, the first lens group G1 and the third lens group G3 monotonically move toward the object side with the variable power from the wide angle limit to the telescopic limit, the second lens group G2 is kept in a fixed position in the variable power from the wide angle limit to the telescopic limit, and the fourth lens group G4 is located closer to the image side than the wide angle limit at the telescopic limit.

In the embodiment 3, the focal length of the entire system f, F-number F and half field angle ω are changed by the zooming within the ranges of f=4.74 to 21.67, F=3.46 to 4.91 and ω=39.15 to 9.50. The characteristics of respective optical surfaces are as the following table.

The respective optical surfaces of the sixth, tenth, twelfth, thirteenth and seventeenth surfaces denoted by applying * on the surface numbers in the table 5 are aspheric surfaces, and the parameters in the equation 1 of the respective aspheric surfaces are as follows.

Aspheric Surface: Sixth Surface $K=0.0$, $A_4=-1.22579\times10^{-4}$, $A_6=-2.98179\times10^{-7}$, $A_8=-1.93092\times10^{-8}$, $A_{10}=-3.32554\times10^{-10}$ Aspheric Surface: Tenth Surface $K=0.0$, $A_4=-8.28512\times10^{-4}$, $A_6=-1.82812\times10^{-5}$, $A_8=8.50623\times10^{-8}$, $A_{10}=-1.90374\times10^{-7}$ Aspheric Surface: Twelfth Surface $K=0.0$, $A_4=-8.08852\times10^{-4}$, $A_6=1.58812\times10^{-5}$, $A_8=-1.00403\times10^{-6}$, $A_{10}=2.75151\times10^{-8}$ Aspheric Surface: Thirteenth Surface $K=0.0$, $A_4=4.07275\times10^{-4}$, $A_6=-7.86358\times10^{-6}$, $A_8=1.60507\times10^{-6}$, $A_{10}=-9.33131\times10^{-8}$ Aspheric Surface: Seventeenth Surface $K=0.0$, $A_4=-1.29441\times10^{-5}$, $A_6 5.93123\times10^{-6}$, $A_8=-3.01006\times10^{-7}$, $A_{10}=7.06450\times10^{-9}$ The valuable spacing DA between the first lens group G1 and the second lens group G2, the valuable spacing DB between the second lens group G2 and the aperture stop FA, the valuable spacing DC between the aperture stop FA and the third lens group G3, the valuable spacing DD between the third lens group G3 and the fourth lens group G4 and the valuable spacing DE between the fourth lens group G4 and the optical filter FC are changed by the zooming as the following table.

| Surface Number | Surface Characteristics | | | | | |
|---|---|---|---|---|---|---|
| | R | D | $N_d$ | $v_d$ | Remark | |
| 01 | 88.920 | 0.90 | 1.84666 | 23.78 | First Lens | First Lens Group |
| 02 | 27.776 | 2.67 | 1.77250 | 49.62 | Second Lens | |
| 03 | −397.862 | 0.10 | | | | |
| 04 | 19.683 | 1.79 | 1.77250 | 49.62 | Third Lens | |
| 05 | 37.587 | Variable (DA) | | | | |
| 06* | 19.021 | 0.79 | 1.83500 | 42.98 | Fourth Lens | Second Lens Group |
| 07 | 3.765 | 2.11 | | | | |
| 08 | ∞ | 1.66 | 1.84666 | 23.78 | Fifth Lens | |
| 09 | −7.904 | 0.64 | 1.80420 | 46.50 | Sixth Lens | |
| 10* | −76.544 | Variable (DB) | | | | |
| 11 | Aperture Stop | Variable (DC) | | | | |
| 12* | 8.674 | 3.65 | 1.58913 | 61.25 | Seventh Lens | Third Lens Group |
| 13* | −8.132 | 0.10 | | | | |
| 14 | 14.331 | 2.43 | 1.75500 | 52.32 | Eighth Lens | |
| 15 | −6.459 | 0.80 | 1.69895 | 30.05 | Ninth Lens | |
| 16 | 5.298 | Variable (DD) | | | | |
| 17* | 12.500 | 1.84 | 1.54340 | 56.00 | Tenth Lens | Fourth Lens Group |
| 18 | −40.435 | Variable (DE) | | | | |
| 19 | ∞ | 0.90 | 1.51680 | 64.20 | Filter/Cover | |
| 20 | ∞ | | | | | |

| | Variable Spacing | | |
|---|---|---|---|
| | short focus limit<br>f = 4.739 | intermediate focal length<br>f = 10.145 | long focus limit<br>f = 21.665 |
| DA | 0.600 | 7.011 | 14.600 |
| DB | 6.591 | 2.964 | 1.200 |
| DC | 3.223 | 2.372 | 1.000 |
| DD | 2.000 | 7.226 | 10.607 |
| DE | 3.805 | 3.057 | 2.812 |

In addition, the values according to the above described respective condition equations in the embodiment 3 are as follows. Numerical values of condition equations.

$m4T=0.712$ $m4T/m4W=1.085$ $X1/f_T=0.646$ $X3/f_T=0.351$ $|f_2|/f_3=0.744$ $f_1/f_W=7.49$

Therefore, the numerical values according to the above described respective condition equations are within the ranges of the condition equations.

Embodiment 4

Figure 32A:
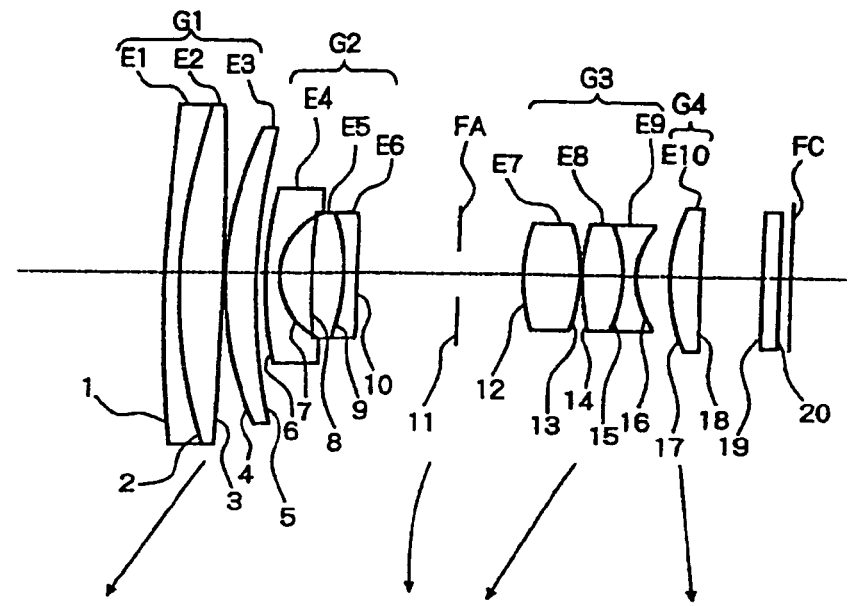
FIGS. 32A, 32B, 32C are schematic cross-section views along optical axes; each of the views illustrates a structure of an optical system of a zoom lens according to the embodiment 4 of the present invention.
Figure 32B:
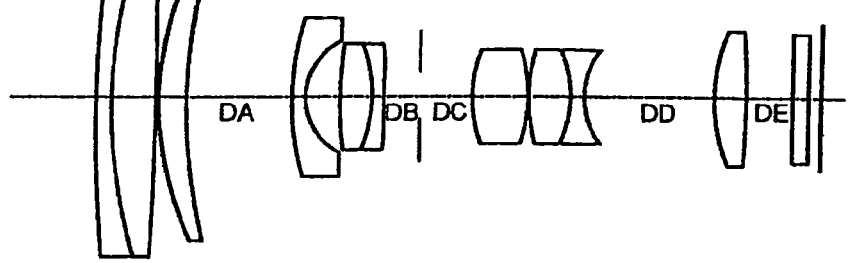
Figure 32C:
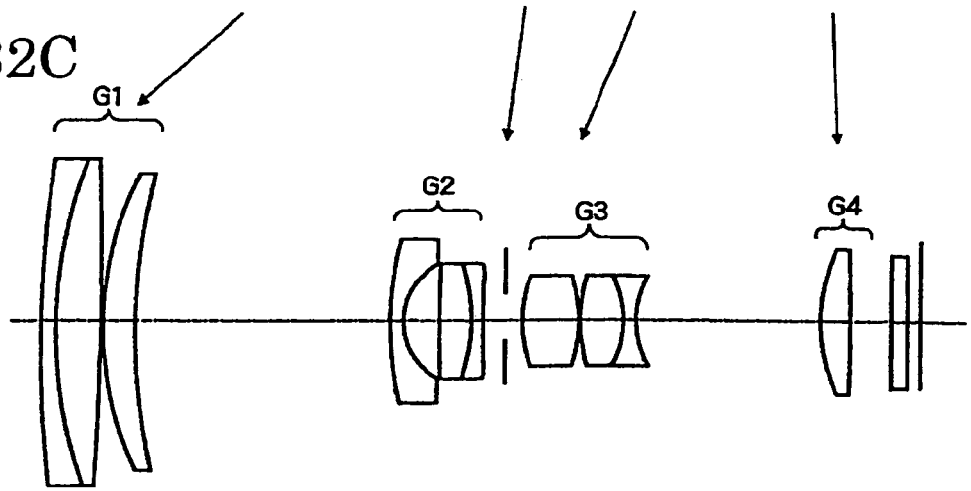

FIGS. 32A, 32B, 32C show structures of the optical systems of the zoom lenses according to the embodiment 4 of the present invention. FIG. 32A illustrates the wide angle limit (short focus limit). FIG. 32B illustrates the intermediate focal length. FIG. 32C illustrates the telescopic limit (long focus limit).

The zoom lens shown in each of FIGS. 32A, 32B, 32C comprises a first lens E1, second lens E2, third lens E3, fourth lens E4, fifth lens E5, sixth lens E6, seventh lens E7, eighth lens E8, ninth lens E9, tenth lens E1, aperture stop FA and filter/cover FC. In this case, a first lens group G1 comprises the first lens E1, second lens E2 and third lens E3. A second lens group G2 comprises the fourth lens E4, fifth lens E5 and sixth lens E6. A third lens group G3 comprises the seventh lens E7, eighth lens E8 and ninth lens E9. A fourth lens group G4 comprises the tenth lens E10. Each of the lens groups is supported by an appropriate common supporting frame and the like, and is integrally operated by the zooming and the like. In addition, the respective reference numerals in FIGS. 32A, 32B, 32C are independently used for the respective embodiments; therefore, the common reference numerals are used in FIGS. 29A, 29B, 29C, 30A, 30B, 30C, 31A, 31B, 31C. However, those are no always the common structures with other embodiments.

In each of FIGS. 32A, 32B, 32C, the respective optical elements comprising the optical system of the zoom lens are sequentially arranged from an object side such as a photographing subject, the first lens E1, second lens E2, third lens E3, fourth lens E4, fifth lens E5, sixth lens E6, aperture stop FA, seventh lens E7, eighth lens E8, ninth lens E9, tenth lens E10 and filter/cover FC, and an image is imaged onto the back of the filter/cover FC.

The first lens E1 is a negative meniscus lens having a convex surface on the object side. The second lens E2 is a positive lens comprising a biconvex lens having a strong convex surface on the object side. The first and second lenses E1, E2 are firmly cemented to form a cemented lens. The third lens E3 is a positive meniscus lens having a convex surface on the object side. The first lens group G1 comprising the first lens E1, second lens E2 and third lens E3 includes positive refracting power in its entirety. The fourth lens E4 is a negative meniscus lens having a convex surface on the object side, an aspheric surface on the surface of the object side and a strong concave surface on the image side. The fifth lens E5 is a positive lens comprising a biconvex lens having a strong convex surface on the image side. The sixth lens E6 is a negative lens comprising a biconcave lens having strong concave surface on the surface the object side and an aspheric surface on the image side. The fifth lens E5 and the sixth lens E6 are firmly cemented to form a cemented lens.

The second lens group G2 comprising the fourth lens E4, fifth lens E5 and sixth lens E6 has a negative focal length, i.e., negative refracting power, in its entirety. The seventh lens E7 is a positive lens comprising a biconvex lens having aspheric surfaces on the both surfaces. The eighth lens E8 is a positive lens comprising a biconvex lens having a strong convex surface on the image side. The ninth lens E9 is a negative lens comprising a biconcave lens. The eighth and ninth lenses E8, E9 are firmly cemented to form a cemented lens. The third lens group G3 comprising the seventh lens E7, eighth lens E8 and ninth lens E9 has positive refracting power in its entirety. The tenth lens E10 is a positive lens comprising a biconvex lens having a strong convex surface including an aspheric surface on the object side. The fourth lens group G4 comprising the tenth lens E10 has a positive focal length.

In the variable power from the wide angle limit (short focus limit) to the telescopic limit (long focus limit), the first lens group G1, third lens group G3 and fourth lens group G4 move such that the variable spacing between the respective groups, more particularly, spacing DA between the surface of the image most side in the first lens group G1, i.e., the surface of the image side of the third lens E3 (surface number 5) and the surface of the object most side in the second lens group G2, i.e., the surface of the object side of the fourth lens E4 (surface number 6), spacing DB between the surface of the image most side in the second lens group G2, i.e., the surface of the image side of the sixth lens E6 (surface number 10) and the surface of the aperture stop FA (surface number 11), spacing DC between the surface of the aperture stop FA (surface number 11) and the surface of the object most side in the third lens group G3, i.e., the surface of the object side of the seventh lens E7 (surface number 12), spacing DD between the surface of the image most side in the third lens group G3, i.e., the surface of the image side of the ninth lens E9 (surface number 16) and the surface of the object most side in the fourth lens group G4, i.e., the surface of the object side of the tenth lens E10 (surface number 17) and spacing DE between the surface of the image most side in the fourth lens group G4, i.e., the surface of the image side of the tenth lens E10 (surface number 18) and the surface of the object side of the filter/cover FC (surface number 19) are changed, the first lens group G1 and the third lens group G3 monotonically move toward the object side with the variable power from the wide angle limit to the telescopic limit, the second lens group G2 is kept in a fixed position in the variable power from the wide angle limit to the telescopic limit, and the fourth lens group G4 is located closer to the image side than the wide angle limit at the telescopic limit.

In the embodiment 4, the focal length of the entire system f, F-number F and half field angle ω are changed by the zooming within the ranges of f=4.74 to 21.62, F=3.42 to 4.99 and ω=39.12 to 9.50. The characteristics of the respective optical surfaces are as the following table.

| | Optical Characteristics | | | | |
|---|---|---|---|---|---|
| Surface Number | R | D | $N_d$ | $v_d$ | Remark |
| 01 | 96.656 | 0.90 | 1.84666 | 23.78 First Lens | First Lens Group |
| 02 | 29.314 | 2.72 | 1.77250 | 49.62 Second Lens | |
| 03 | −219.341 | 0.10 | | | |
| 04 | 20.153 | 1.80 | 1.77250 | 49.62 Third Lens | |
| 05 | 33.538 | Variable (DA) | | | |
| 06* | 18.011 | 0.84 | 1.83500 | 42.98 Fourth Lens | Second Lens Group |
| 07 | 3.936 | 2.07 | | | |
| 08 | 74.837 | 1.95 | 1.84666 | 23.78 Fifth Lens | |
| 09 | −9.146 | 0.74 | 1.80420 | 46.50 Sixth Lens | |
| 10* | 759.807 | Variable (DB) | | | |
| 11 | Aperture Stop | Variable (DC) | | | |
| 12* | 8.333 | 3.34 | 1.58913 | 61.25 Seventh Lens | Third Lens Group |
| 13* | −8.827 | 0.10 | | | |
| 14 | 12.236 | 2.45 | 1.75500 | 52.32 Eighth Lens | |
| 15 | −7.054 | 0.80 | 1.69895 | 30.05 Ninth Lens | |
| 16 | 4.892 | Variable (DD) | | | |
| 17* | 10.651 | 1.83 | 1.58913 | 61.25 Tenth Lens | Fourth Lens Group |
| 18 | −261.223 | Variable (DE) | | | |
| 19 | ∞ | 0.90 | 1.51680 | 64.20 | Filter/Cover |
| 20 | ∞ | | | | |

The respective optical surfaces of the sixth, tenth, twelfth, thirteenth and seventeenth surfaces denoted by applying * on the surface numbers in the table 7 are aspheric surfaces, and the parameters in the equation 1 of the respective aspheric surfaces are as follows.

Aspheric Surface: Sixth Surface
 K=0.0, $A_4$=−8.08791×10$^{-5}$, $A_6$=−2.03124×10$^{-6}$, $A_8$=6.26638×10$^{-9}$, $A_{10}$=−6.12352×10$^{-11}$ Aspheric Surface: Tenth Surface
 K=0.0, $A_4$=−7.52609×10$^{-4}$, $A_6$=−1.24401×10$^{-5}$, $A_8$=−9.65466×10$^{-7}$, $A_{10}$=−8.33332×10$^{-8}$ Aspheric Surface: Twelfth Surface
 K=0.0, $A_4$=−7.07947×10$^{-4}$, $A_6$=−1.16179×10$^{-6}$, $A_8$=6.72505×10$^{-8}$, $A_{10}$=−2.53913×10$^{-8}$ Aspheric Surface: Thirteenth Surface
 K=0.0, $A_4$=3.43658×10$^{-4}$, $A_6$=−1.44022×10$^{-6}$, $A_8$=−1.33484×10$^{-7}$, $A_{10}$=−1.40822×10$^{-8}$ Aspheric Surface: Seventeenth Surface
 K=0.0, $A_4$=−4.7541×10$^{-5}$, $A_6$=1.15429×10$^{-5}$, $A_8$=−4.87258×10$^{-7}$, $A_{10}$=9.54084×10$^{-9}$ The valuable spacing DA between the first lens group G1 and the second lens group G2, the valuable spacing DB between the second lens group G2 and the aperture stop FA, the valuable spacing DC between the aperture stop FA and the third lens group G3, the valuable spacing DD between the third lens group G3 and the fourth lens group G4 and the valuable spacing DE between the fourth lens group G4 and the optical filter FC are changed by the zooming as the following table.

| | Variable Spacing | | |
|---|---|---|---|
| | short focus limit f = 4.741 | intermediate focal length f = 10.112 | long focus limit f = 21.624 |
| DA | 0.600 | 6.160 | 15.040 |
| DB | 6.288 | 2.111 | 1.200 |
| DC | 3.888 | 3.173 | 1.000 |

| | -continued | | |
|---|---|---|---|
| | Variable Spacing | | |
| | short focus limit f = 4.741 | intermediate focal length f = 10.112 | long focus limit f = 21.624 |
| DD | 2.000 | 7.785 | 11.065 |
| DE | 3.440 | 2.547 | 2.351 |

The values according to the above described condition equations in the embodiment 4 are as follows.

Numerical Values of Condition Equations m4T=0.721 m4T/m4W=1.095

$X1/f_T$=0.668

$X3/f_T$=0.369

$|f_2|/f_3$=0.795

$f_1/f_W$=8.14

Therefore, the numerical values according to the above described condition equations in the embodiment 4 are within the ranges of the condition equations.

Figure 33:
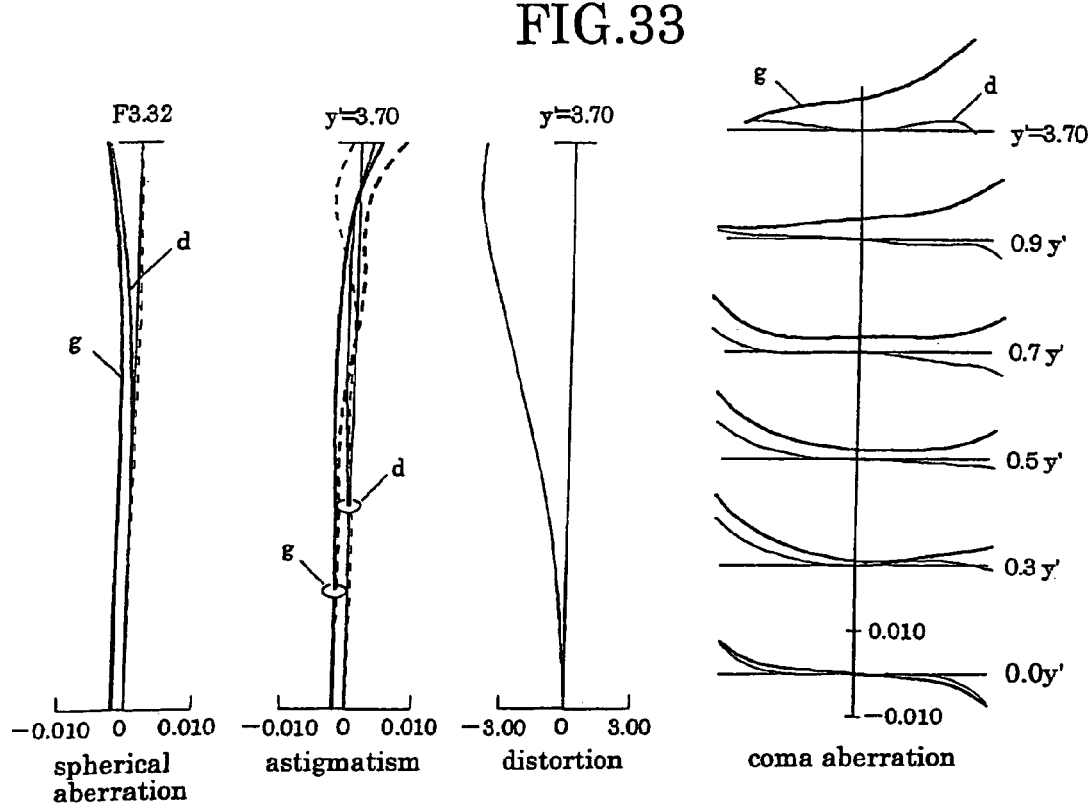
FIG. 33 is a diagram showing spherical aberration, astigmatism, distortion and coma aberration at the wide angle limit of the zoom lens according to the embodiment 1 of the present invention illustrated in FIG. 29A.
Figure 34:
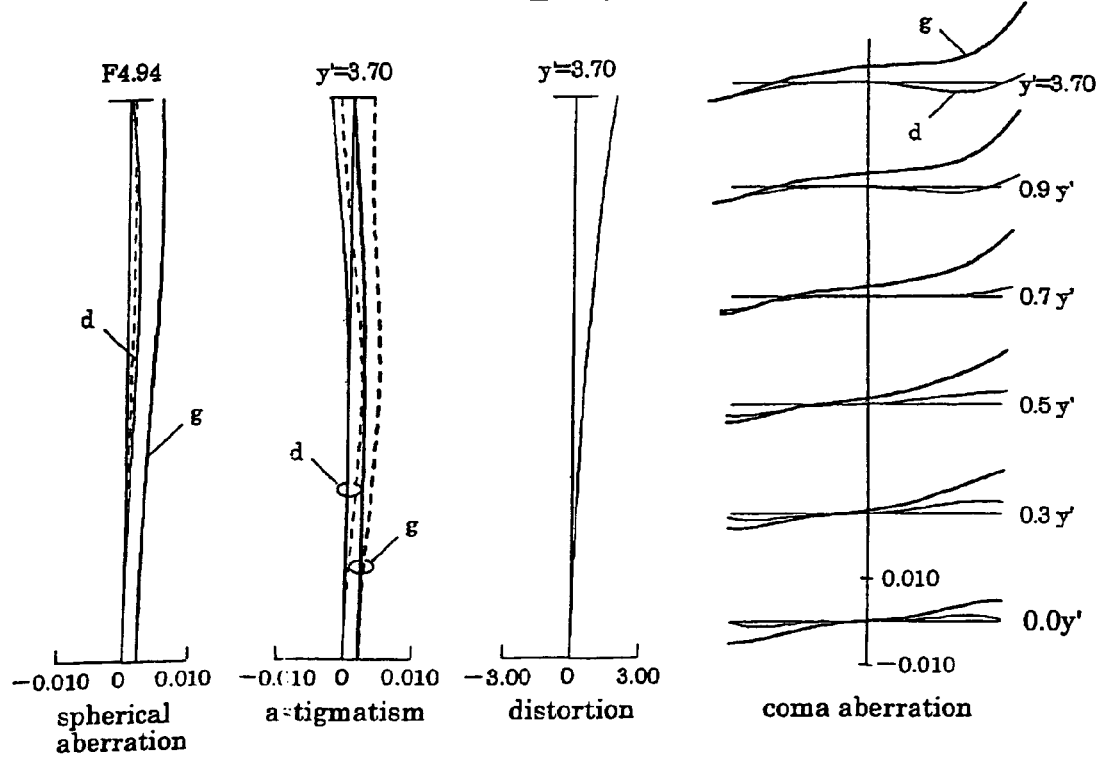
FIG. 34 is a diagram showing spherical aberration, astigmatism, distortion and coma aberration at the intermediate focal length of the zoom lens according to the embodiment 1 of the present invention illustrated in FIG. 29B.
Figure 35:
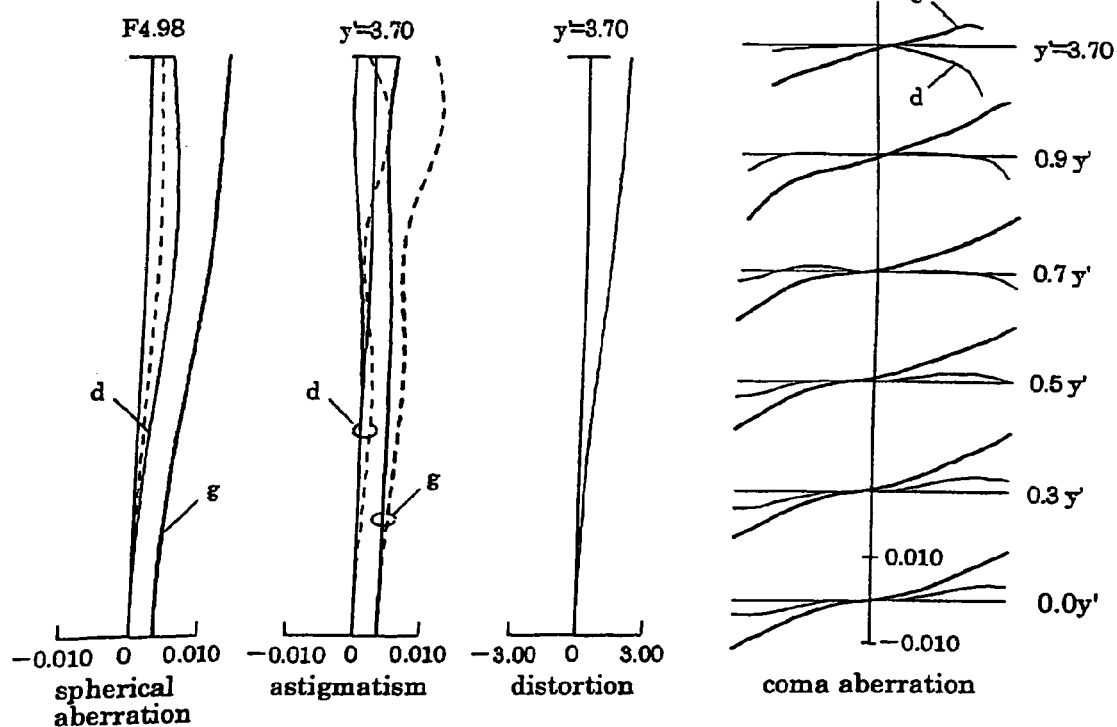
FIG. 35 is a diagram showing spherical aberration, astigmatism, distortion and coma aberration at the telescopic limit of the zoom lens according to the embodiment 1 of the present invention illustrated in FIG. 29C.

FIGS. 33 to 35 are diagrams illustrating aberration of spherical aberration, astigmatism, distortion and coma aberration in the zoom lenses shown in FIGS. 29A, 29B, 29C according to the above embodiment 1.

FIG. 33 is a diagram illustrating the aberration at the wide angle limit. FIG. 34 is a diagram illustrating the aberration at the intermediate focal length. FIG. 35 is a diagram illustrating the aberration at the telescopic limits. For each of the diagrams, a dashed line indicates a sin condition in the spherical aberration, a solid line indicates a sagittal and a dashed line indicates a meridional in the astigmatism, and a heavy line indicates d line and a thin line indicates g line.

Figure 36:
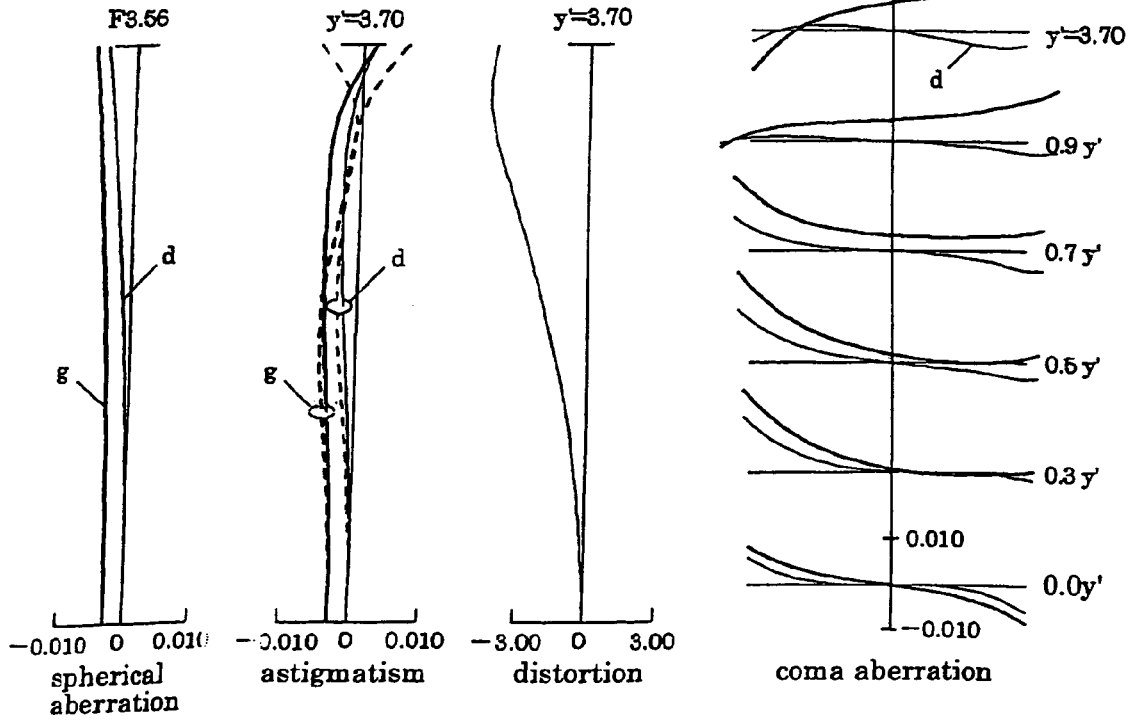
FIG. 36 is a diagram showing spherical aberration, astigmatism, distortion and coma aberration at the wide angle limit of the zoom lens according to the embodiment 2 of the present invention illustrated in FIG. 30A.
Figure 37:
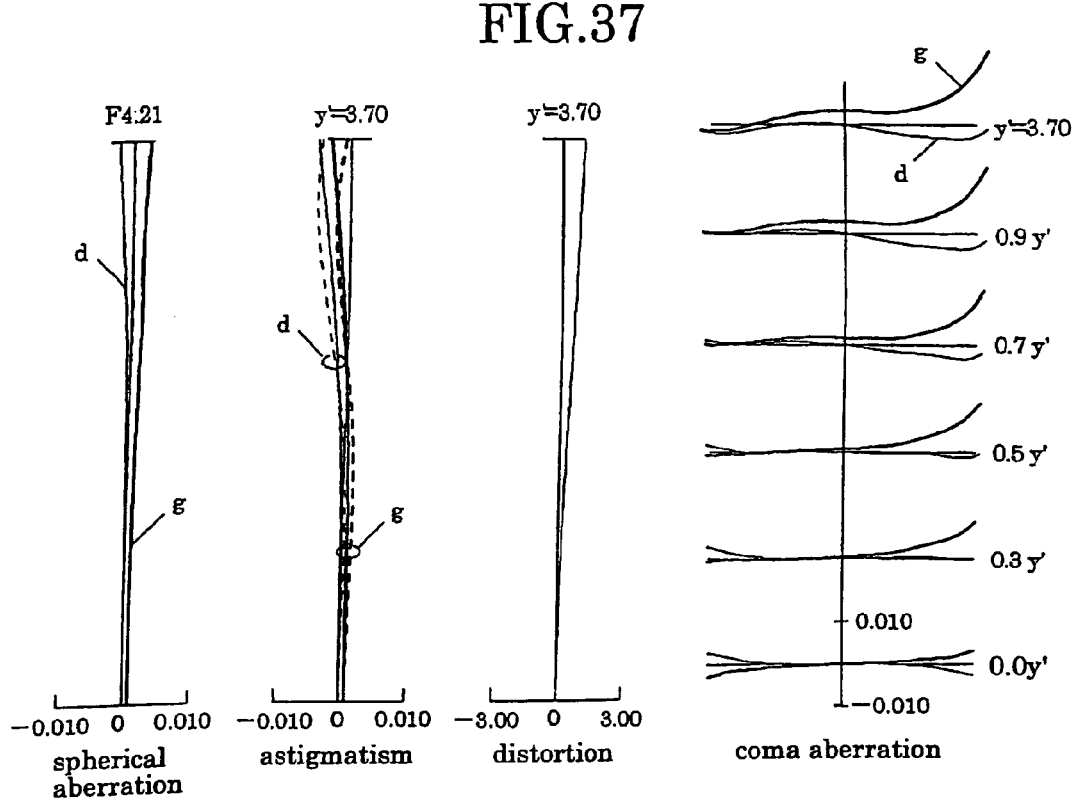
FIG. 37 is a diagram showing spherical aberration, astigmatism, distortion and coma aberration at the intermediate focal length of the zoom lens according to the embodiment 2 of the present invention illustrated in FIG. 30B.
Figure 38:
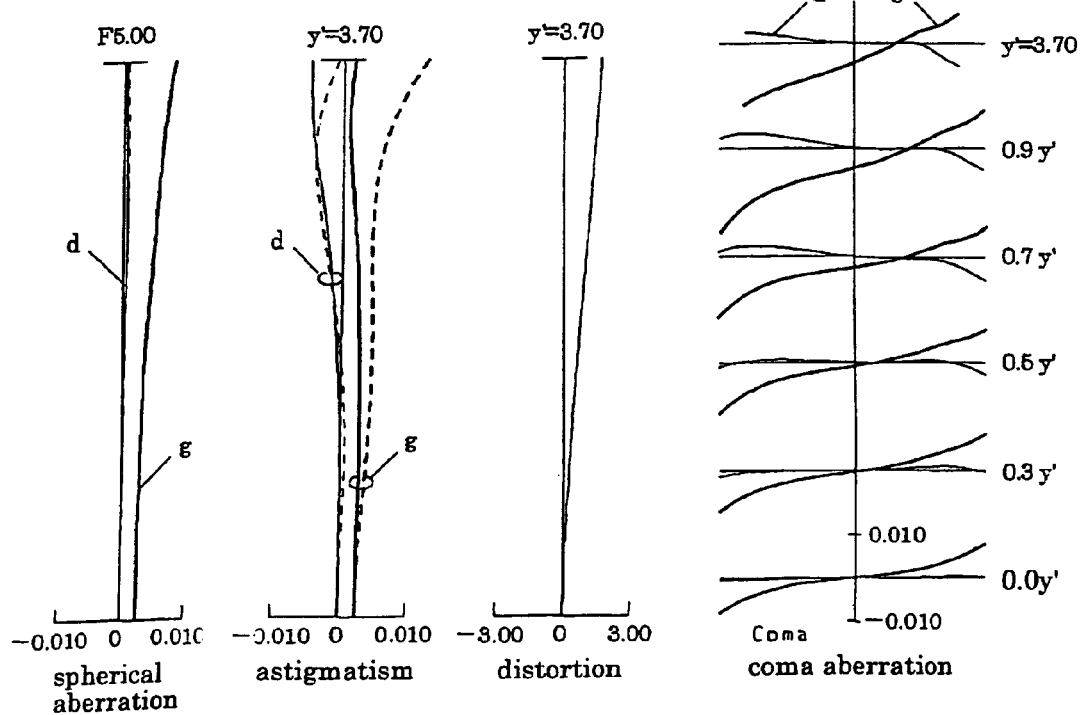
FIG. 38 is a diagram showing spherical aberration, astigmatism, distortion and coma aberration at the telescopic limit of the zoom lens according to the embodiment 2 of the present invention illustrated in FIG. 30C.

FIGS. 36 to 38 are diagrams illustrating aberration of spherical aberration, astigmatism, distortion and coma aberration in the zoom lenses shown in FIGS. 30A, 30B, 30C according to the above embodiment 2.

FIG. 36 is a diagram illustrating the aberration at the wide angle limit. FIG. 37 is a diagram illustrating the aberration at the intermediate focal length. FIG. 38 is a diagram illustrating the aberration at the telescopic limit. In this case, for each of the diagrams, a dashed line indicates a sine condition in the spherical aberration, a solid line indicates a sagittal and a dashed line indicates a meridional in the astigmatism, and a heavy line indicates d line and a thin line indicates g line.

Figure 39:
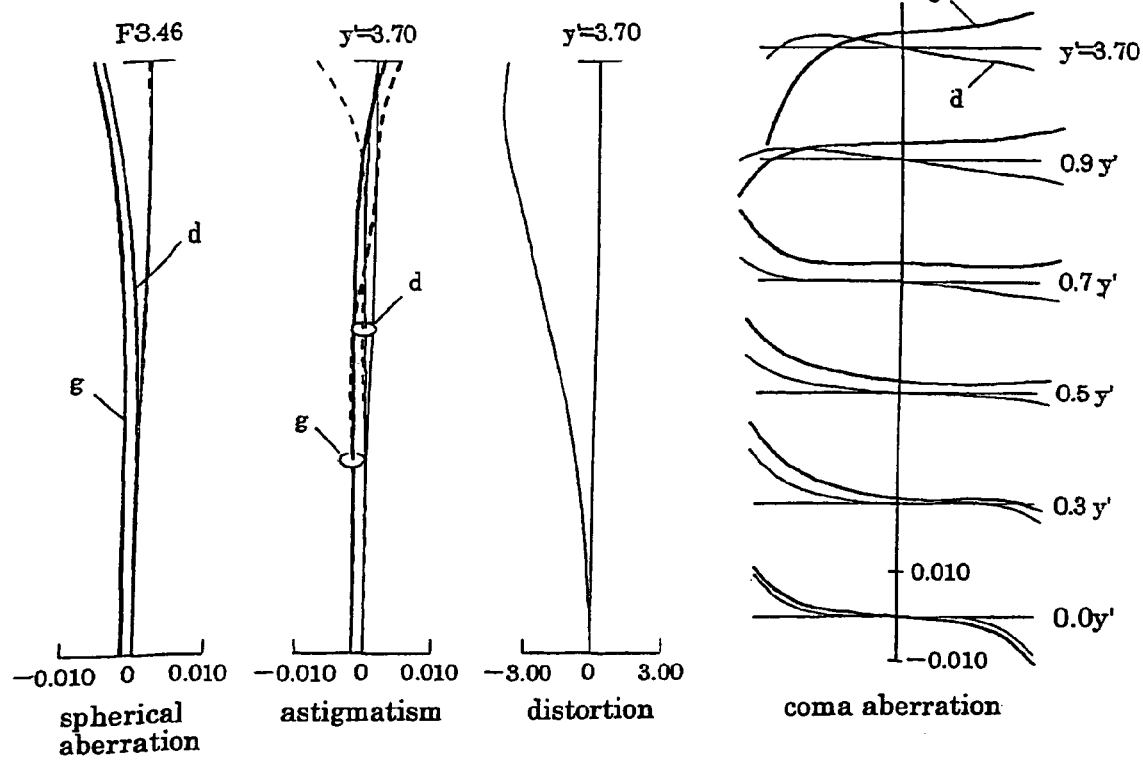
FIG. 39 is a diagram showing spherical aberration, astigmatism, distortion and coma aberration at the wide angle limit of the zoom lens according to the embodiment 3 of the present invention illustrated in FIG. 31A.
Figure 40:
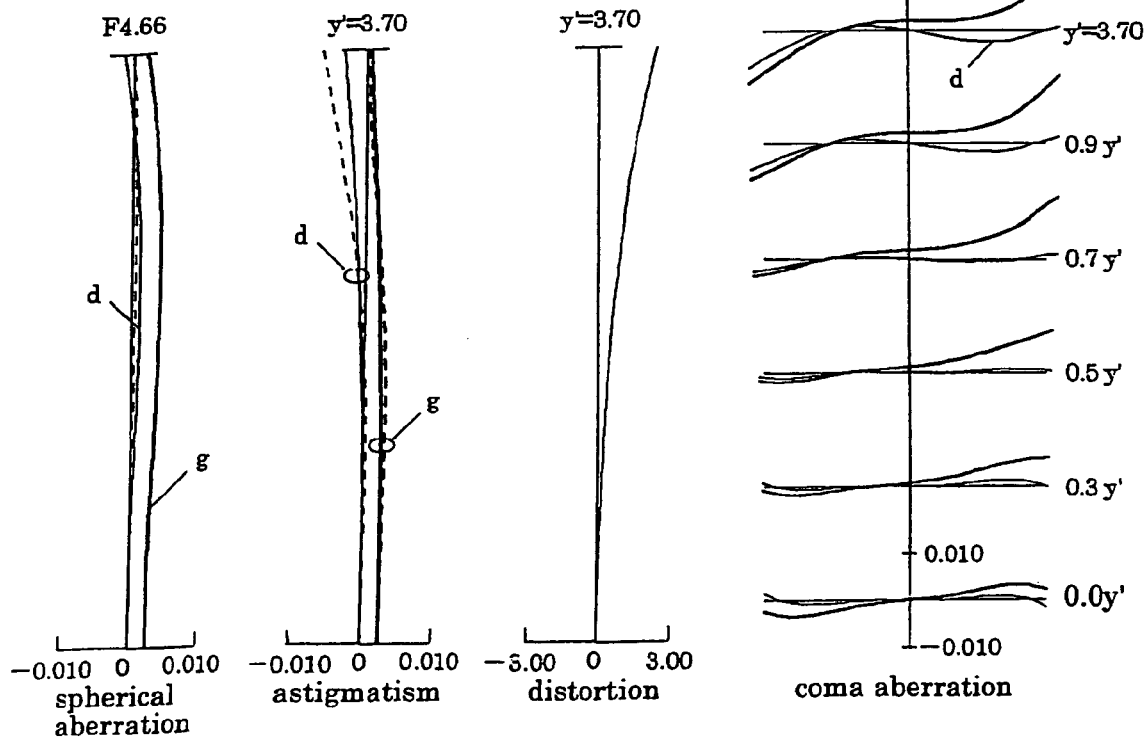
FIG. 40 is a diagram showing spherical aberration, astigmatism, distortion and coma aberration at the intermediate focal length of the zoom lens according to the embodiment 3 of the present invention illustrated in FIG. 31B.
Figure 41:
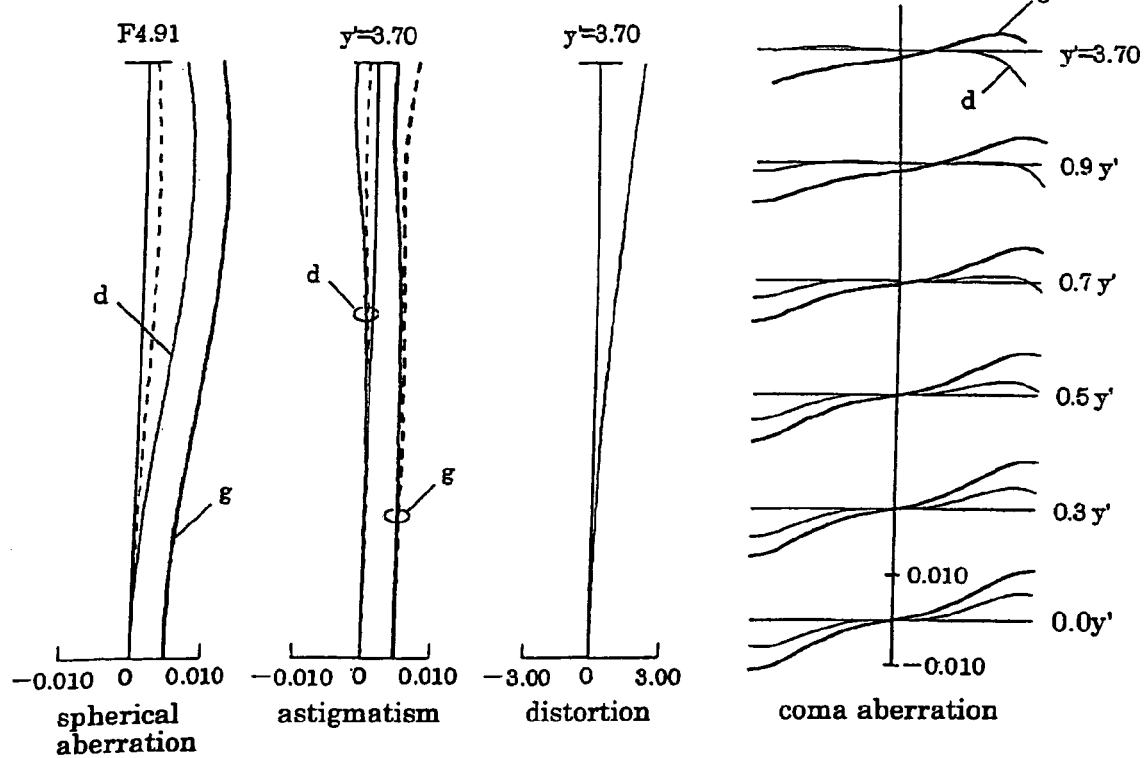
FIG. 41 is a diagram showing spherical aberration, astigmatism, distortion and coma aberration at the telescopic limit of the zoom lens according to the embodiment 3 of the present invention illustrated in FIG. 31C.

FIGS. 39 to 41 are diagrams illustrating aberration of spherical aberration, astigmatism, distortion and coma aberration in the zoom lenses shown in FIGS. 31A, 31B, 31C according to the above embodiment 3.

FIG. 39 is a diagram illustrating the aberration at the wide angle limit. FIG. 40 is a diagram illustrating the aberration at the intermediate focal length. FIG. 41 is a diagram illustrating the aberration at the telescopic limit. For each of the diagrams, a dashed line indicates a sin condition in the spherical aberration, a solid line indicates a sagittal and a dashed line indicates a meridional in the astigmatism, and a heavy line indicates d line and a thin line indicates g line.

Figure 42:
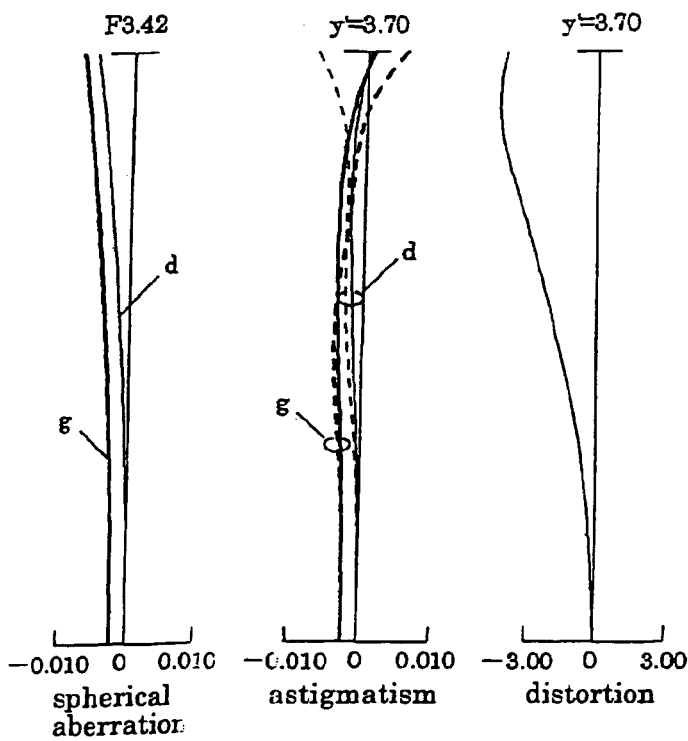
FIG. 42 is a diagram showing spherical aberration, astigmatism, distortion and coma aberration at the wide angle limit of the zoom lens according to the embodiment 4 of the present invention illustrated in FIG. 32A.
Figure 43:
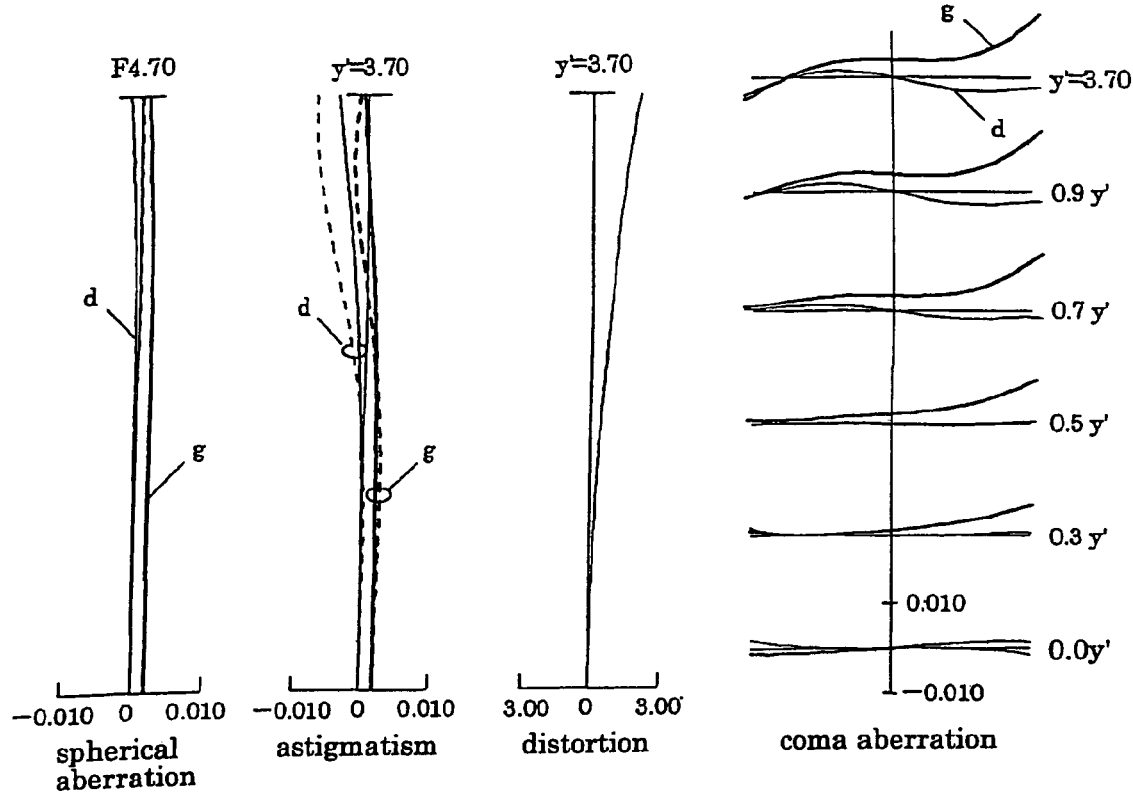
FIG. 43 is a diagram showing spherical aberration, astigmatism, distortion and coma aberration at the intermediate focal length of the zoom lens according to the embodiment 4 of the present invention illustrated in FIG. 32B.
Figure 44:
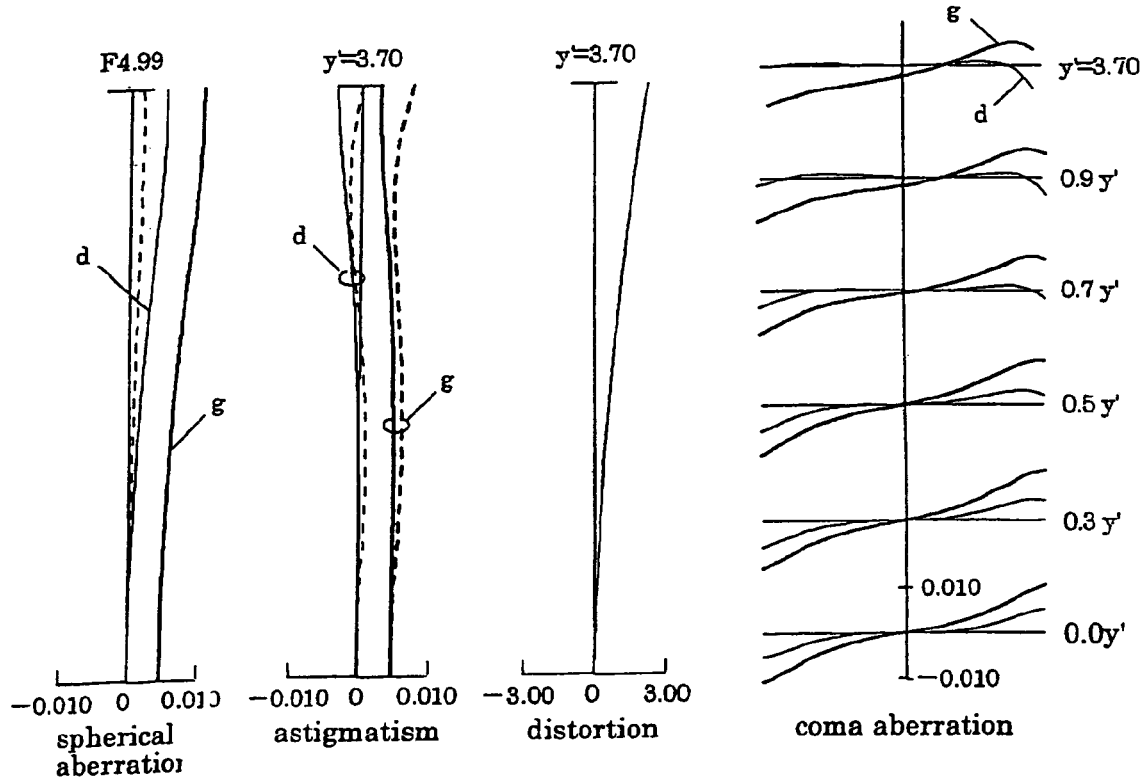
FIG. 44 is a diagram showing spherical aberration, astigmatism, distortion and coma aberration at the telescopic limit of the zoom lens according to the embodiment 4 of the present invention illustrated in FIG. 32C.

FIGS. 42 to 44 are diagrams illustrating aberration of spherical aberration, astigmatism, distortion and coma aberration in the zoom lenses shown in each of FIGS. 32A, 32B, 32C according to the above embodiment 4.

FIG. 42 is a diagram illustrating aberration at the wide angle limit. FIG. 43 is a diagram illustrating aberration at the intermediate focal length. FIG. 44 is a diagram illustrating aberration at the telescopic limit. In this case, for each of the diagrams, a dashed line indicates a sine condition in the spherical aberration, a solid line indicates a sagittal and a dashed line indicates a meridional in the astigmatism, and a heavy line indicates d line and a thin line indicates g line.

According to the diagrams of FIGS. 33 to 44, it is obvious that the aberration is favorably corrected and controlled in the zoom lens structures shown in FIGS. 29A to 32C according to the embodiments 1 to 4.

Next, when a camera is structured by adopting the zoom lenses according to the present invention shown in the embodiments 1 to 4 as an optical system, the camera is structured similar to the camera explained in the above FIGS. 17 to 19. Therefore, the explanation will be omitted.

In addition, FIGS. 17 to 19 explain the cameras. However, recently, there have been introduced a mobile information terminal having a camera function, such as a so-called PDA (personal data assistant) and cellular phone. The appearance of such a mobile information terminal is slightly different from the camera, but it includes substantially the same function and structure with the camera. Therefore, the zoom lens according to the present invention can be applied to such a mobile information terminal.

A photographing lens comprising the lens unit using the zoom lens shown in each of the embodiments 1 to 4 can be used for the above camera or above mobile information terminal as a photographing optical system. Therefore, it is possible to obtain a compact camera or mobile information terminal having a high image quality, which uses a light receiving element having three million pixels to five million pixels.

Next, a zoom lens of a fourth embodiment, which is used for the above lens barrel, lens driving device and mobile information terminal according to the present invention to exercise a preferable performance, will be described with reference to FIGS. 45 to 60.

Moreover, the camera (mobile information terminal) including the zoom lens of the fourth embodiment was specifically explained in FIGS. 1 to 21, especially, in FIGS. 17 to 19. Therefore, the explanation is herein incorporated.

Firstly, before giving explanations for specific embodiments, the structures and the functions will be explained in order to explain the fourth embodiment of the present invention.

Figure 45:
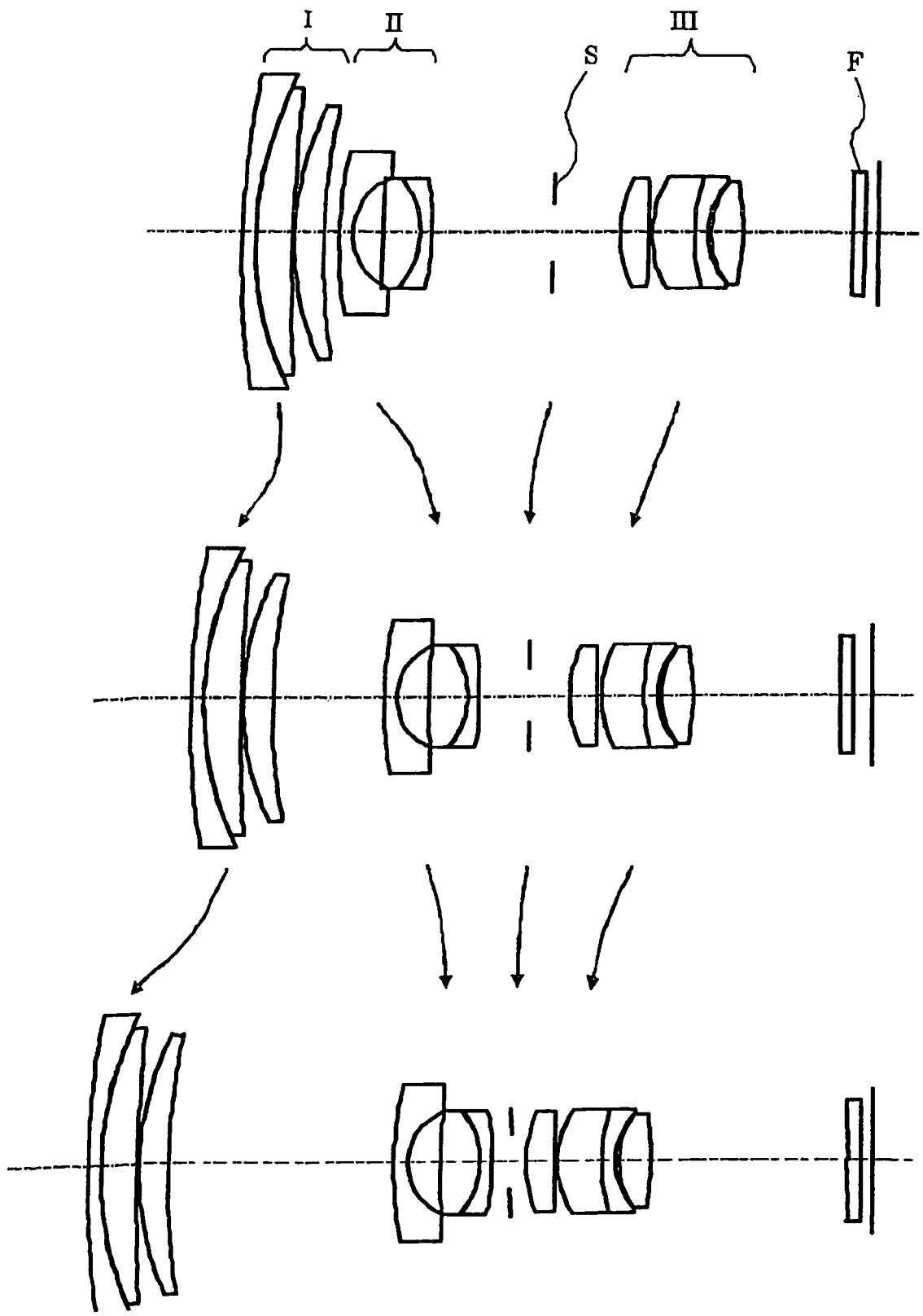
FIG. 45 is a view showing a lens structure of a zoom lens of the embodiment 5.

As shown in FIG. 45, for example, the zoom lens according to the fourth embodiment of the present invention comprises a lens barrel (hereinafter referred to as a zoom lens) including a first lens group I having positive refracting power, a second lens group II having negative refracting power, a third lens group III having positive refracting power, sequentially arranged from an object side to an image side, and an aperture stop S between the second lens group II and third lens group III, wherein the spacing between the first lens group I and the second lens group II is increased and the spacing between the second lens group II and the third lens group III is decreased in the variable power from the wide angle limit to the telescopic limit. The zoom lens includes the following characteristic.

The ratio between the focal length of the entire system at the wide angle limit $f_w$ and the maximum image height $Y'_{max}$, $Y'_{max}/f_w$ is within the range of the following condition (1).

$$0.70 < Y'_{max}/f_W < 1.00 \quad (1)$$

The second lens group II comprises three lenses, sequentially arranged from the object side to the image side, a negative lens having a surface including a large curvature on the image side, a positive lens having a convex surface including a large curvature on the image side and a negative lens having a concave surface including a large curvature on the object side. More particularly, the second lens group has a structure that the positive lens is sandwiched between the negative lens on the object side and the negative lens on the image side.

In the zoom lens according to the present embodiment, when the image side surface of the negative lens on the image side in the second lens group II (the surface of the image most side in the second lens group II) is an aspheric surface having a feature that the negative refracting power is reduced as being separated from the optical axis, it is preferable for the refraction index of the material of the negative lens on the image side in the second lens group II $N_{21}$, the amount of aspheric surface in the 80 percent of the maximum ray effective height in the aspheric surface on the image most side in the second lens group II $X_{21}(H_{0.8})$ and the maximum image height $Y'_{max}$ to satisfy the following condition (2).

$$0.0010 < (1-N_{21}) \times X_{21}(H_{0.8})/Y'_{max} < 0.0500 \quad (2)$$

In the zoom lens according to the present embodiment, when the surface of the object side of the negative lens on the object side in the second lens group II (the surface on the object most side in the second lens group II) is an aspheric surface, it is preferable for the refraction index of the material of the negative lens on the object side in the second lens group II $N_{20}$, the refraction index of the material of the negative lens on the image side in the second lens group II $N_{21}$, the amount of aspheric surface in the 80 percent of the maximum ray effective height in the aspheric surface on the object most side in the second lens group II $X_{20}(H_{0.8})$, the amount of aspheric surface in the 80 percent of the maximum ray effective height in the aspheric surface on the image most side in the second lens group II $X_{21}(H_{0.8})$, and the maximum image height $Y'_{max}$ to satisfy the following condition (2).

$$-0.0500 < \{(N_{20}-1) \times X_{20}(H_{0.8}) + (1-N_{21}) \times X_{21}(H_{0.8})\}/Y'_{max} < 0.1500 \quad (3)$$

The aspheric surface amount X(H) is the difference of the amount of sag (depth) in the height from the optical axis with the spherical surface defined by the paraxial curvature of the aspheric surface and the actual aspheric surface, and the direction toward the image side from the object side is positive.

In the zoom lens according to the present embodiment, it is preferable for the refraction index $N_{2i}$ and the Abbe number $v_{2i}$ of the material of the i-th lens counting from the object side in the second lens group II to satisfy the following conditions (4), (5), (6).

$$1.75<N_{21}<1.90, 35<v_{21}<50 \tag{4}$$

$$1.65<N_{22}<1.90, 20<v_{22}<35 \tag{5}$$

$$1.75<N_{23}<1.90, 35<v_{23}<50 \tag{6}$$

In the zoom lens according to the present embodiment, the three lenses comprising the second lens group include the negative lens having the surface including a large curvature on the image side, the positive lens having the convex surface including a large curvature on the image side and the negative lens having the concave surface including a large curvature on the object side, sequentially arranged from the object side, and the positive lens and the negative lens on the image side can be cemented.

In this case, it is preferable for the ratio between the radius of curvature of the cemented surface between the positive lens and the negative lens in the second lens group II $R_{2C}$ and the maximum image height $Y'_{max}$, $R_{2C}/Y'_{max}$ to satisfy the following condition (7).

$$-3.5<(R_{2C}/Y'_{max})<-1.0 \tag{7}$$

In the second lens group II, the negative, positive and negative lenses sequentially arranged from the object side can be structured independently.

In the variable power from the wide angle limit to the telescopic limit of the zoom lens according to the present embodiment, the first lens group I monotonically moves to the object side, and it is preferable for the spacing between the first lens group I and the second lens group II at the wide angle limit $D_{12W}$, the spacing between the first lens group and the second lens group at the telescopic limit $D_{12T}$ and the focal length of the entire system at the telescopic limit $f_T$ to satisfy the following condition (8).

$$0.50<(D_{12T}-D_{12W})/f_T<0.85 \tag{8}$$

Moreover, in the variable power from the wide angle limit to the telescopic limit of the zoom lens according to the present embodiment, the third lens group III monotonically, moves to the object side, and it is preferable for the spacing between the second lens group II and the third lens group III at the wide angle limit $D_{23W}$, the spacing between the second lens group and the third lens group at the telescopic limit $D_{23T}$ and the focal length of the entire system at the telescopic limit $f_T$ to satisfy the following condition (9).

$$0.25<(D_{23W}-D_{23T})/f_T<0.65 \tag{9}$$

In the zoom lens according to the present embodiment, it is preferable for the focal length of the second lens group II $f_2$ and the focal length of the third lens group III $f_3$ to satisfy the following condition (10).

$$0.5<|f_2|/f_3<1.0 \tag{10}$$

In the zoom lens according to the present embodiment, it is preferable for the focal length of the first lens group I $f_1$ and the focal length of the entire system in the wide angle limit $f_W$ to satisfy the following condition (11).

$$6.0<f_1/f_W<12.0 \tag{11}$$

The zoom lens according to the present embodiment comprises, sequentially, arranged from the object side to the image side, the first lens group I having positive refracting power, the second lens group II having negative refracting power and the third lens group III having positive refracting power as described above, and can comprise three lens groups of a first lens group to a third lens group as this structure.

Moreover, in the zoom lens according to the present embodiment, a fourth lens group having positive refracting power can be disposed on the image side of the third lens group III, and at least the first lens group I and the third lens group III can be moved to the object side so as to increase the spacing between the first lens group I and the second lens group II and to reduce the spacing between the second lens group II and the third lens group III in the variable power from the wide angle limit to the telescopic limit.

In the structure of the third lens group III described above and the fourth lens group described above, a fixed lens having reduced negative power can be placed on the image side of these groups. More particularly, each of the zoom lenses set forth in the present embodiment has a flexibility of adding a lens group on the image side of the third lens group.

The zoom lens according to the present embodiment can be constructed that the fourth lens group does not move in the variable power and the fourth lens group displaces toward the image side in the variable power from the wide angle limit to the telescopic limit.

The zoom lens according to the present embodiment has the aperture stop S between the second lens group II and the third lens group III, and the spacing between the aperture stop S and the third lens group III can be constructed to be the widest at the wide angle limit and to be the narrowest at the telescopic limit.

The opening diameter of the aperture stop in the zoom lens according to the present embodiment can be a constant regardless of the valuable power, and also the opening diameter at the long focus limit can be set to be larger than the opening diameter at the short focus limit by changing the opening diameter of the aperture stop S with a magnification.

The mobile information terminal having the photographing function according to the present invention comprises the zoom lens according to the present embodiment as an optical system for photographing. The mobile information terminal can be used as a normal silver salt still camera.

The mobile information terminal according to the present embodiment can be constructed that the object image by the zoom lens is imaged onto a light receiving surface of an image pick up device. Such an information device can be used as an electronic still camera, digital camera, video camera having moving image photographing functions, and the like.

The mobile information terminal according to the present embodiment can use the image pick up device having 9 mm diagonal dimension or less and the three million pixels or more. Such an image pick up device includes, for example, an image pick up device having five million pixels in 9 mm diagonal dimension, an image pick up device having three million pixels in 6 mm diagonal dimension and the like.

In the zoom lens having three lens groups of positive, negative and positive, sequentially arranged from the object side, generally, the second lens group II comprises a lens group including a major variable function (so-called variator), so that the structure of the second lens group II is significant. In the information device having a photographing function which uses the above described compact image pick-up device having three million pixels to five million pixels in 6 mm to 9 mm diagonal dimension, because the pitch between the pixels of the image pick up device is small, improved aberration correction is required and the correction of off-axis aberration is difficult. Accordingly, the structure of the second lens group II requires a non-conventional structure.

Conventionally, in the zoom lenses comprising the three lens groups of positive, negative and positive, most of the second lens groups including the three lenses comprise, sequentially arranged from the object side, the negative lens including a surface having a large curvature on the image side, the negative lens having a concave surface on the image side and the positive lens having a convex surface on the object side Such a structure of the second lens group is not suitable for accomplishing the zoom lens that uses the above described compact image pick-up device, and the half field angle of the wide angle limit exceeds 35 degrees.

In addition, there has been known a second lens group II comprising four lenses, sequentially arranged from an object side, a negative lens having a surface including a large curvature on an image side, a negative lens, a positive lens and a negative lens. However, the thickness of the second lens group is increased by increasing the number of lenses. Therefore, the total length of the zoom lens is increased with a housed state, and the compactness of the zoom lens is thereby discouraged and the cost is also increased.

The present invention provides the structure of the second lens group II under the limited number of lenses, three lenses, in the second lens group II, suitable for the above described compact image pick up device and accomplishing the zoom lens that the half field angle of the wide angle limit exceeds 35 degrees.

More particularly, as described above, the second lens group II in the zoom lens of the present invention comprises three lenses, sequentially arranged from the object side, the negative lens having the surface including a large curvature on the image side, the positive lens having the convex surface including a large curvature on the image side and the negative lens having the concave surface including a large curvature on the object side.

When the parameter of the condition (1) that the zoom lens according to the fourth embodiment satisfies $Y'_{max}/f_W$ is 0.70 or less, the wide angle that the half field angle is 35 degrees or more can not be accomplished at the wide angle limit with a state that the distortion is sufficiently corrected. When the parameter $Y'_{max}/f_W$ is 1.00 or more, it becomes extremely difficult to correct the off-axis aberration at the wide angle limit, and also it becomes difficult to downsize the zoom lens and the information device having a photographing function because the size of the first lens group is increased.

With a state that the condition (1) is satisfied, if the second lens group II comprises the three lenses, sequentially arranged from the object side, the negative lens having the surface including a large curvature on the image side, the positive lens having the convex surface including a large curvature on the image side and the negative lens having the concave surface including a large curvature on the object side, as described above, it is possible to preferably correct the off-axis aberration, specially, the chromatic aberration of magnification at the wide angle limit.

The important point in this structure is to use the convex shapes on the image side to the image side surface of the second positive lens from the object side and the object side surface of the third negative lens from the object side, respectively. In this structure, the off-axis luminous flux adjacent to the wide angle limit enters into the above surfaces generally with a large incident angle, so that the off-axis aberration can be largely changed even when the radius of curvature of the above surfaces is minimally changed. Therefore, the off-axis aberration, which should be canceled in another surface of the second lens group II or another lens group, can be produced in the surfaces (the above described surfaces having the convex shapes on the image side) with high flexibility in accordance with the correction ability in the above another surface or another lens group. Accordingly, it becomes possible to obtain an aberration correction level higher than the conventional structure of the second lens group.

If the second lens group comprises the conventionally well known three lenses, the negative lens including a surface having a large curvature on the image side, the negative lens having a concave surface on the image side and the positive lens having a convex surface on the object side, the image side surface of the second negative lens from the object side and the object side surface of the third positive lens from the object side have convex shapes on the object side, respectively. In this structure, when the angle with respect to the optical axis of the off-axis luminous flux is increased in the wide angle, the incident angle to these surfaces (convex surfaces on the object side) is reduced, and a changeable range of the amount of aberration to be produced is limited. Therefore, a sufficient effect for the correction of the off-axis aberration can not be obtained.

In the zoom lens of the fourth embodiment according to the present invention, in order to accomplish more preferable aberration correction, it is desirable for the image side surface of the negative lens to be disposed on the image most side of the second lens group II to be the aspheric surface having the feature that the negative refracting power is reduced as being separated from the optical axis as described in the present embodiment, and it is desirable for the aspheric surface to satisfy the condition (2).

If the parameter of the condition (2) $(1-N_{21}) \times X_{21}(H_{0.8})$ is 0.0010 or less, or 0.0500 or more, the distortion, astigmatism and coma aberration can not be corrected with a good balance, and it discourages ensuring a high imaging performance especially at the wide angle limit.

In order to more preferably correct the distortion at the wide angle limit, as described in the present embodiment, it is preferable for the object side surface of the negative lens to be disposed on the object side of the second lens group II to be the aspheric surface in addition to the image side surface of the negative lens to be disposed on the image side in the second lens group II, and it is preferable for the aspheric surface to satisfy the condition (3).

If the parameter of the condition (3) $\{(N_{20}-1) \times X_{20}(H_{0.8}) + (1-N_{21}) \times X_{21}(H_{0.8})\}/Y'_{max}$ is 0.0500 or less, it is not preferable because the distortion at the wide angle limit becomes insufficient correction or the unnatural shape having an inflection point. If the above parameter is 0.1500 or more, the distortion is over corrected, and it becomes difficult to favorably correct another off-axis aberration.

The amount of aspheric surface of the above aspheric surface assumes that the absolute value monotonically increases from the optical axis toward the outer circumference portion of the lens. If the conditions (2) and/or (3) are satisfied in the position of 80 percent of the maximum ray effective height, it is possible to obtain a favorable performance in the light receiving area of the compact image pick up device.

In addition, it becomes possible to more favorably correct the chromatic aberration by selecting a glass type which satisfies the conditions (4) to (6).

As the zoom lens described in the present embodiment, the second positive lens and the third negative lens from the object side, which produce large aberration each other in the second lens group II, are cemented, so that the performance deteriorated by the manufacturing errors such as the eccentricity is hardly developed, and the spacing ring becomes unnecessary. Accordingly, it becomes possible to effectively reduce the number of man-hour in the assembling. In this case, it is preferable for the cemented surface to satisfy the condition (7).

If the parameter of the condition (7) ($R_{2C}/Y'_{max}$) is −3.5 or less, the curvature of the cemented surface is reduced, and the flexibility which produces the aberration in the cemented surface is thereby reduced. If the parameter of the condition (7) ($R_{2C}/Y'_{max}$) is −1.0 or more, the curvature of the cemented surface becomes too strong, and the off-axis aberration is thereby excessively produced. Accordingly, it becomes difficult to cancel the aberration in another surface of the second lens group and another lens group.

In the zoom lens according to the present invention, in order to accomplish higher valuable power, it is favorable for the third lens group III to share the variable power function by moving the third lens group III to the object side in the variable power from the wide angle limit to the telescopic limit, and thereby, to ensure the flexibility of the aberration correction by reducing the share of the second lens group II. In addition, the height of ray passing the first lens group is lowered at the wide angle limit by moving the first lens group I to the object side in the variable power from the wide angle limit to the telescopic limit, and thereby, the size of the first lens group I to be increased with the wide angle can be controlled and the long focus can be accomplished by ensuring large spacing between the first lens group I and the second lens group II at the telescopic limit.

In this case, if the parameter of the condition (8) ($D_{12T}-D_{12W}$) is 0.50 or less, the contribution of the second lens group II to the variable power is reduced. Therefore, the share of the variable power of the third lens group III is increased or the refracting power of the first and second lens groups has to be strengthened. Anyhow, the various types of aberration are deteriorated. In addition, the total length of the lens at the wide angle limit thereby increased, and the height of ray passing the first lens group is increased. Accordingly, the size of the first lens group is increased.

If the parameter ($D_{12T}-D_{12W}$)/$f_T$ is 0.85 or more, the total length at the wide angle limit becomes too short or the total length at the telescopic limit becomes too long. If the total length at the wide angle limit becomes too short, the moving space of the third lens group is limited, and the contribution of the third lens group to the variable power is thereby reduced. Therefore, it becomes difficult to correct the entire aberration. If the entire length becomes too long at the telescopic limit, the downsizing in the total length direction is discouraged, the diameter direction is also increased to ensure the peripheral light volume at the telescopic limit, and the image performance is easily deteriorated by the manufacturing error such as the falling of the lens barrel.

It is more preferable for the above parameter ($D_{12T}-D_{12W}$)/$f_T$ to satisfy the following condition.

$$0.60<(D_{12T}-D_{12W})/f_T<0.75 \tag{8A}$$

On the other hand, if the parameter ($D_{12T}-D_{12W}$)/$f_T$ of the condition (9) for controlling the change between the second lens group II and the third lens group III is 0.25 or less, the contribution of the third lens group III to the variable power is reduced, and thereby, the share to the variable power of the second lens group II is increased or the refracting power of the third lens group III has to be strengthened. Anyhow, various types of aberration are deteriorated. If the above parameter is 0.65 or more, the total length at the wide angle limit is increased, and the height of ray passing the first lens group I is thereby increased. Therefore, the size of the first lens group I is increased.

It is more preferable for the above parameter ($D_{23W}-D_{23T}$)/$f_T$ to satisfy the following condition.

$$0.30<(D_{23W}-D_{23T})/f_T<0.60 \tag{9A}$$

Regarding the aberration correction, it is more preferable to satisfy the conditions (10), (11). If the parameter of the condition (10) $|f_2|/f_3$ is 0.5 or less, the refracting power of the second lens group II becomes too strong. On the other hand, if the parameter of the condition (10) $|f_2|/f_3$ is 1.0 or more, the refracting power of the third lens group III becomes too strong. Anyhow, the aberration fluctuation in the variable power is easily increased.

If the parameter of the condition (11) $f_1/f_W$ is 6.0 or less, the imaging magnification of the second lens group II comes close to the equal magnification, and the variable power efficiency is thereby increased. It is advantageous for the high variable power. However, large refracting power is required for the respective lenses in the first lens group I. Therefore, it has a negative effect such as deterioration of the chromatic aberration especially at the telescopic limit. In addition, the thickness and diameter of the first lens group I are increased. Accordingly, it becomes disadvantageous for downsizing especially with the housed state. On the other hand, if the parameter $f_1/f_W$ is 12.0 or more, the contribution of the second lens group II to the variable power is reduced, and thereby, it becomes difficult to obtain the high variable power.

In case of claim 81, the aperture stop is moved independently from the neighboring lens groups to make the spacing between the aperture stop and the third lens group III to be the widest at the wide angle limit, so that the aperture stop comes close to the first lens group I at the wide angle limit. Therefore, the height of the ray passing the first lens group I can be lowered, and the first lens group can be thereby further downsized.

Hereinafter, conditions for performing further preferable aberration correction will be explained within a range which does not discourage the downsizing of the zoom lens.

It is preferable for the first lens group I to comprise at least one negative lens and one positive lens, sequentially arranged from the object side. More particularly, the first lens group I may comprise two lenses, sequentially arranged from the object side, a negative meniscus lens having a convex surface on the object side and a positive lens having a strong convex surface on the object side, or three lenses, sequentially arranged from the object side, a negative meniscus lens having a convex surface on the object side, a positive lens having a strong convex surface on the object side and a positive lens having a strong convex surface on the object side.

When the entire system comprises only the three lens groups of positive, negative and positive, it is preferable for the third lens group to comprise four lenses, sequentially arranged from the object side, a positive lens, positive lens, negative lens and positive lens. In this case, the second lens and the third lens from the object side can be appropriately cemented. When the entire system comprises the four lens groups of positive, negative, positive and positive, it is preferable for the third lens group III to comprise three lenses, sequentially arranged from the object side, a positive, positive and negative. In this case, the second lens and the third lens from the object side can be appropriately cemented.

When the entire system comprises the four lens groups of positive, negative, positive and positive, it is preferable for the fourth lens group to comprise one positive lens. Moreover, when focusing to a finite distance, it is better to use a method for moving only the fourth lens group because the weight of the object to be moved is the smallest. The fourth lens group has a small amount of moving in the variable power, and it has a merit to use the moving mechanism both as the variable power and the focusing.

In order to further improve the downsizing of the zoom lens while maintaining a favorable aberration correction, it is necessary to use an aspheric surface. It is preferable for at least the third lens group III to include one aspheric surface or more, in addition to the second lens group II. The aspheric surface included in the third lens group III is effective to correct mainly the spherical aberration and coma aberration.

A molded optical glass and a molded optical plastic (referred to as a glass mold aspheric surface and a plastic mold aspheric surface), and also an aspheric surface lens formed by molding a thin resin layer on a glass lens, and forming the surface as an aspheric surface (referred to as a hybrid aspheric surface, replica aspheric surface or the like), etc., can be used as the aspheric surface lens.

In case of using the glass mold aspheric surface lens on the image most side in the second lens group II, if the lens of the image most side in the second lens group II is a positive lens, a glass of heavy flint type is required for correcting the chromatic aberration. However, the glass of heavy flint type has a problem that such a glass type is not suitable for the molding. As described in this embodiment, if the lens on the image most side of the second lens group is the negative lens, a glass of lanthanum crown type and a glass of tantalum flint type are used, and such glass types are suitable for the molding.

When the hybrid aspheric surface is used for the surface on the image most side in the second lens group II (image side surface of the negative lens on the image side), it requires a largish outer diameter of lens in order to receive a die for molding a resin layer. However, if the lens on the image most side in the second lens group II is a positive lens, the thickness of the lens edge is reduced, and thereby the lens might become unable to be processed. According to the present invention, if the lens on the image most side in the second lens group II is the negative lens, the thickness of the lens edge is increased. Therefore, there is no problem for processing.

As described in claim 82, it is preferable for the opening diameter of the aperture stop to be constant regardless of the variable power, because the structure becomes simple. In addition, as described in the present embodiment, it is possible to reduce the change in the F-number with the variable power by increasing the opening diameter of the long focus limit compared with the short focus limit.

When the reduced light volume, which reaches an image surface, is required, the diameter of the aperture stop can be reduced, but it is preferable to reduce the light volume by inserting a ND filter and the like without largely changing the diameter of the aperture stop, because the resolution deteriorated by the diffraction phenomenon can be curbed.

Hereinafter, specific embodiments of zoom lenses according to the fourth embodiment will be explained. The maximum image height Y' is 3.50 mm in the embodiment 5 and 3.70 mm in the embodiments 2 to 4.

In each of the embodiments, a parallel plate to be disposed on the image surface side of the lens system assumes various types of filters such as an optical low-pass filter and infrared cut filter, and a cover glass (seal glass) of an image pick up device such as a CCD.

The lens materials are all optical glasses except the optical plastic of the ninth lens (fourth lens group) of the embodiment 7.

In each of the embodiments, the aberration is sufficiently corrected, and each of the embodiments is applicable for an image pick up device having a diagonal dimension of about 6 mm to 9 mm and the number of pixels of three million to five million pixels.

The meanings of symbols in the embodiments are as follows.

f: focal length of the entire system
F: F-number
ω: half field angle (degree)
R: radius of curvature
D: surface separation (including an aperture stop surface)
$N_d$: refraction index
$v_d$: Abbe number
K: conical constant of aspheric surface
$A_4$: fourth-order aspheric surface coefficient
$A_6$: sixth-order aspheric surface coefficient
$A_8$: eighth-order aspheric surface coefficient
$A_{10}$: tenth-order aspheric surface coefficient Each of the aspheric surfaces (denoted by applying * in the data of the respective embodiments) is defined by the known following equation when C is a reciprocal of the radius of curvature of paraxial (paraxial curvature) is, and H is height from the optical axis, and the shape is specified by applying the values of the conical constant K and the high aspheric surface coefficient $A_4$ to $A_{10}$.

$$X = [(CH^2)/\{11 + \sqrt{(1-(1+K)CH)}\}] + A_4 \cdot H^4 + A_6 \cdot H^6 + A_8 \cdot H^8 + A_{10} \cdot H^{10} \quad \text{Equation 2}$$

[Embodiment 5]
f = 4.42 to 20.35, F = 2.89 to 4.62, ω = 39.55 to 9.62

| Surface No | R | D | $N_d$ | $v_d$ | Remark |
|---|---|---|---|---|---|
| 01 | 56.183 | 0.90 | 1.84666 | 23.78 | First Lens |
| 02 | 22.306 | 2.46 | 1.77250 | 49.62 | Second Lens |
| 03 | 129.168 | 0.10 | | | |
| 04 | 19.540 | 1.90 | 1.77250 | 49.62 | Third Lens |
| 05 | 44.088 | Variable (A) | | | |
| 06* | 31.255 | 0.84 | 1.83500 | 42.98 | Fourth Lens |
| 07 | 3.862 | 2.10 | | | |
| 08 | 143.581 | 2.45 | 1.76182 | 26.61 | Fifth Lens |
| 09 | −5.555 | 0.74 | 1.83500 | 42.98 | Sixth Lens |
| 10* | −39.380 | Variable (B) | | | |
| 11 | Aperture Stop | Variable (C) | | | |
| 12* | 8.333 | 1.80 | 1.58913 | 61.25 | Seventh Lens |
| 13 | −152.107 | 0.23 | | | |
| 14 | 7.167 | 2.74 | 1.48749 | 70.44 | Eighth Lens |
| 15 | 14.162 | 0.85 | 1.84666 | 23.78 | Ninth Lens |
| 16 | 4.894 | 0.24 | | | |
| 17 | 5.782 | 2.02 | 1.48749 | 70.44 | Tenth Lens |
| 18* | −13.873 | Variable (D) | | | |
| 19 | ∞ | 0.90 | 1.51680 | 64.20 | Various Filters |
| 20 | ∞ | | | | |

Aspheric Surface

Sixth Surface

K=0.0, $A_4$=1.84029×10$^{-4}$, $A_6$=−4.83681×10$^{-6}$, $A_8$=1.03688×10$^{-7}$, $A_{10}$=−1.32922×10$^{-9}$

Tenth Surface

K=0.0, $A_4$=−5.53512×10$^{-4}$, $A_6$=−2.57934×10$^{-5}$, $A_8$=1.05288×10$^{-6}$, $A_{10}$=−1.31801×10$^{-7}$

Twelfth Surface

K=0.0, $A_4$=−2.23709×10$^{-4}$, $A_6$=−8.77690×10$^{-7}$, $A_8$=3.19167×10$^{-7}$, $A_{10}$=−1.93115×10$^{-8}$

Eighteenth Surface

K=0.0, $A_4$=8.00477×10$^{-4}$, $A_6$=2.50817×10$^{-6}$, $A_8$=5.14171×10$^{-7}$, $A_{10}$=−1.09665×10$^{-7}$

| | Variable Amount | | |
|---|---|---|---|
| | short focus limit f = 4.425 | intermediate focal length f = 9.488 | long foucs limit f = 20.350 |
| A | 1.000 | 7.240 | 14.505 |
| B | 8.095 | 3.256 | 1.200 |
| C | 4.494 | 2.617 | 1.000 |
| D | 7.045 | 9.488 | 12.498 |

The parameter values of the condition equations.

$Y'_{max}/f_W$=0.791

$\{(1-N_{21})\times X_{21}(H_{0.8})\}/Y'_{max}$=0.00732

$\{(N_{20}-1)\times X_{20}(H_{0.8})+(1-N_{21})\times X_{21}(H_{0.8})\}/Y'_{max}$=0.01593

$R2C/Y'_{max}$=−1.59

$(D_{12T}-D_{12W})/f_T$=0.664

$(D_{23W}-D_{23T})/f_T$=0.510

$|f_2|/f_3$=0.689

$|f_1|/f_W$=8.00

Figure 49:
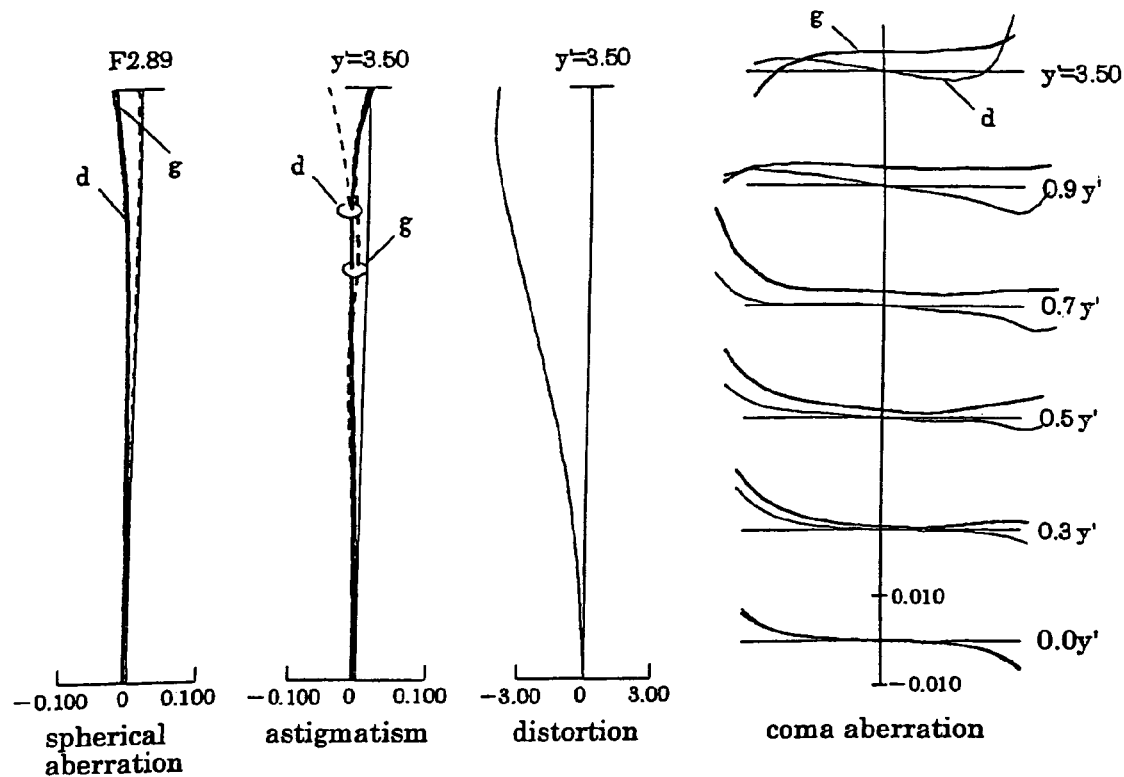
FIG. 49 is a diagram illustrating aberration at the short focus limit of the zoom lens of the embodiment 5.
Figure 50:
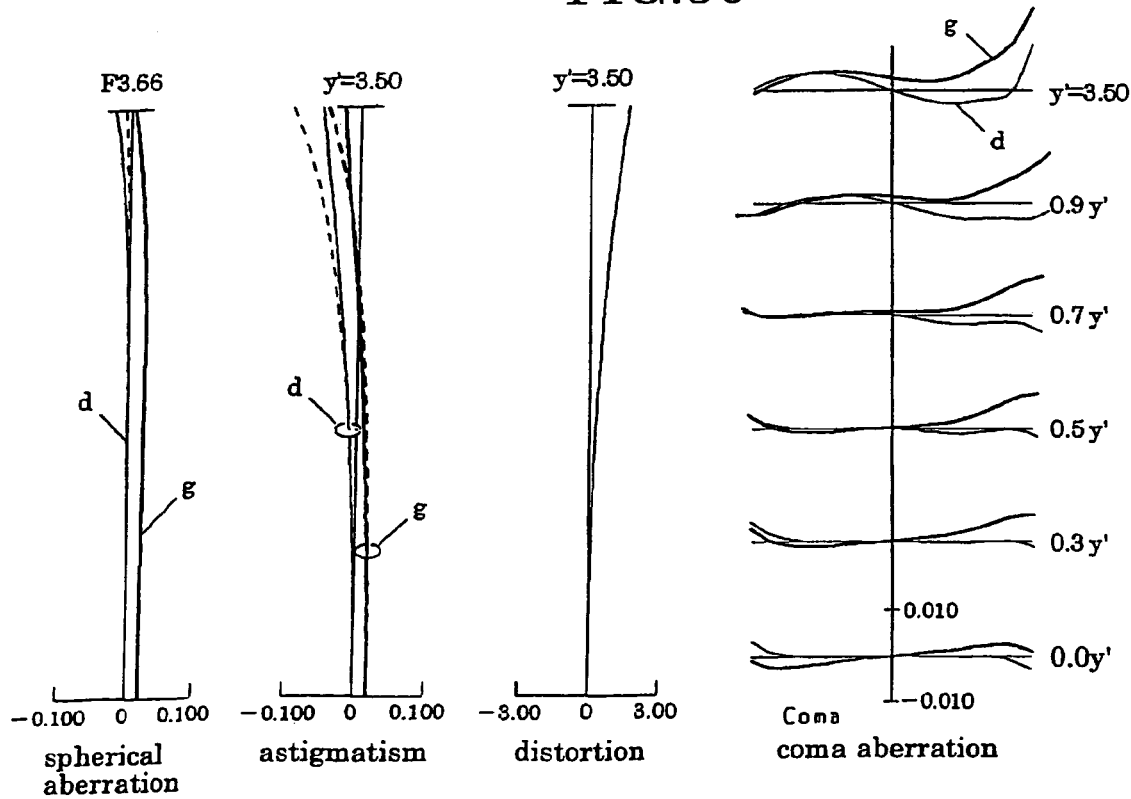
FIG. 50 is a diagram illustrating aberration at the intermediate focal length of the zoom lens of the embodiment 5.
Figure 51:
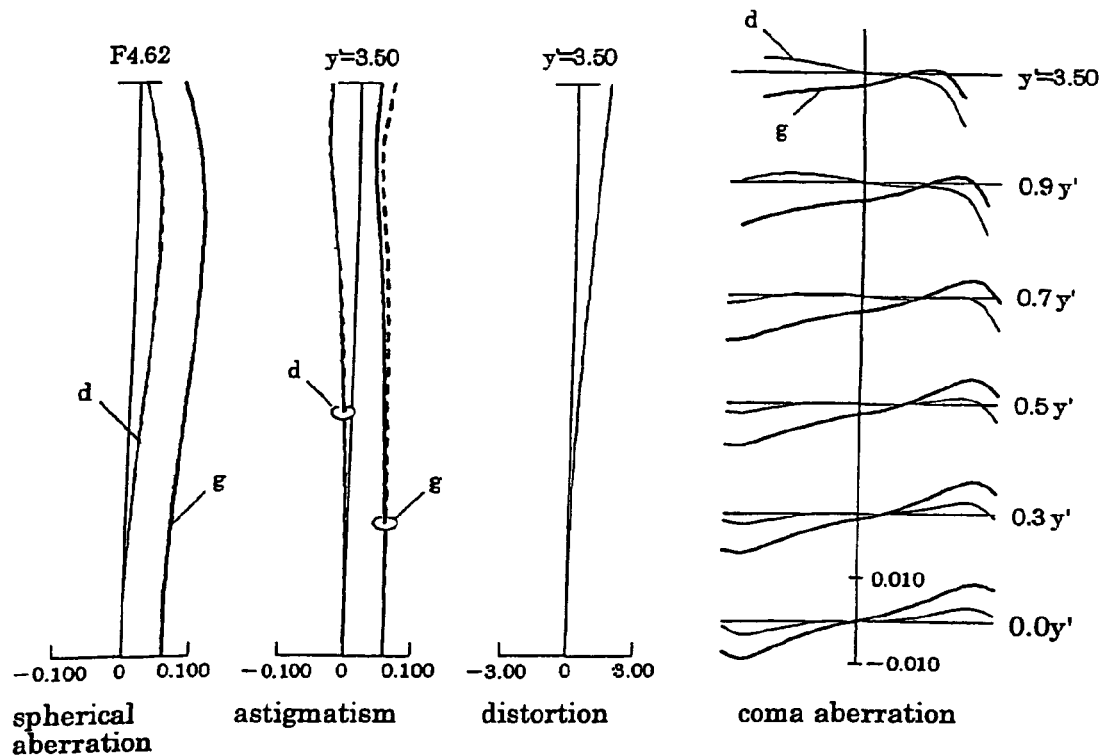
FIG. 51 is a diagram illustrating aberration at the long focus limit of the zoom lens of the embodiment 5.

FIG. 45 illustrates a lens structure of a zoom lens in the embodiment 5. FIG. 49 is a diagram showing aberration at the short focus limit, FIG. 50 is a diagram showing aberration at the intermediate focal length and FIG. 51 is a diagram showing aberration at the long focus limit, regarding the embodiment 5.

In the FIG illustrating the lens structure, a reference numeral I denotes a first lens group, II denotes a second lens group, III denotes a third lens group, F denotes various types of filters and S indicates an aperture stop. These are the same in FIGS. 46 to 48.

A dashed line in each of the diagrams showing the spherical aberration denotes a sine condition, and a solid line and a dashed line in each of the diagrams showing the astigmatism denote a sagittal and a meridional, respectively. Moreover, g and d denote g line and d line, respectively. These are the same in other diagrams illustrating aberration.

| [Embodiment 6] f = 4.74 to 21.55, F = 3.61 to 4.80, ω = 39.16 to 9.64 | | | | | |
|---|---|---|---|---|---|
| Surface No | R | D | $N_d$ | $v_d$ | Remark |
| 01 | 18.565 | 0.90 | 1.92286 | 20.88 | First Lens |
| 02 | 12.194 | 3.90 | 1.72342 | 37.99 | Second Lens |
| 03 | 58.393 | Variable (A) | | | |
| 04* | 70.501 | 0.84 | 1.83500 | 42.98 | Third Lens |
| 05 | 4.859 | 2.42 | | | |
| 06 | 24.219 | 2.54 | 1.76182 | 26.61 | Fourth Lens |
| 07 | −9.529 | 0.74 | 1.83500 | 42.9 | Fifth Lens |
| 08* | −247.508 | Variable (B) | | | |
| 09 | Aperture Stop | Variable (C) | | | |
| 10* | 8.333 | 3.01 | 1.58913 | 61.25 | Sixth Lens |
| 11* | −10.376 | 0.10 | | | |
| 12 | 12.420 | 2.34 | 1.75500 | 52.32 | Seventh Lens |
| 13 | −7.111 | 1.35 | 1.68893 | 31.16 | Eighth Lens |
| 14 | 4.591 | Variable (D) | | | |
| 15* | 13.631 | 1.66 | 1.58913 | 61.25 | Ninth Lens |
| 16 | −45.606 | Variable (E) | | | |
| 17 | ∞ | 0.90 | 1.51680 | 64.20 | Various Filters |
| 18 | ∞ | | | | |

Aspheric Surface

Fourth Surface

K=0.0, $A_4$=1.78565×10$^{-4}$, $A_6$=−1.75390×10$^{-6}$, $A_8$=6.61261×10$^{-9}$, $A_{10}$=1.23143×10$^{-11}$

Eighth Surface

K=0.0, $A_4$=−3.04000×10$^{-4}$, $A_6$=−7.18126×10$^{-6}$, $A_8$=1.05398×10$^{-7}$, $A_{10}$=−2.21354×10$^{-8}$

Tenth Surface

K=0.0, $A_4$=−6.40609×10$^{-4}$, $A_6$=−7.03343×10$^{-6}$, $A_8$=8.98513×10$^{-7}$, $A_{10}$=−9.73391×10$^{-8}$

Eleventh Surface

K=0.0, $A_4$=2.20124×10$^{-4}$, $A_6$=−8.24086×10$^{-6}$, $A_8$=1.09927×10$^{-6}$, $A_{10}$=−1.05069×10$^{-7}$

Fifteenth Surface

K=0.0, $A_4$=−5.79936×10$^{-5}$, $A_6$=8.76394×10$^{-6}$, $A_8$=−2.58155×10$^{-7}$, $A_{10}$=4.31238×10$^{-9}$

| | Variable Amount | | |
|---|---|---|---|
| | short focus limit f = 4.738 | intermediate focal length f = 10.103 | long focus limit f = 21.54 |
| A | 0.600 | 7.679 | 15.059 |
| B | 10.083 | 4.179 | 1.200 |
| C | 4.076 | 2.608 | 1.000 |
| D | 3.075 | 6.493 | 10.666 |
| E | 2.597 | 2.591 | 2.553 |

The parameter values for the condition equations.

$Y'_{max}/f_W$=0.781

$\{(1-N_{21})\times X_{21}(H_{0.8})\}/Y'_{max}$=0.00923

$\{(N_{20}-1)\times X_{20}(H_{0.8})+(1-N_{21})\times X_{21}(H_{0.8})\}/Y'_{max}$=0.02940

$R_{2C}/Y'_{max}$=−2.58

$(D_{12T}-D_{12W})/f_T$=0.671

$(D_{23W}-D_{23T})/f_T=0.555$ $|f_2|/f_3=0.860$ $|f_1|/f_W=9.35$

Figure 46:
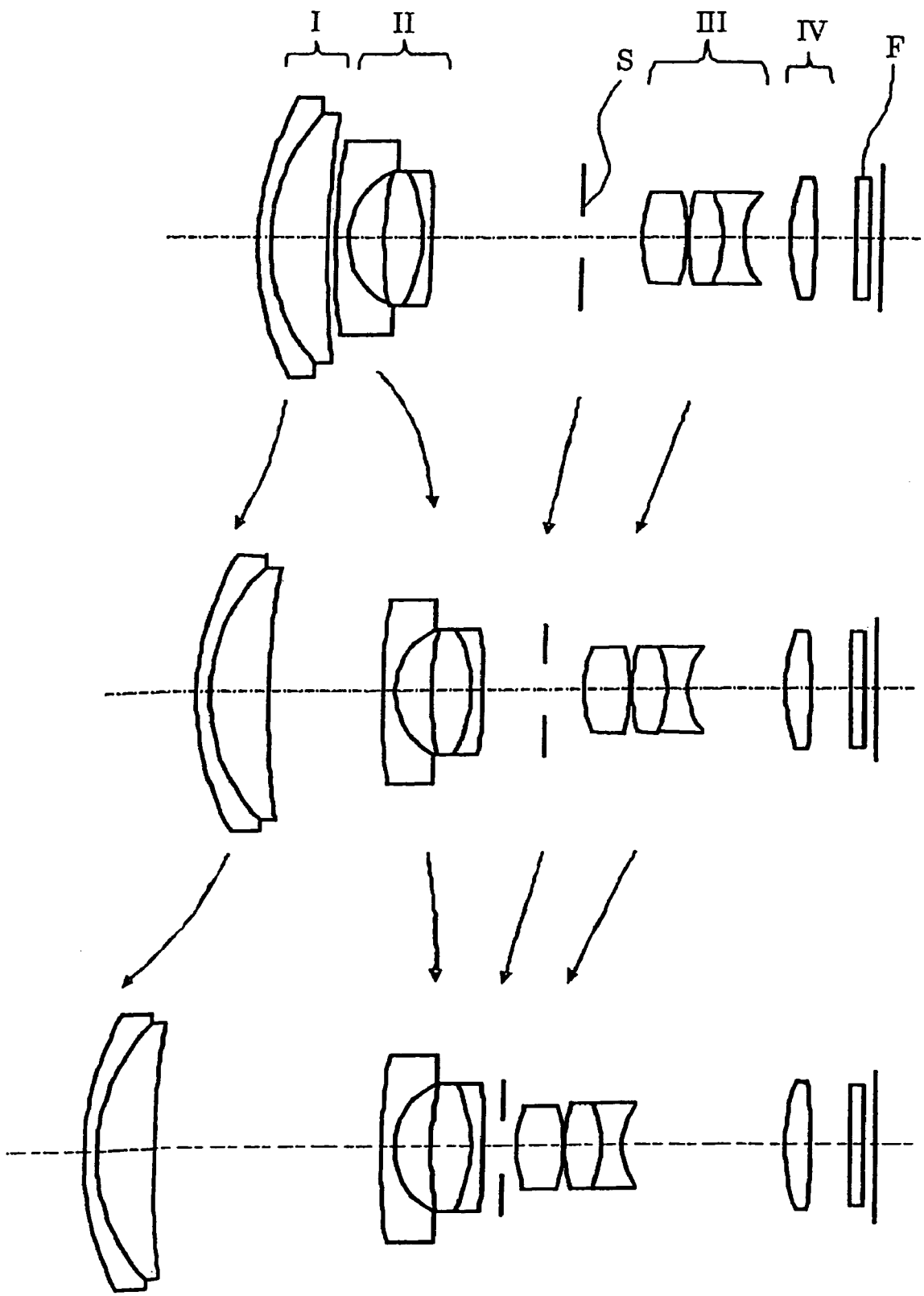
FIG. 46 is a view showing a lens structure of a zoom lens of the embodiment 6.
Figure 52:
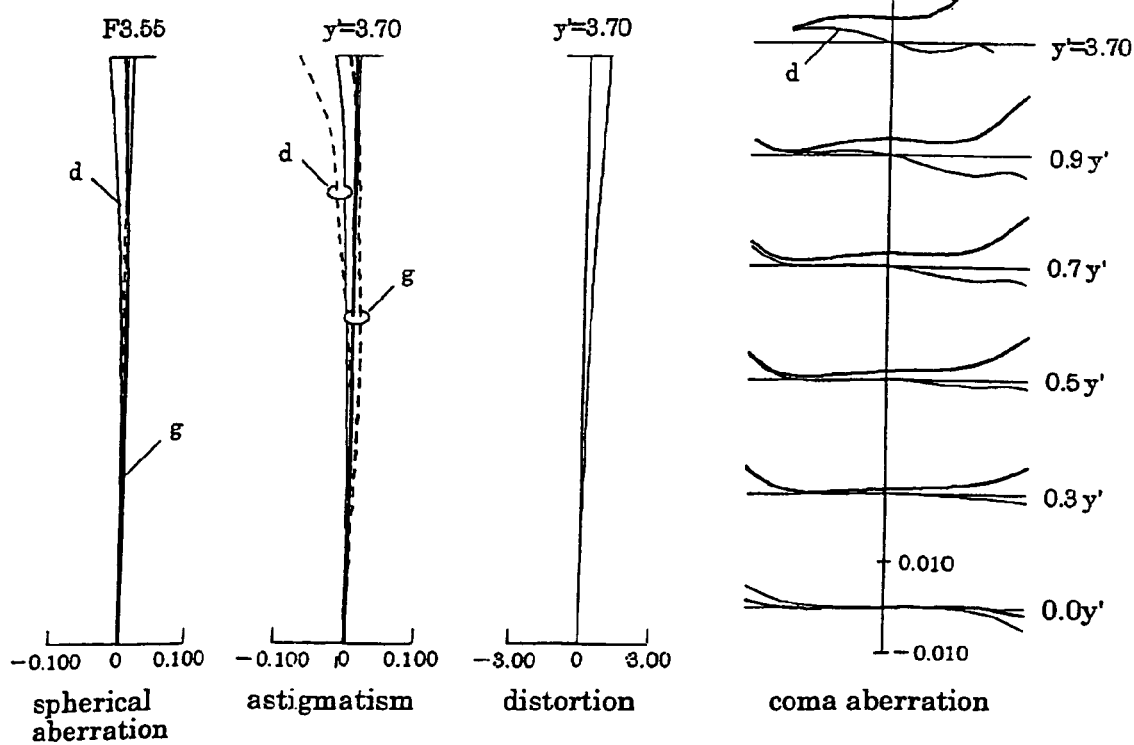
FIG. 52 is a diagram illustrating aberration at the short focus limit of the zoom lens of the embodiment 6.
Figure 53:
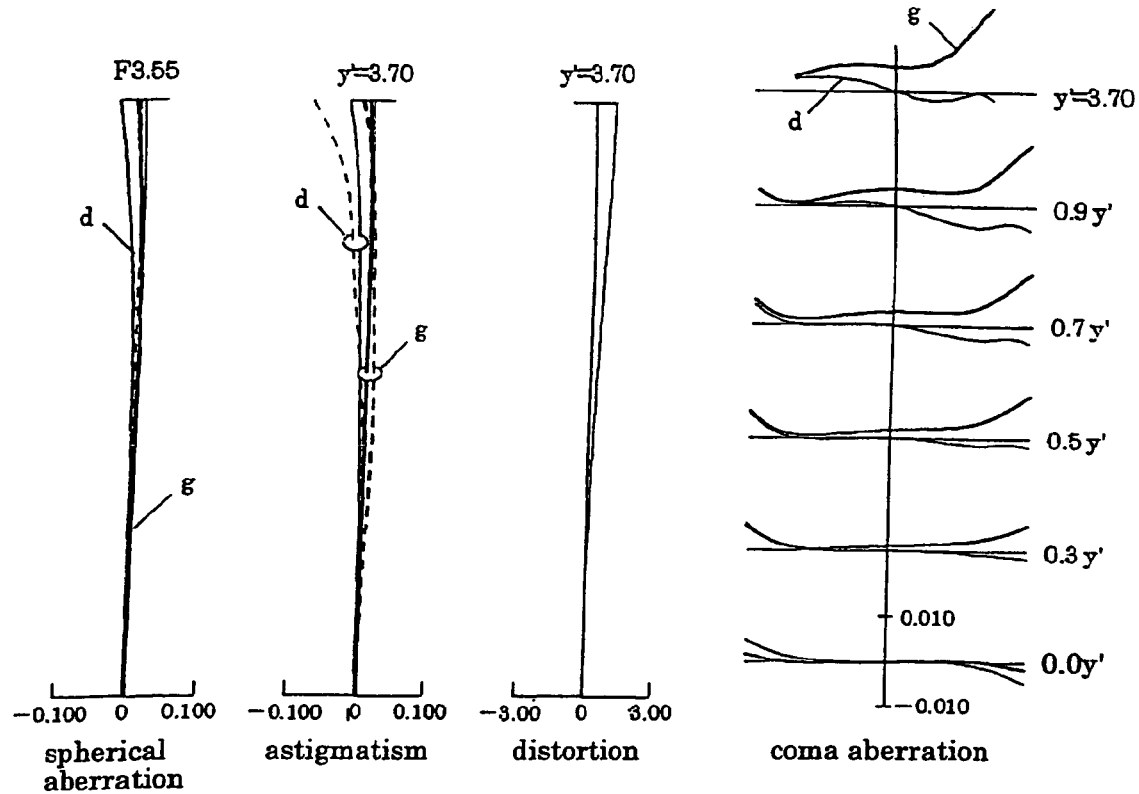
FIG. 53 is a diagram illustrating aberration at the intermediate focal length of the zoom lens of the embodiment 6.
Figure 54:
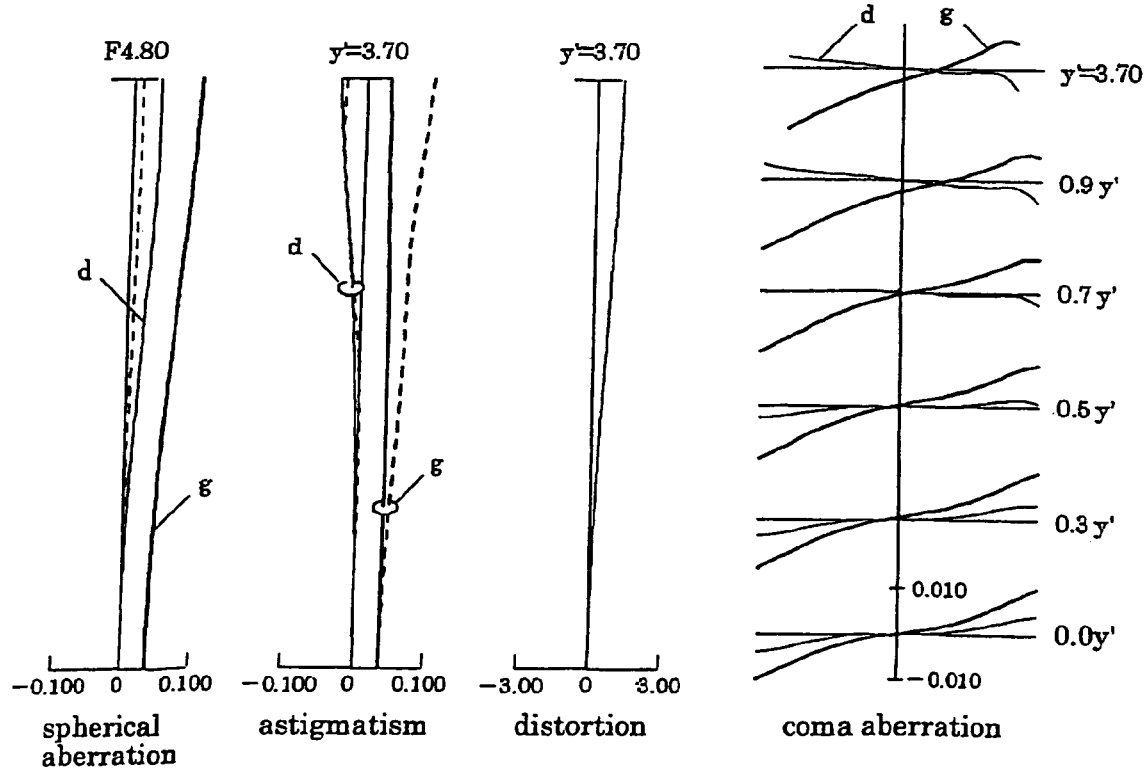
FIG. 54 is a diagram illustrating aberration at the long focus limit of the zoom lens of the embodiment 6.

FIG. 46 denotes a lens structure of a zoom lens in the embodiment 6. A reference numeral IV denotes a fourth lens group. Moreover, FIG. 52 is a diagram illustrating aberration at the short focus limit, FIG. 53 is a diagram illustrating the aberration at the intermediate focal length and FIG. 54 is a diagram illustrating aberration at the long focus limit, regarding the embodiment 6.

[Embodiment 7]
f = 4.74 to 21.59, F = 3.32 to 4.98, ω = 39.14 to 9.55

| Surface No | R | D | $N_d$ | $\nu_d$ | Remark |
|---|---|---|---|---|---|
| 01 | 23.330 | 1.00 | 1.84666 | 23.80 | First Lens |
| 02 | 15.002 | 0.26 | | | |
| 03 | 15.442 | 3.47 | 1.77250 | 49.60 | Second Lens |
| 04 | 135.649 | Variable (A) | | | |
| 05* | 91.446 | 0.84 | 1.83481 | 42.70 | Third Lens |
| 06 | 4.439 | 1.77 | | | |
| 07 | 15.704 | 2.67 | 1.74077 | 27.80 | Fourth Lens |
| 08 | −6.205 | 0.74 | 1.83481 | 42.70 | Fifth Lens |
| 09* | 632.018 | Variable (B) | | | |
| 10 | Aperture Stop | Variable (C) | | | |
| 11* | 8.333 | 2.78 | 1.58913 | 61.15 | Sixth Lens |
| 12* | −8.607 | 0.10 | | | |
| 13 | 15.588 | 2.42 | 1.83481 | 42.70 | Seventh Lens |
| 14 | −4.691 | 0.80 | 1.69895 | 30.10 | Eighth Lens |
| 15 | 4.498 | Variable (D) | | | |
| 16* | 12.500 | 2.21 | 1.54340 | 56.00 | Ninth Lens |
| 17 | −34.711 | Variable (E) | | | |
| 18 | ∞ | 0.90 | 1.51680 | 64.20 | Various Filters |
| 19 | ∞ | | | | |

Aspheric Surface

Fifth Surface $K=0.0$, $A_4=2.42400\times10^{-4}$, $A_6=-2.92208\times10^{-6}$, $A_8=9.40210\times10^{-9}$, $A_{10}=-4.16456\times10^{-11}$ Ninth Surface $K=0.0$, $A_4=-5.16761\times10^{-4}$, $A_6=1.81605\times10^{-6}$, $A_8=-10.01642\times10^{-6}$, $A_{10}=-1.75699\times10^{-8}$ Eleventh Surface $K=0.0$, $A_4=-1.08496\times10^{-3}$, $A_6=-2.17192\times10^{-5}$, $A_8=5.79037\times10^{-6}$, $A_{10}=-5.25493\times10^{-7}$ Twelfth Surface $K=0.0$, $A_4=4.85474\times10^{-4}$, $A_6=-4.49460\times10^{-5}$, $A_8=8.98429\times10^{-6}$, $A_{10}=-5.68154\times10^{-7}$ Sixteenth Surface $K=0.0$, $A_4=-5.46424\times10^{-5}$, $A_6=1.80637\times10^{-5}$, $A_8=-9.17793\times10^{-7}$, $A_{10}=2.09899\times10^{-8}$

| | Variable Amount | | |
|---|---|---|---|
| | short focus limit f = 4.740 | intermediate focal length f = 10.131 | long foucs limit f = 21. |
| A | 0.600 | 6.655 | 15.680 |
| B | 7.051 | 4.217 | 1.200 |
| C | 3.043 | 1.054 | 1.000 |
| D | 2.000 | 7.725 | 10.995 |
| E | 3.484 | 2.583 | 2.382 |

The parameter values of the condition equations.

Figure 47:
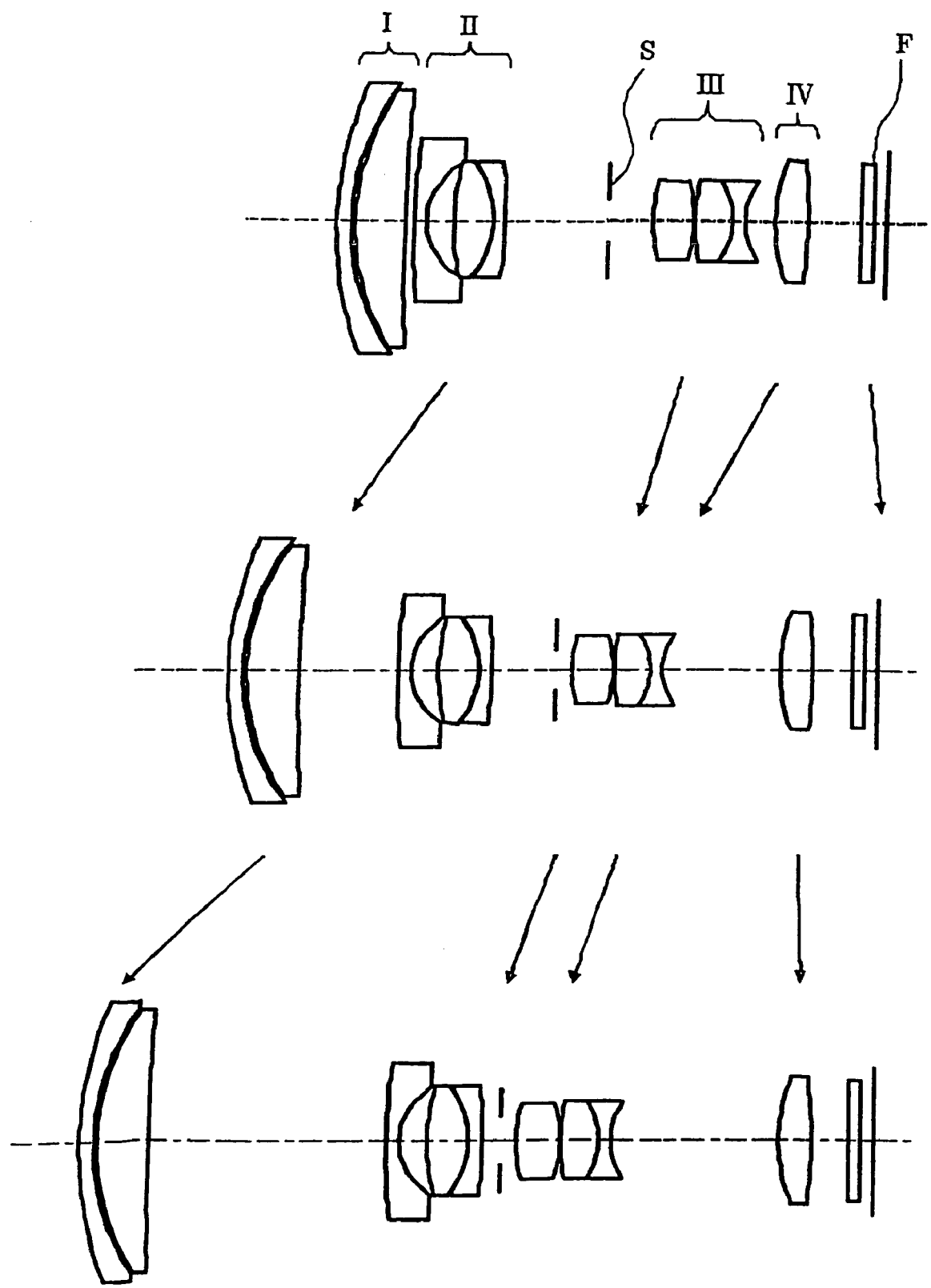
FIG. 47 is a view showing a lens structure of a zoom lens of the embodiment 7.
Figure 57:
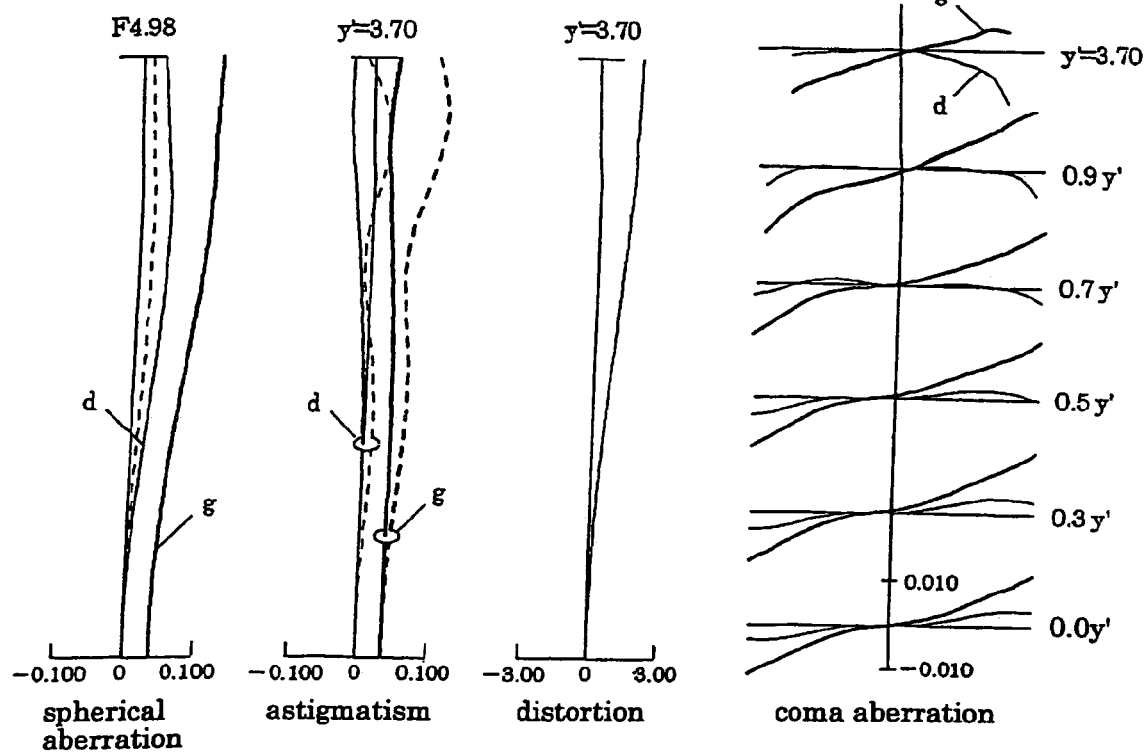
FIG. 57 is a diagram illustrating aberration at the long focus limit of the zoom lens of the embodiment 7.

$Y'_{max}/f_W=0.781$ $\{(1-N_{21})\times X_{21}(H_{0.8})\}/Y'_{max}=0.00536$ $\{(N_{20}-1)\times X_{20}(H_{0.8})+(1-N_{21})\times X_{21}(H_{0.8})\}Y'_{max}=0.01951$ $R_{2C}/Y'_{max}=-1.68$ $(D_{12T}-D_{12W})/f_T=0.698$ $(D_{23W}-D_{23T})/f_T=0.366$ $|f_2|/f_3=0.792$ $|f_1|/f_W=8.44$ FIG. 47 illustrates a lens structure of a zoom lens in the embodiment 7. A reference numeral IV denotes a fourth lens group. Moreover, FIG. 55 is a diagram illustrating aberration at the short focus limit, FIG. 56 is a diagram illustrating aberration at the intermediate focal length and FIG. 57 is a diagram illustrating aberration at the long focus limit, regarding the embodiment 7.

[Embodiment 8]
f = 4.74 to 21.62, F = 3.42 to 4.99, ω = 39.12 to 9.50

| Surface No | R | D | $N_d$ | $\nu_d$ | Remark |
|---|---|---|---|---|---|
| 01 | 96.656 | 0.90 | 1.84666 | 23.78 | First Lens |
| 02 | 29.314 | 2.72 | 1.77250 | 49.62 | Second Lens |
| 03 | −219.341 | 0.10 | | | |
| 04 | 20.153 | 1.80 | 1.77250 | 49.62 | Third Lens |
| 05 | 33.538 | Variable (A) | | | |
| 06* | 18.011 | 0.84 | 1.83500 | 42.98 | Fourth Lens |
| 07 | 3.936 | 2.07 | | | |
| 08 | 74.837 | 1.95 | 1.84666 | 23.78 | Fifth Lens |
| 09 | −9.146 | 0.74 | 1.80420 | 46.50 | Sixth Lens |
| 10* | 759.807 | Variable (B) | | | |
| 11 | Aperture Stop | Variable (C) | | | |
| 12* | 8.333 | 3.34 | 1.58913 | 61.25 | Seventh Lens |
| 13* | −8.827 | 0.10 | | | |
| 14 | 12.236 | 2.45 | 1.75500 | 52.32 | Eighth Lens |
| 15 | −7.504 | 0.80 | 1.69895 | 30.05 | Ninth Lens |
| 16 | 4.892 | Variable (D) | | | |
| 17* | 10.651 | 1.83 | 1.58913 | 61.25 | Tenth Lens |
| 18 | −261.223 | Variable (E) | | | |
| 19 | ∞ | 0.90 | 1.51680 | 64.20 | Various Filters |
| 20 | ∞ | | | | |

Aspheric Surface

Sixth Surface $K=0.0$, $A_4=-8.08791\times10^{-5}$, $A_6=-2.03124\times10^{-6}$, $A_8=6.26638\times10^{-9}$, $A_{10}=-6.12352\times10^{-11}$ Tenth Surface
   $K=0.0$, $A_4=-7.52609\times10^{-4}$, $A_6=-1.24401\times10^{-5}$, $A_8=-9.65466\times10^{-7}$, $A_{10}=-8.33332\times10^{-8}$ Twelfth Surface
   $K=0.0$, $A_4=-7.07947\times10^{-4}$, $A_6=-1.16179\times10^{-6}$, $A_8=6.72505\times10^{-8}$ $A_{10}=-2.53913\times10^{-8}$ Thirteenth Surface
   $K=0.0$, $A_4=3.43658\times10^{-4}$, $A_6=-1.44022\times10^{-6}$, $A_8=-1.33484\times10^{-7}$, $A_{10}=-1.40822\times10^{-8}$ Seventeenth Surface
   $K=0.0$, $A_4=-4.75410\times10^{-5}$, $A_6=1.15429\times10^{-5}$, $A_8=-4.87258\times10^{-7}$, $A_{10}=9.54084\times10^{-9}$

| | Variable Amount | | |
|---|---|---|---|
| | short focus limit $f=4.741$ | intermediate focal length $f=10.112$ | long foucs limit $f=21.62$ |
| A | 0.600 | 6.160 | 15.040 |
| B | 6.288 | 2.111 | 1.200 |
| C | 3.888 | 3.173 | 1.000 |
| D | 2.000 | 7.785 | 11.065 |
| E | 3.440 | 2.547 | 2.351 |

Figure 48:
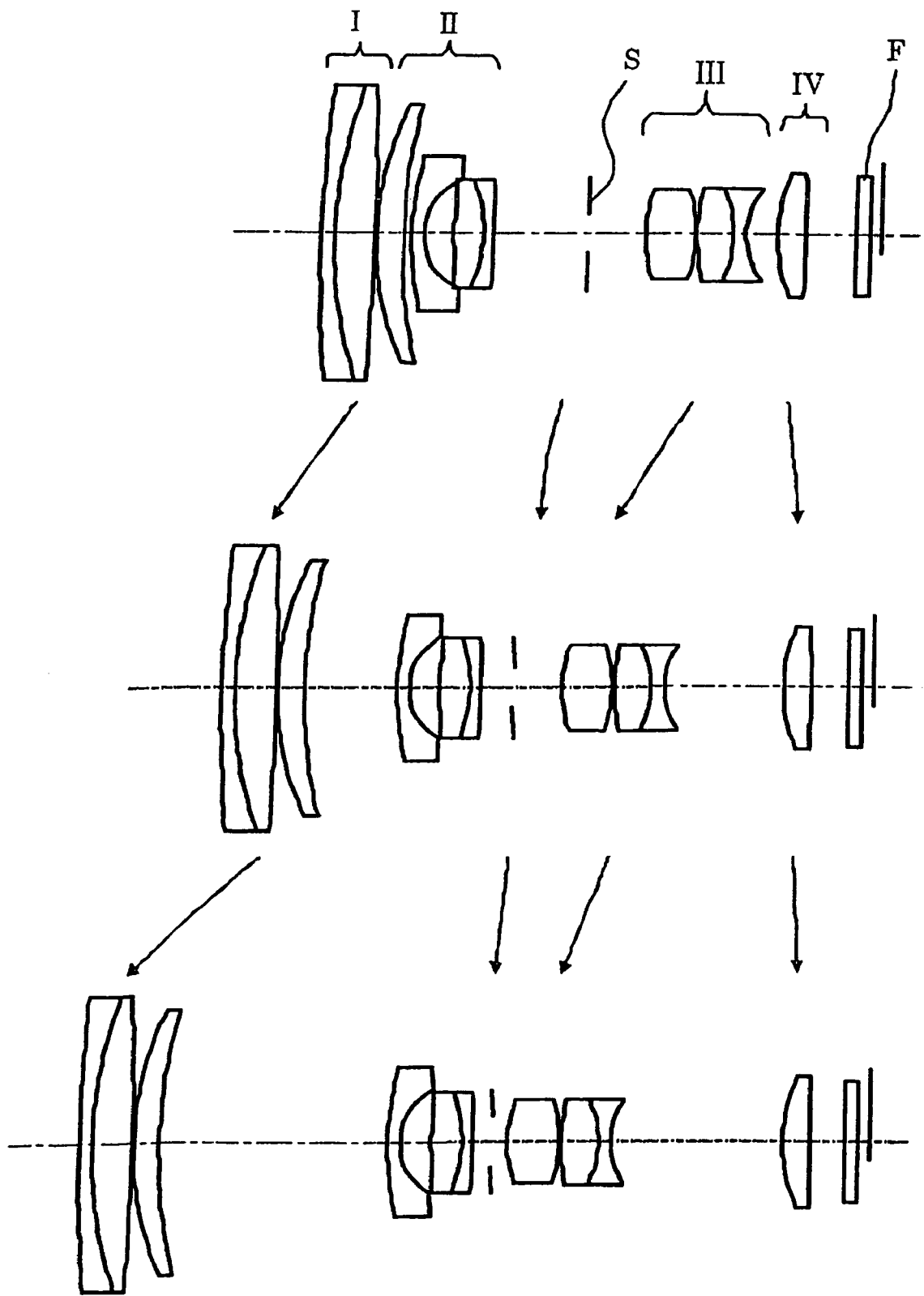
FIG. 48 is a view showing a lens structure of a zoom lens of the embodiment 8.
Figure 58:
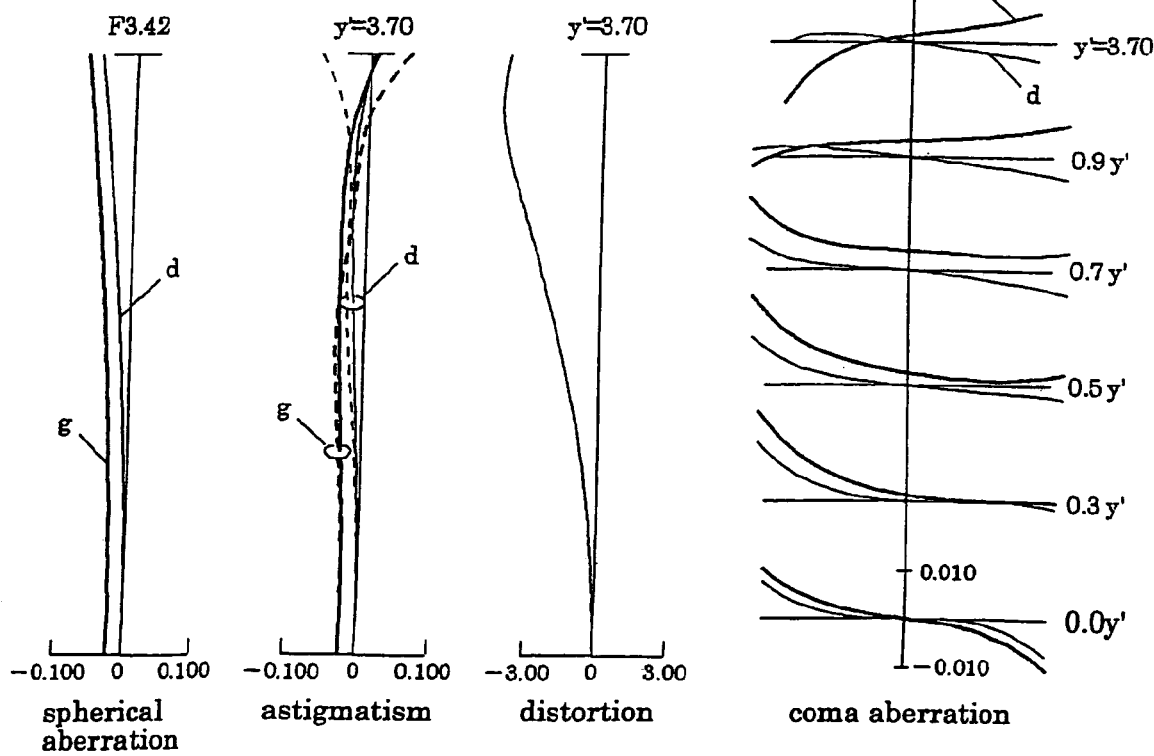
FIG. 58 is a diagram illustrating aberration at the short focus limit of the zoom lens of the embodiment 8.
Figure 59:
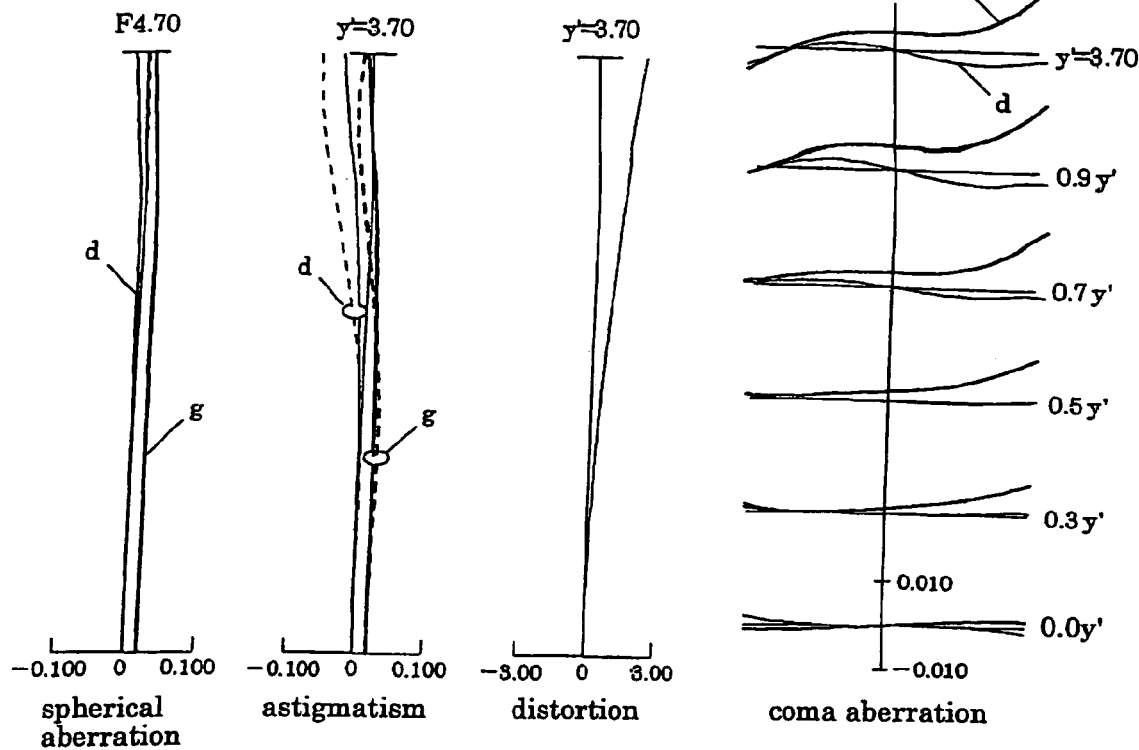
FIG. 59 is a diagram illustrating aberration at the intermediate focal length of the zoom lens of the embodiment 8.
Figure 60:
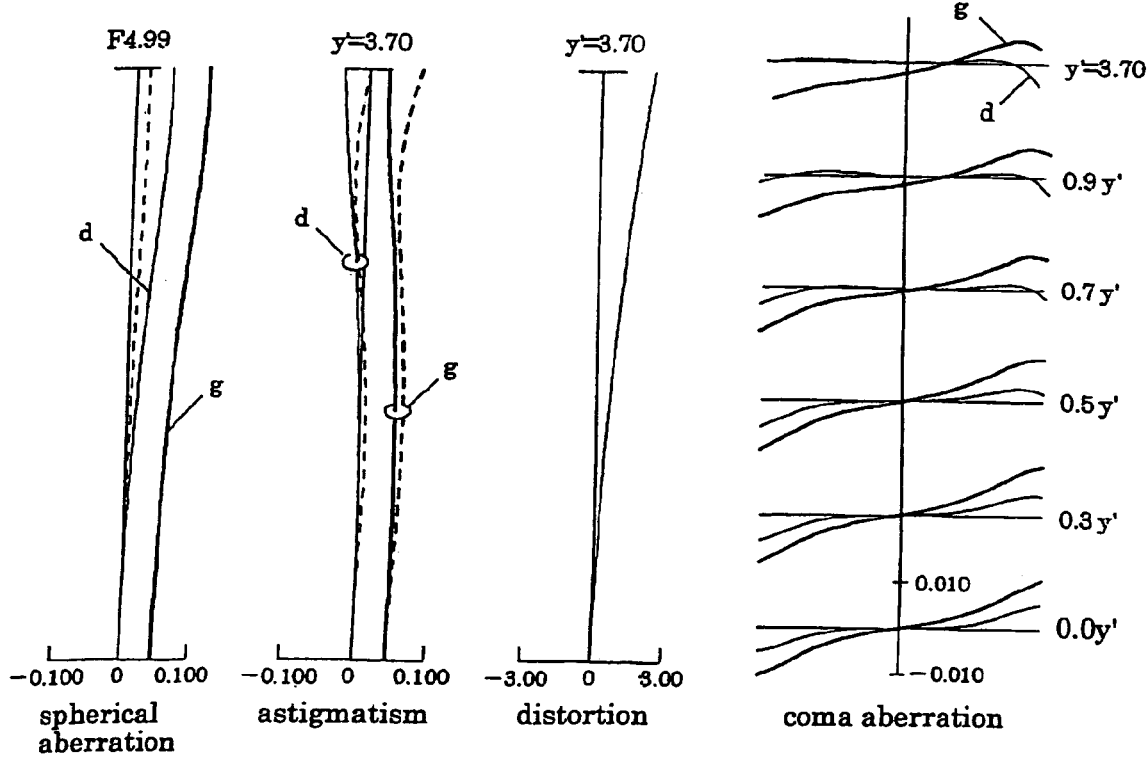
FIG. 60 is a diagram illustrating aberration at the long focus limit of the zoom lens of the embodiment 8.

The parameter values of the condition equations $Y'_{max}/f_W=0.780$ $\{(1-N_{21})\times X_{21}(H_{0.8})\}/Y'_{max}=0.00728$ $\{(N_{20}-1)\times X_{20}(H_{0.8})+(1-N_{21})\times X_{21}(H_{0.8})\}/Y'_{max}=0.00080$ $R_{2C}/Y'_{max}=-2.47$ $(D_{12T}-D_{12W})/f_T=0.668$ $(D_{23W}-D_{23T})/f_T=0.369$ $|f_2|/f_3=0.795$ $|f_1|/f_W=8.14$ FIG. 48 illustrates a lens structure of a zoom lens in the embodiment 8. A reference numeral IV denotes a fourth lens group. Moreover, FIG. 58 is a diagram illustrating aberration at the short focus limit, FIG. 59 is a diagram illustrating aberration at the intermediate focal length and FIG. 60 is a diagram illustrating aberration at the long focus limit, regarding the embodiment 8.

INDUSTRIAL APPLICABILITY

The lens barrel according to the present invention is applicable to a copying machine, scanner, or the like.

The invention claimed is:

1. A lens barrel, comprising:
   a telescopic cylinder configured to be accommodated within a fixed cylinder;
   a plurality of lenses configured to be retained in the telescopic cylinder;
   a lens driving device configured to drive the plurality of lenses along a longitudinal axis of the telescopic cylinder between a collapsed position in which at least one portion of the plurality of lenses is stored in the fixed cylinder and an extended position in which the at least one portion of the plurality of lenses is extended out of the fixed cylinder; and
   at least one retractable lens configured to be retracted from a position outside of the telescopic cylinder into the fixed cylinder through an opening provided in a wall of the fixed cylinder when the telescopic cylinder is in the extended position.

2. The lens barrel according to claim 1, further comprising:
   a plurality of lens retaining frames, each lens retaining frame configured to retain at least one lens in the plurality of lenses; and
   a retractable lens retaining frame configured to retain the at least one retractable lens,
   wherein the lens driving device is configured to drive the plurality of lens retaining frames and to drive the retractable lens retaining frame so that the at least one retractable lens is retracted into the fixed cylinder when the telescopic cylinder is in the extended position.

3. The lens barrel according to claim 2, wherein retractable lens retaining frame is movable in a direction of the optical axis.

4. The lens barrel according to claim 2, wherein the lens driving device includes a single drive structure configured to drive the retractable lens along the optical axis and to retract the retractable lens through the opening in the wall of the fixed cylinder.

5. The lens barrel according to claim 4, wherein the single drive structure includes a lead screw configured to cause the retractable lens retaining frame to retract through the opening in the wall of the fixed cylinder and to move the retractable lens retaining frame along the optical axis.

6. The lens barrel according to claim 5, wherein the single drive structure includes a female screw member that is screwed on the lead screw and has an abutment/engagement portion, wherein the abutment/engagement portion of the female screw member causes the retractable lens retaining frame to move along the optical axis by engaging with an abutment/engagement surface of the retractable lens retaining frame.

7. The lens barrel according to claim 4, wherein the retractable lens retaining frame includes a cam surface configured to cause the retractable lens retaining frame to retract through the opening in the wall of the fixed cylinder.

8. The lens barrel according to claim 7, wherein the single drive structure includes a female screw member that is screwed on the lead screw and has a sliding portion, wherein the sliding portion of the female screw member is configured to cause the retractable lens retaining frame to retract through the opening in the wall of the fixed cylinder by coming into sliding contact with the cam surface.

9. The lens barrel according to claim 4, wherein the single drive structure further comprises:
   a biasing member configured to bias the retractable lens retaining frame to move the retractable lens retaining frame through the opening in the wall of the fixed cylinder.

10. The lens barrel according to claim 4, wherein the single drive structure further comprises:
    a biasing member configured to bias the retractable lens retaining frame to move the retractable lens retaining frame along the optical axis.

11. The lens barrel according to claim 4, wherein the single drive structure further comprises:
    a common single compression torsion spring configured to bias the retractable lens retaining frame to move the retractable lens retaining frame through the opening in the wall of the fixed cylinder and to bias the retractable lens retaining frame to move the retractable lens retaining frame along the optical axis.

12. The lens barrel according to claim 4, wherein the single drive structure further comprises:
a main guide member, wherein the retraction of the retractable lens retaining frame through the opening in the wall of the fixed cylinder and the insertion of the retractable lens retaining frame into the optical axis are carried out by rotating the retractable lens retaining frame about the main guide member.

13. The lens barrel according to claim 12, wherein the main guide member on which the retractable lens retaining frame rotates is arranged outside the fixed cylinder.

14. The lens barrel according to claim 4, wherein the single drive structure further comprises:
a sub-guide member, wherein the retractable lens retaining frame is set on the optical axis by a frame stopper portion of the retractable lens retaining frame coming into abutment with the sub-guide member.

15. The lens barrel according to claim 4, wherein the single drive structure further comprises:
a sub-guide member, wherein the retractable lens retaining frame moves along the direction of the optical axis in a state in which a frame stopper portion of the retractable lens retaining frame abuts against the sub-guide member.

16. The lens barrel according to claim 4, further comprising:
a position detection device configured to detect a position of the retractable lens retaining frame and to generate a signal,
wherein the plurality of lenses are positioned from a subject in sequence and disposed on the optical axis;
at least one of the plurality of lenses is disposed closer to the subject than the retractable lens; and
the at least one of the plurality of lenses is moved from a predetermined position to the collapsed position based on the signal from the position detection device.

17. The lens barrel according to claim 4, wherein at least one of the retractable lens retaining frame and the retractable lens is larger in length along the optical axis than at least one of the plurality of lens retaining frames and the plurality of lenses.

18. The lens barrel according to claim 4, wherein a diameter of the retractable lens is smaller than that of the plurality of lenses.

19. The lens barrel of claim 2, further comprising:
a finder mechanism provided at a first position outside of the fixed cylinder; and
wherein the retractable lens retaining frame is stored at a second position outside of the fixed cylinder, the second position being directly across from the first position in a direction transverse to the optical axis.

20. The lens barrel according to claim 1, further comprising:
a detector configured to generate a signal when the telescopic cylinder reaches a maximum extended position of the telescopic cylinder.

21. A camera for photographing a subject, comprising an optical system including the lens barrel recited in claim 1.

22. A mobile information terminal, comprising a camera functional part having an optical system for photographing, the optical system including the lens barrel as recited in claim 1.

23. The lens barrel according to claim 1, wherein the retractable lens passes through the opening when the retractable lens is retracted out of the optical axis.

24. The lens barrel according to claim 1, further comprising a retractable lens retaining frame configured to retain the at least one retractable lens,
wherein the retractable lens retaining frame include a crank-shaped bend portion for differentiating positions of two ends of the retractable lens retaining frame in a direction parallel with an optical axis of the plurality of lenses.

25. The lens barrel according to claim 1, wherein the opening is provided in a peripheral wall of the fixed cylinder.

* * * * *